United States Patent
Kawahira et al.

(10) Patent No.: US 11,988,918 B1
(45) Date of Patent: May 21, 2024

(54) OPTICAL ELEMENT AND DISPLAY DEVICE

(71) Applicant: Sharp Display Technology Corporation, Kameyama (JP)

(72) Inventors: Yuichi Kawahira, Kameyama (JP);
Masahiro Hasegawa, Kameyama (JP);
Ryosuke Saigusa, Kameyama (JP);
Jianeng Xu, Kameyama (JP); Akira Sakai, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/382,267

(22) Filed: Oct. 20, 2023

(30) Foreign Application Priority Data

Nov. 29, 2022 (JP) .................................. 2022-190213

(51) Int. Cl.
*G02F 1/1335* (2006.01)
*G02F 1/13357* (2006.01)

(52) U.S. Cl.
CPC .. *G02F 1/133531* (2021.01); *G02F 1/133605* (2013.01); *G02F 1/133607* (2021.01); *G02F 2202/40* (2013.01)

(58) Field of Classification Search
CPC ......... G02F 1/133605; G02F 1/133607; G02F 2202/40

USPC ...................................... 349/96–98, 117–121
See application file for complete search history.

(56) References Cited

U.S. PATENT DOCUMENTS

2018/0172889 A1\* 6/2018 Yanai ........................ E06B 9/24

FOREIGN PATENT DOCUMENTS

WO    2017/110216 A1    6/2017

\* cited by examiner

*Primary Examiner* — Charles S Chang
(74) *Attorney, Agent, or Firm* — ScienBiziP, P.C.

(57) ABSTRACT

Provided is an optical element including a phase difference layer. The phase difference layer is a laminate of n first phase difference layers and m second phase difference layers. The n first phase difference layers each contain first anisotropic molecules with tilt angles different between a viewing surface side and a back surface side. The m second phase difference layers each contain second anisotropic molecules with tilt angles different between a viewing surface side and a back surface side. Slow axes of the n first phase difference layers are in a same orientation. Slow axes of the m second phase difference layers are in a same orientation. The slow axes of the n first phase difference layers and the slow axes of the m second phase difference layers are anti-parallel to each other and are parallel to or perpendicular to the transmission axis of the first polarizer.

10 Claims, 32 Drawing Sheets

FIG. 4
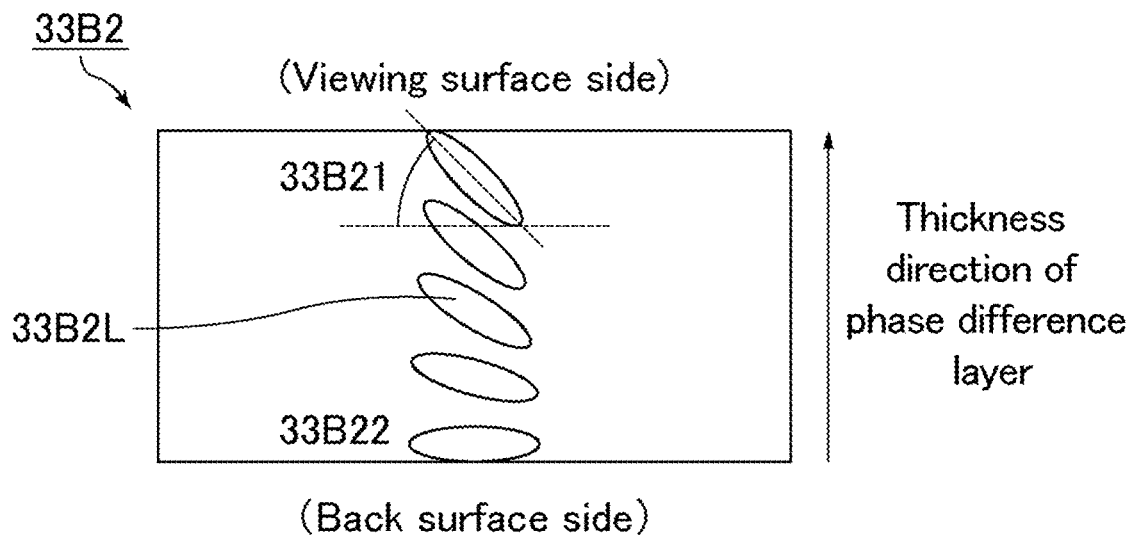
FIG. 5
Parallel to azimuth of 135° (azimuth 135° −315°)
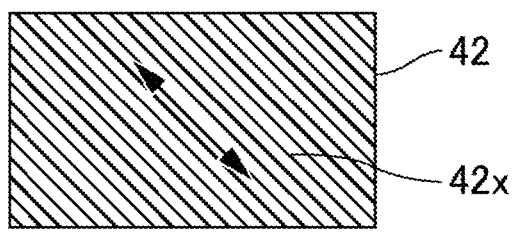
Parallel to azimuth of 45° (azimuth 45° −225°)
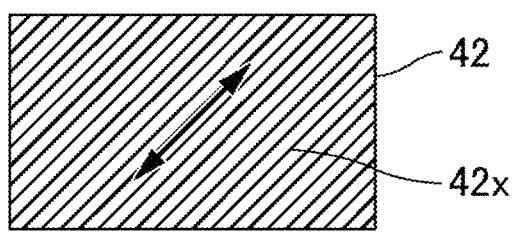

FIG. 6
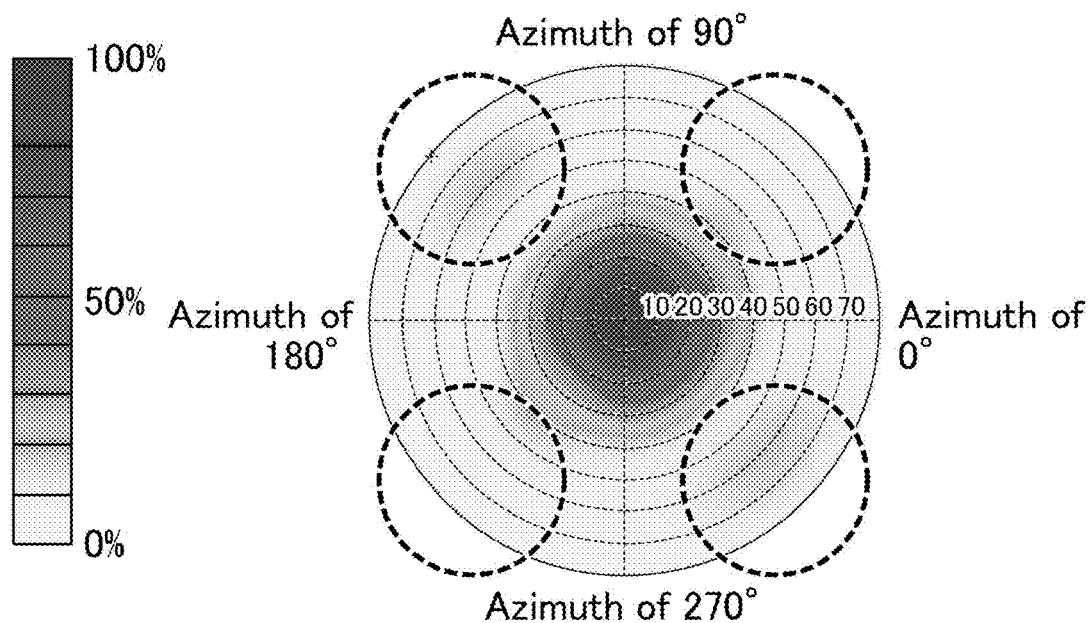
FIG. 7
Parallel to azimuth of 0° (azimuth 0° -180°)
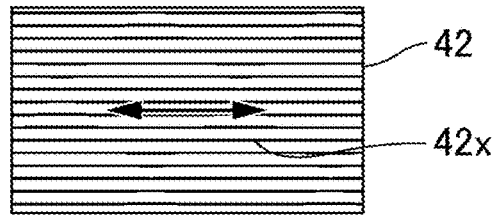
FIG. 8
Parallel to azimuth of 0° (azimuth 0° -180°)
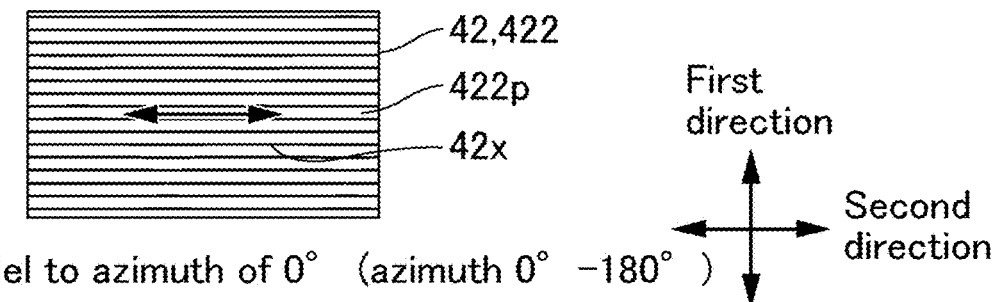
Parallel to azimuth of 0° (azimuth 0° -180°)
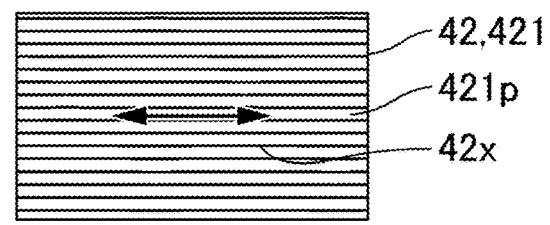

OPTICAL ELEMENT AND DISPLAY DEVICE

CROSS-REFERENCE TO RELATED APPLICATIONS

The present application claims priority under 35 U.S.C. § 119 to Japanese Patent Application No. 2022-190213 filed on Nov. 29, 2022, the contents of which are incorporated herein by reference in their entirety.

BACKGROUND OF THE INVENTION

Field of the Invention

The following disclosure relates to optical elements and display devices including the optical element.

Description of Related Art

Various display devices such as liquid crystal display devices and organic electroluminescent (EL) display devices have been widely used as devices that display images (moving images and still images).

For example, a liquid crystal display device is a display device that uses a liquid crystal composition for display. A typical display method thereof includes applying light from a backlight to a liquid crystal panel that includes a thin film transistor (TFT) substrate including TFTs, a counter substrate facing the TFT substrate, and a liquid crystal layer sealed between the TFT substrate and the counter substrate, and applying voltage to liquid crystal molecules in the liquid crystal layer to change the alignment state of the liquid crystal molecules, thereby controlling the transmission amount of light. Optical elements are sometimes used in such liquid crystal display devices for the purpose of improving the contrast ratio, for example.

Techniques relating to optical elements include, for example, the optical element disclosed in WO 2017/110216. The optical element is a transmissive optical element including a polarizing plate and at least one tilt-alignment phase difference film in the stated order from a viewing side, wherein (i) an absorption axis of the polarizing plate and a slow axis of the tilt-alignment phase difference film are within the range of +15 degrees to +55 degrees and −15 degrees to −55 degrees, and (ii) the tilt-alignment phase difference film introduces an in-plane phase difference of from 110 nm to 240 nm and the average tilt angle γ relative to a plane of the film is from 22 degrees to 55 degrees.

Liquid crystal display devices are roughly classified into reflective liquid crystal display devices and transmissive liquid crystal display devices depending on the method of transmitting light through the liquid crystal layer. Transmissive liquid crystal display devices include a backlight including a light source, and performs display by transmitting light emitted from the backlight through a liquid crystal layer. Including a light source inside thereof, transmissive liquid crystal display devices ensure good visibility even in a dark environment. A backlight in such transmissive liquid crystal display devices may include a prism sheet (lens sheet) disposed on the viewing surface side of the light source with an aim of focusing light from the light source to the front. In liquid crystal display devices including a backlight with a prism sheet, the front contrast ratio (CR) can be increased.

The presence of the prism sheet in the liquid crystal display device, however, may decrease oblique CR during black display. The presence of side lobe light generated by the prism sheet is one cause of a decrease in oblique CR. Side lobe light is a light component generated by the following mechanism. At an azimuth perpendicular to the ridge lines of prisms of the prism sheet, the prism sheet fails to collect a large-polar-angle light component, among the light emitted from the backlight, to the front, and the large-polar-angle light component is emitted from the prism sheet at a still larger polar angle as side lobe light. In other words, side lobe light is a light component that leaks out of the display device without being collected by the lens sheet at deep (large) polar angles. The side lobe light is essentially an unnecessary light component and tends to become stray light in the liquid crystal panel, which causes leakage of oblique light (large-polar-angle light) during black display and decreases the oblique CR.

Although WO 2017/110216 shows examination on an optical element that can reduce oblique light at azimuths in top and bottom directions, the effect thereof is insufficient.

In response to the above issues, an object of the present invention is to provide an optical element that can reduce or prevent oblique light at azimuths in top and bottom directions, and a display device including the optical element.

(1) One embodiment of the present invention is directed to an optical element including, sequentially from a viewing surface side toward a back surface side: a first polarizer; a phase difference layer; and a second polarizer, wherein the phase difference layer is a laminate of n first phase difference layers and m second phase difference layers, the n first phase difference layers and the m second phase difference layers being arranged sequentially from the viewing surface side, n and m are each an integer of 1 or greater and are equal to each other, a transmission axis of the first polarizer is parallel to a transmission axis of the second polarizer, each of the n first phase difference layers contains first anisotropic molecules, in each of the n first phase difference layers, a tilt angle of the first anisotropic molecules on a viewing surface side differs from a tilt angle of the first anisotropic molecules on a back surface side, each of the m second phase difference layers contains second anisotropic molecules, in each of the m second phase difference layers, a tilt angle of the second anisotropic molecules on a viewing surface side differs from a tilt angle of the second anisotropic molecules on a back surface side, and in a structure where slow axes of the n first phase difference layers lie in a tilt direction of the first anisotropic molecules and slow axes of the m second phase difference layers lie in a tilt direction of the second anisotropic molecules, each of the slow axes of the n first phase difference layers and the slow axes of the m second phase difference layers is defined to point from the back surface side long-axis end of each of the first anisotropic molecules and the second anisotropic molecules as a start point to the viewing surface side long-axis end of each of the first anisotropic molecules and the second anisotropic molecules as an end point, in a plan view of a main surface of the optical element, the slow axes of the n first phase difference layers are in a same orientation, the slow axes of the m second phase difference layers are in a same orientation, and the slow axes of the n first phase difference layers and the slow axes of the m second phase difference layers are anti-parallel to each other and are parallel to or perpendicular to the transmission axis of the first polarizer.

(2) In an embodiment of the present invention, the optical element includes the structure (1), and with n and m each being 1, an in-plane phase difference of the first phase difference layer in a front view is 180 nm or more and 250 nm or less.

(3) In an embodiment of the present invention, the optical element includes the structure (1) or (2), and with n and m each being 1, an in-plane phase difference of the second phase difference layer in a front view is 180 nm or more and 250 nm or less.

(4) In an embodiment of the present invention, the optical element includes the structure (1), and with n and m each being an integer of 2 or greater, an in-plane phase difference of each of the n first phase difference layers in a front view is 90 nm or more and 125 nm or less.

(5) In an embodiment of the present invention, the optical element includes the structure (1) or (4), and with n and m each being an integer of 2 or greater, an in-plane phase difference of each of the m second phase difference layers in a front view is 90 nm or more and 125 nm or less.

(6) In an embodiment of the present invention, the optical element includes the structure (1), (2), (3), (4), or (5), the first polarizer is an absorptive polarizer or a laminate of an absorptive polarizer and a reflective polarizer, and the second polarizer is a reflective polarizer or a laminate of an absorptive polarizer and a reflective polarizer.

(7) Another embodiment of the present invention is directed to a display device including, sequentially from a viewing surface side toward a back surface side: a viewing surface side polarizer; a display panel; the optical element having the structure (1), (2), (3), (4), (5), or (6); and a backlight.

(8) In an embodiment of the present invention, the display device includes the structure (7), and the backlight includes a luminous part and a prism sheet disposed on a viewing surface side of the luminous part.

(9) In an embodiment of the present invention, the display device includes the structure (8), and a transmission axis of the first polarizer and a transmission axis of the second polarizer are parallel to or perpendicular to ridge lines of the prism sheet.

(10) In an embodiment of the present invention, the display device includes the structure (8), and the backlight includes a reflector on a back surface side of the luminous part.

The present invention can provide an optical element that can reduce or prevent oblique light at azimuths in top and bottom directions, and a display device including the optical element.

BRIEF DESCRIPTION OF THE DRAWINGS

FIG. 4 is a schematic cross-sectional view of a second phase difference layer in the phase difference layer in the optical element of the embodiment.

FIG. 5 includes schematic plan views of a prism sheet in which ridge lines are parallel to an azimuth of 45° and a prism sheet in which ridge lines are parallel to an azimuth of 135°.

FIG. 6 shows simulation results of light distribution property of a backlight including the two prism sheets shown in FIG. 5.

FIG. 7 is a schematic plan view of one prism sheet in which ridge lines are parallel to an azimuth of 0°.

FIG. 8 includes schematic plan views of two prism sheets in each of which ridge lines are parallel to an azimuth of 0°.

DETAILED DESCRIPTION OF THE INVENTION

Hereinafter, an embodiment of the present invention is described. The present invention is not limited to the contents of the embodiment. The design may be modified as appropriate within the range satisfying the configuration of the present invention. In the following description, components having the same or similar functions in different drawings are commonly provided with the same reference sign so as to appropriately avoid repetition of description. The structures in the present invention may be combined as appropriate without departing from the gist of the present invention.

Definition of Terms

Figure 1:
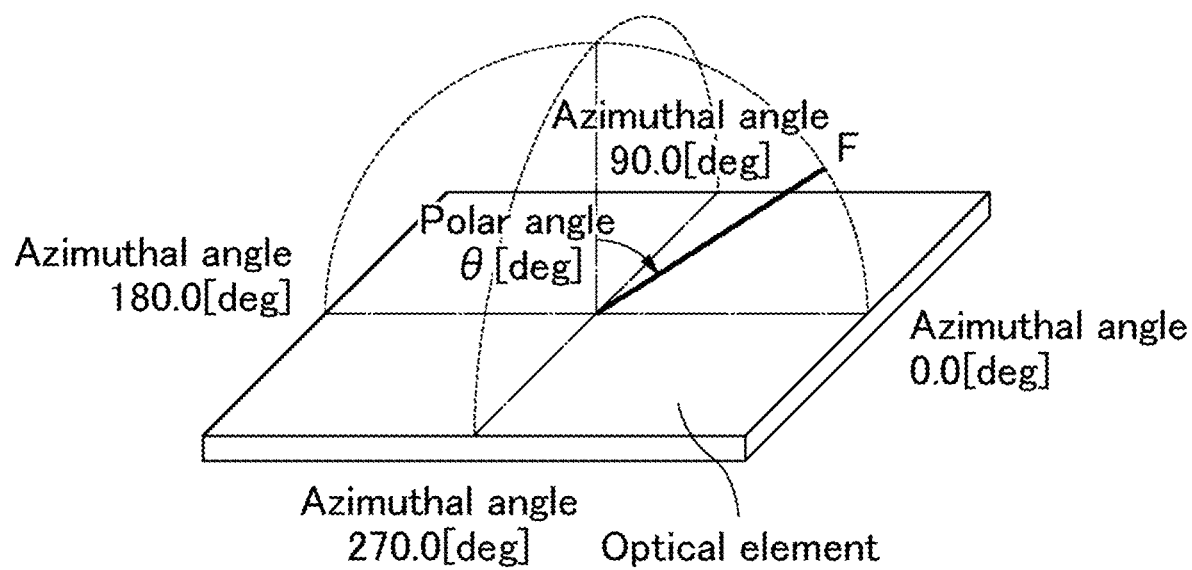
FIG. 1 shows polar angles and azimuthal angles.

FIG. 1 shows polar angles and azimuthal angles. The polar angle θ herein means, as shown in FIG. 1, an angle formed by the direction in question (e.g., measurement direction F) and a direction parallel to the normal of a main surface of an optical element. In other words, the direction parallel to the normal of the main surface of the optical element corresponds to a polar angle of 0°. The direction parallel to the normal is also referred to as a normal direction. The "azimuth" herein means the direction in question in a view projected onto the main surface of the optical element and is expressed as an angle (also referred to as an azimuthal angle) formed with the reference azimuth.

The reference azimuth (azimuthal angle of 0°) herein is set to the right in the horizontal direction of the screen of the optical element.

The angle and the azimuth (azimuthal angle) measure positive in the counterclockwise direction from the reference azimuth and measure negative in the clockwise direction from the reference azimuth. Both the counterclockwise and clockwise directions are rotational directions when the main surface of the optical element is viewed from the viewing surface side (front). The angle is a value measured in a plan view of the main surface of the optical element. The expression that two straight lines (including axes, directions, and ridge lines) are "perpendicular" herein means that they are perpendicular in a plan view of the main surface of the optical element. The expression that two straight lines (including axes, directions, and ridge lines) are "parallel" means that they are parallel in a plan view of the main surface of the optical element.

The "birefringent layer" herein means a layer having optical anisotropy and is a concept encompassing a phase difference plate and a liquid crystal panel. The birefringent layer provides, for example, a retardation Re in the in-plane direction, or a retardation Rth in the thickness direction in absolute value of not less than 10 nm, preferably not less than 20 nm. The retardation Re in the in-plane direction is also referred to as an in-plane phase difference Re or a front view in-plane phase difference Re. The retardation Rth in the thickness direction is also referred to as a thickness direction phase difference Rth.

Herein, the retardation Re in the in-plane direction of the birefringent layer, the retardation Rth in the thickness direction of the birefringent layer, and the NZ coefficient (biaxial parameter) of the birefringent layer are respectively represented by the formulas below wherein d represents the thickness of the birefringent layer, nx represents the refractive index in the x-axis direction, ny represents the refractive index in the y-axis direction, and nz represents the refractive index in the z-axis direction. The x-axis is set at azimuth 0°-180°, the y-axis is set at azimuth 90°-270°, and the z-axis is set perpendicular to the x-axis and the y-axis.

$$Re = (nx-ny) \times d$$

$$Rth = \{nz-(nx+ny)/2\} \times d$$

$$NZ = (nz-nx)/|nz-ny|$$

Herein, the measurement wavelength and the measurement temperature for a principal refractive index, a phase difference, an NZ coefficient, and other optical parameters are respectively 550 nm and 23° C., unless otherwise specified.

Herein, the viewing surface side of the component in question means a side closer to the viewer relative to the component, and the back surface side of the component in question means a side farther from the viewer relative to the component, where the component in question is disposed to face the viewer. For example, the viewing surface side of a display device means the side of the display device closer to the viewer relative to the screen (display surface) of the display device, and the back surface side of the display device means the side of the display device farther from the viewer relative to the screen (display surface) of the display device. The viewing surface side in the component in question means a side closer to the viewer within the component, and the back surface side in the component in question means a side farther from the viewer within the component, where the component in question is disposed to face the viewer.

Herein, a "polarizer" means one having a function of filtering unpolarized light (natural light), partially polarized light, or polarized light into polarized light (linearly polarized light) vibrating only in a specific direction. Such a polarizer is distinctive from a circular polarizer (a circularly polarizing plate). Unless otherwise noted, a "polarizer" herein indicates an element having a polarizing function and does not include protective film(s). An "absorptive polarizer" means one having a function of absorbing light vibrating in a specific direction while transmitting polarized light (linearly polarized light) vibrating in a direction perpendicular to the specific direction. A "reflective polarizer" means one having a function of reflecting light vibrating in a specific direction while transmitting polarized light (linearly polarized light) vibrating in a direction perpendicular to the specific direction.

Herein, the axis azimuth means the azimuth of the absorption axis (reflection axis) of a polarizer or the optic axis (slow axis) of a phase difference plate, unless otherwise specified.

EMBODIMENT

Figure 2:
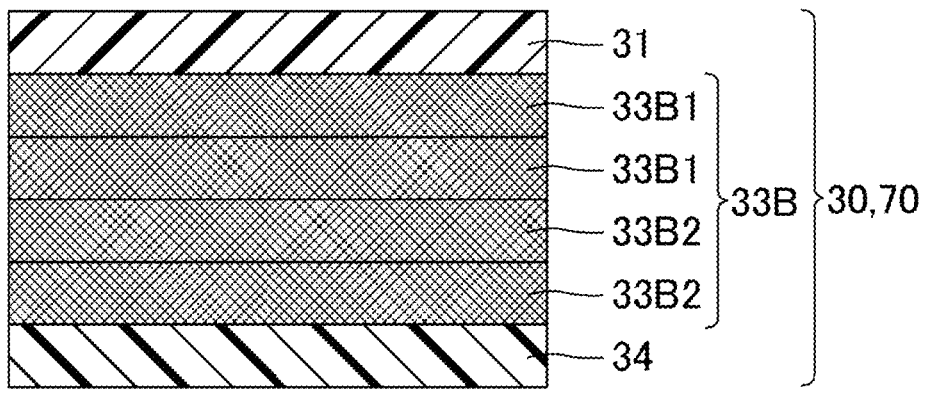
FIG. 2 is a schematic cross-sectional view of an optical element of an embodiment.
Figure 3:
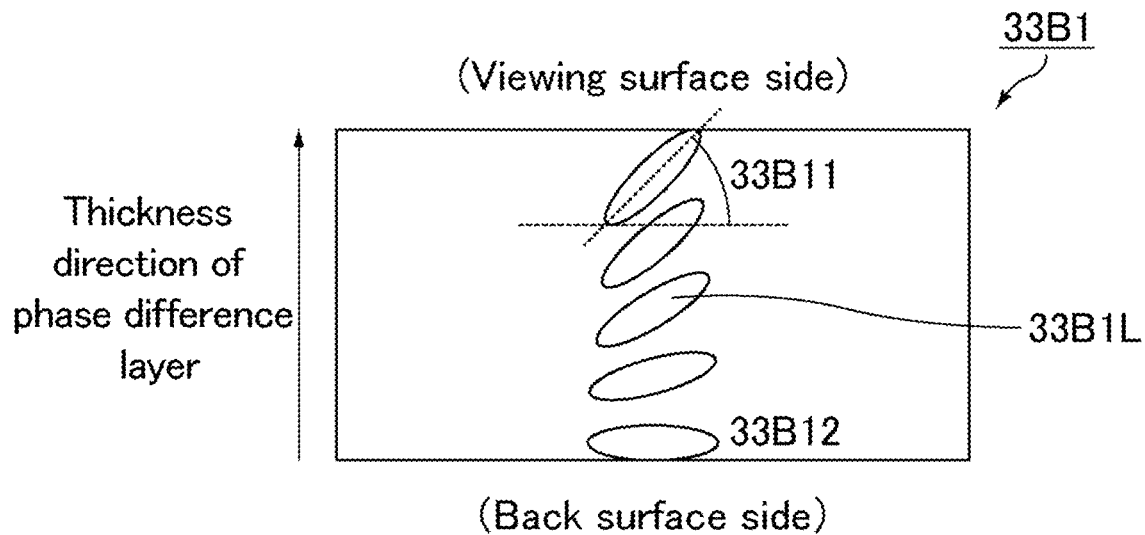
FIG. 3 is a schematic cross-sectional view of a first phase difference layer in a phase difference layer in the optical element of the embodiment.

FIG. 2 is a schematic cross-sectional view of an optical element of an embodiment. FIG. 3 is a schematic cross-sectional view of a first phase difference layer in a phase difference layer in the optical element of the embodiment. FIG. 4 is a schematic cross-sectional view of a second phase difference layer in the phase difference layer in the optical element of the embodiment.

As shown in FIG. 2 to FIG. 4, an optical element 30 of the present embodiment includes, sequentially from the viewing surface side toward the back surface side, a first polarizer 31, a phase difference layer 33B, and a second polarizer 34. The phase difference layer 33B is a laminate of n first phase difference layers 33B1 and m second phase difference layers 33B2. The n first phase difference layers 33B1 and the m second phase difference layers 33B2 are arranged sequentially from the viewing surface side. n and m are each an integer of 1 or greater and are equal to each other. The transmission axis of the first polarizer 31 is parallel to the transmission axis of the second polarizer 34. Each of the n first phase difference layers 33B1 contains first anisotropic molecules 33B1L. In each of the n first phase difference layers 33B1, a tilt angle 33B11 of the first anisotropic molecules 33B1L on the viewing surface side differs from a tilt angle 33B12 of the first anisotropic molecules 33B1L on the back surface side. Each of the m second phase difference layers 33B2 contains second anisotropic molecules 33B2L. In each of the m second phase difference layers 33B2, a tilt angle 33B21 of the second anisotropic molecules 33B2L on the viewing surface side differs from a tilt angle 33B22 of the second anisotropic molecules 33B2L on the back surface side. In a structure where the slow axes of the n first phase difference layers 33B1 lie in a tilt direction of the first anisotropic molecules 33B1L and the slow axes of the m second phase difference layers 33B2 lie in the tilt direction of the second anisotropic molecules 33B2L, each of the slow axes of the n first phase difference layers 33B1 and the slow axes of the m second phase difference layers 33B2 is defined to point from the back surface side long-axis end of each of the first anisotropic molecules 33B1L and the second anisotropic molecules 33B2L as a start point to the viewing surface side long-axis end of each of the first anisotropic molecules 33B1L and the second anisotropic molecules 33B2L as an end point. In a plan view of a main surface of the optical element 30, the slow axes of the n first phase difference layers 33B1 are in the same orientation, the slow axes of the m second phase difference layers 33B2 are in the same orientation, and the slow axes of the n first phase difference layers 33B1 and the slow axes of the m second phase difference layers 33B2 are anti-parallel to each other and are parallel to or perpendicular to the transmission axis of the first polarizer 31. This structure allows the region where the transmittance of oblique light can be reduced to spread in the vicinity of the azimuths in top and bottom directions, whereby oblique light at the azimuths in top and bottom directions can be sufficiently reduced or prevented. As a result, even at azimuths shifted from the azimuths in top and bottom directions, the anti-glare effect and the anti-reflection effect against external light can be sufficiently achieved.

A phase difference layer which contains anisotropic molecules and in which the tilt angle of the anisotropic molecules on the viewing surface side differs from the tilt angle of the anisotropic molecules on the back surface side is also referred to as a splay-aligned phase difference layer.

The azimuth at which side lobe light is generated varies depending on the positions of the ridge lines of the prism sheet(s) in the backlight. For example, as shown in FIG. 5, when a backlight is used that includes a prism sheet 42 in which ridge lines 42x are parallel to an azimuth of 45° (i.e., azimuth 45°-225°) and a prism sheet 42 in which ridge lines 42x are parallel to an azimuth of 135° (i.e., azimuth 135°-315°), side lobe light is generated at azimuths in oblique directions (azimuths of 45°, 135°, 225°, and 315°) as shown by the dashed-line circles in FIG. 6. FIG. 5 includes schematic plan views of the prism sheet in which ridge lines are parallel to an azimuth of 45° and the prism sheet in which ridge lines are parallel to an azimuth of 135°. FIG. 6 shows simulation results of light distribution property of the backlight including the two prism sheets shown in FIG. 5. The simulation results in FIG. 6 include concentric circles depicted with dotted lines. The center of the circles in the simulation results in FIG. 6 indicates a polar angle of 0°, i.e., the result in a case where the optical element is observed from the front. The concentric circles depicted with dotted lines respectively indicate, in order from the inside toward the outside, polar angles of 10°, 20°, 30°, 40°, 50°, 60°, 70°, and 80°. In other words, the outermost circle indicates a polar angle of 80°. Similarly, the simulation results below show the results at from a polar angle of 0° to a polar angle of 80°.

Figure 9:
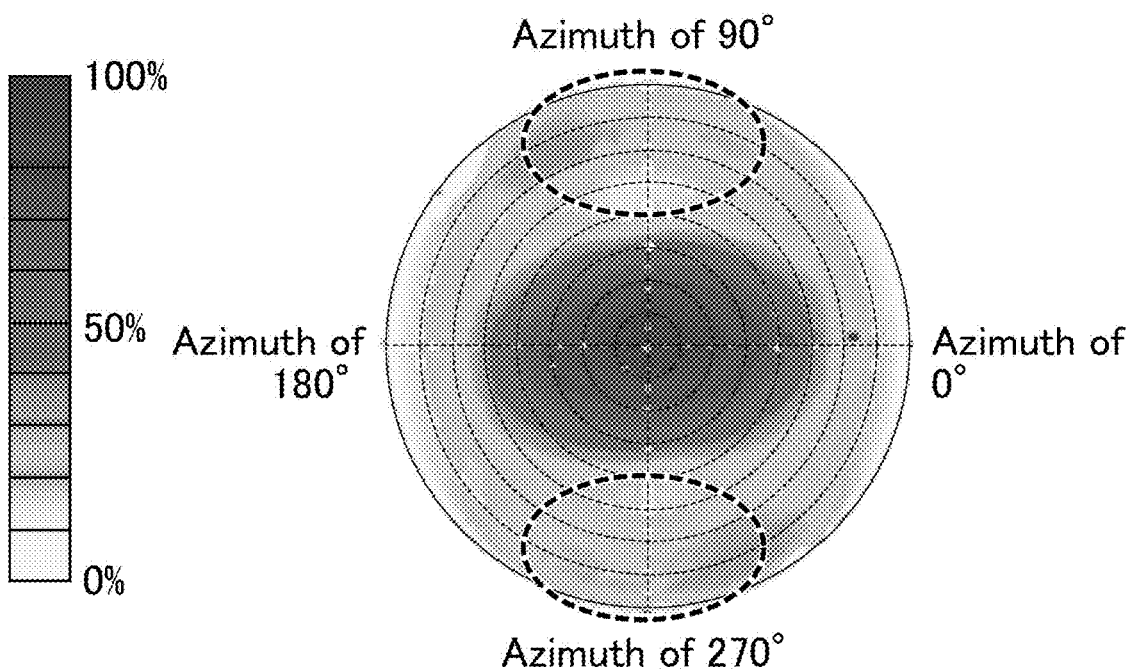
FIG. 9 shows simulation results of light distribution property of a backlight including the one prism sheet shown in FIG. 7.
Figure 10:
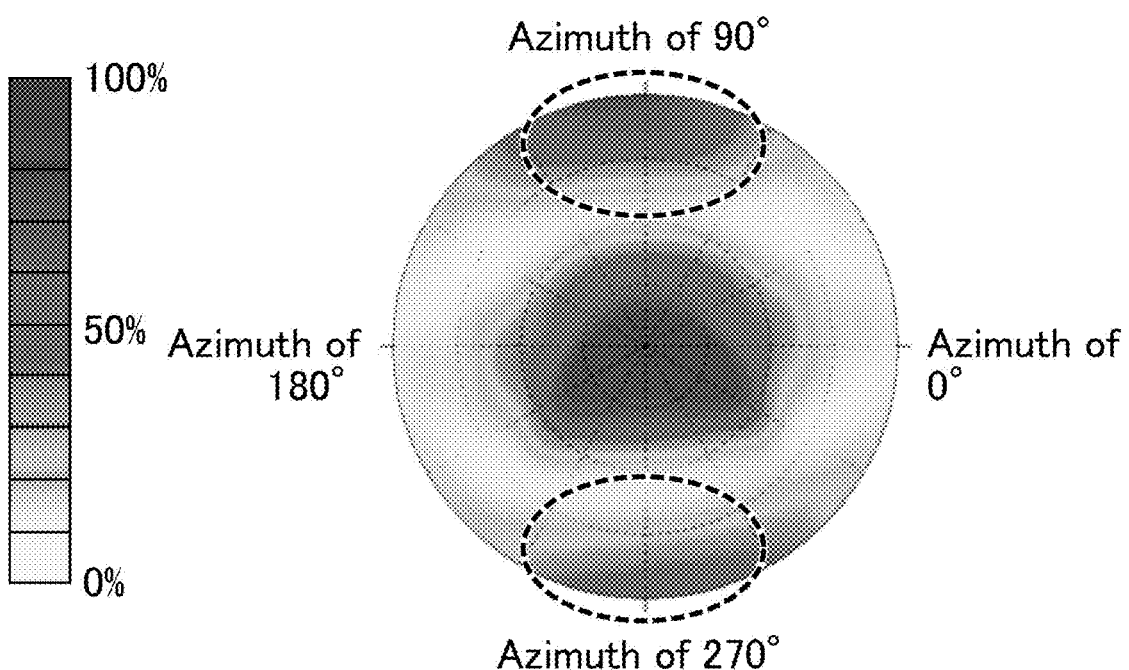
FIG. 10 shows simulation results of light distribution property of a backlight including the two prism sheets shown in FIG. 8.

When, as shown in FIG. 7 and FIG. 8, a backlight is used that includes prism sheet(s) 42 in which ridge lines 42x are parallel to an azimuth of 0° (i.e., azimuth 0°-180°) or to an azimuth of 90° (i.e., azimuth 90°-270°), side lobe light is generated at azimuths in top and bottom directions (azimuths of 90° and 270°) as shown by the dashed-line circles in FIG. 9 and FIG. 10. FIG. 7 is a schematic plan view of one prism sheet in which ridge lines are parallel to an azimuth of 0°. FIG. 8 includes schematic plan views of two prism sheets in each of which ridge lines are parallel to an azimuth of 0°. FIG. 9 shows simulation results of light distribution property of a backlight including the one prism sheet shown in FIG. 7. FIG. 10 shows simulation results of light distribution property of a backlight including the two prism sheets shown in FIG. 8.

Figure 11:
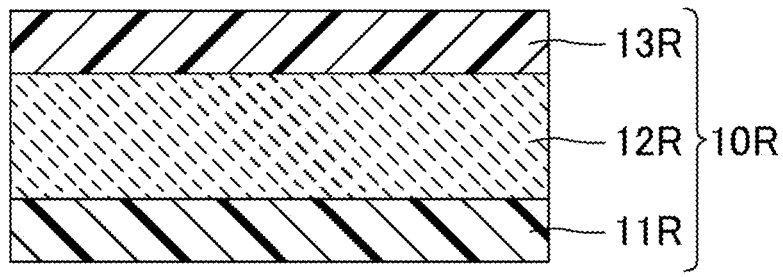
FIG. 11 is a schematic cross-sectional view of an optical element that can reduce the transmittance of oblique light at azimuths in oblique directions.
Figure 12:
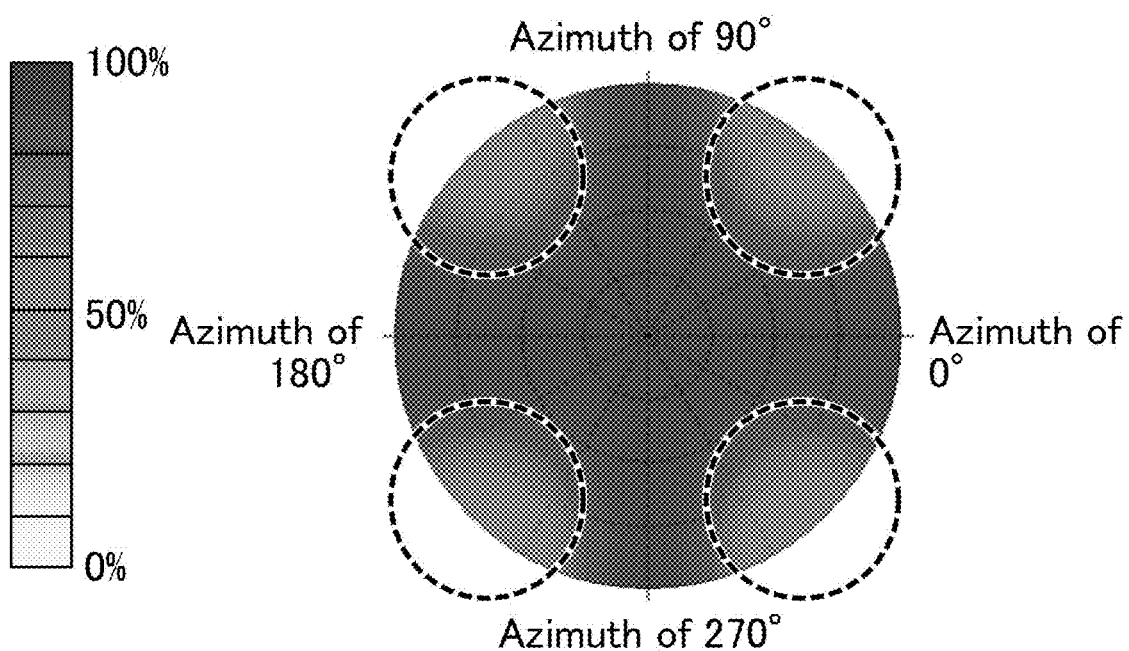
FIG. 12 shows simulation results showing the viewing angle in terms of transmittance of the optical element shown in FIG. 11.

The studies intensively made by the present inventors revealed that an optical element 10R in FIG. 11, i.e., an optical element 10R sequentially including a polarizer 11R, a biaxial phase difference layer 12R, and a polarizer 13R, as shown in FIG. 12, can reduce the transmittance of large-polar-angle light (oblique light) at azimuths in oblique directions (azimuths of 45°, 135°, 225°, and 315°). In addition, the studies revealed that when the optical element 10R is used in combination with the backlight shown in FIG. 5 and FIG. 6, the azimuths and the polar angles at which side lobe light is generated are allowed to match the azimuths and the polar angles at which the optical element 10R can reduce the transmittance, respectively, so that oblique light at azimuths in oblique directions (azimuths of 45°, 135°, 225°, and 315°) can be reduced or prevented. The biaxial phase difference layer 12R can be, for example, a biaxial phase difference layer with a Re of 260 nm and a Nz of 1.6. FIG. 11 is a schematic cross-sectional view of an optical element that can reduce the transmittance of oblique light at azimuths in oblique directions. FIG. 12 shows simulation results showing the viewing angle in terms of transmittance of the optical element shown in FIG. 11.

However, the transmittance of oblique light at azimuths in top and bottom directions (azimuths of 90° and 270°) is difficult to reduce using the optical element 10R shown in FIG. 11 and FIG. 12. Thus, even when the optical element 10R shown in FIG. 11 and FIG. 12 is applied to a backlight in which side lobe light is generated at azimuths in top and bottom directions (azimuths of 90° and 270°) as shown in FIG. 7 to FIG. 10, the azimuths and the polar angles at which side lobe light is generated would not match the azimuths and the polar angles at which the optical element 10R can reduce the transmittance, respectively, meaning that oblique light at azimuths in top and bottom directions cannot be reduced or prevented.

WO 2017/110216 discloses that an optical element including a polarizing plate and a tilt-alignment phase difference film is disposed on the viewing surface side of a display device that emits polarized light, such as a liquid crystal display device, so as to reduce emission of image light at azimuths in top and bottom directions and thereby achieve, when used in a vehicle, the windshield anti-glare effect and anti-reflection effect against external light.

Figure 13:
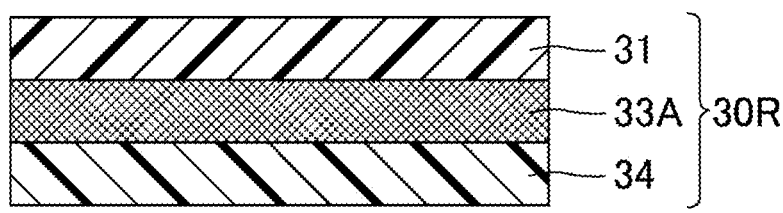
FIG. 13 is a schematic cross-sectional view of an optical element having a similar structure to the optical element of WO 2017/110216.

However, in the optical element in WO 2017/110216, the region where the transmittance of oblique light can be reduced in the vicinity of azimuths in top and bottom directions is very narrow. This point is described using as an example an optical element having a similar structure to the optical element in WO 2017/110216. For example, an optical element 30R in FIG. 13 has a similar structure to the optical element in WO 2017/110216 and includes a first polarizer 31 having an absorption axis parallel to an azimuth of 0°, a phase difference layer 33A having a slow axis parallel to an azimuth of 0°, and a second polarizer 34 having a reflection axis parallel to an azimuth of 0°. The phase difference layer 33A contains anisotropic molecules, and in the phase difference layer 33A, the tilt angle of the anisotropic molecules on the viewing surface side and the tilt angle of the anisotropic molecules on the back surface side are 50°. FIG. 13 is a schematic cross-sectional view of the optical element having a similar structure to the optical element of WO 2017/110216.

Figure 14:
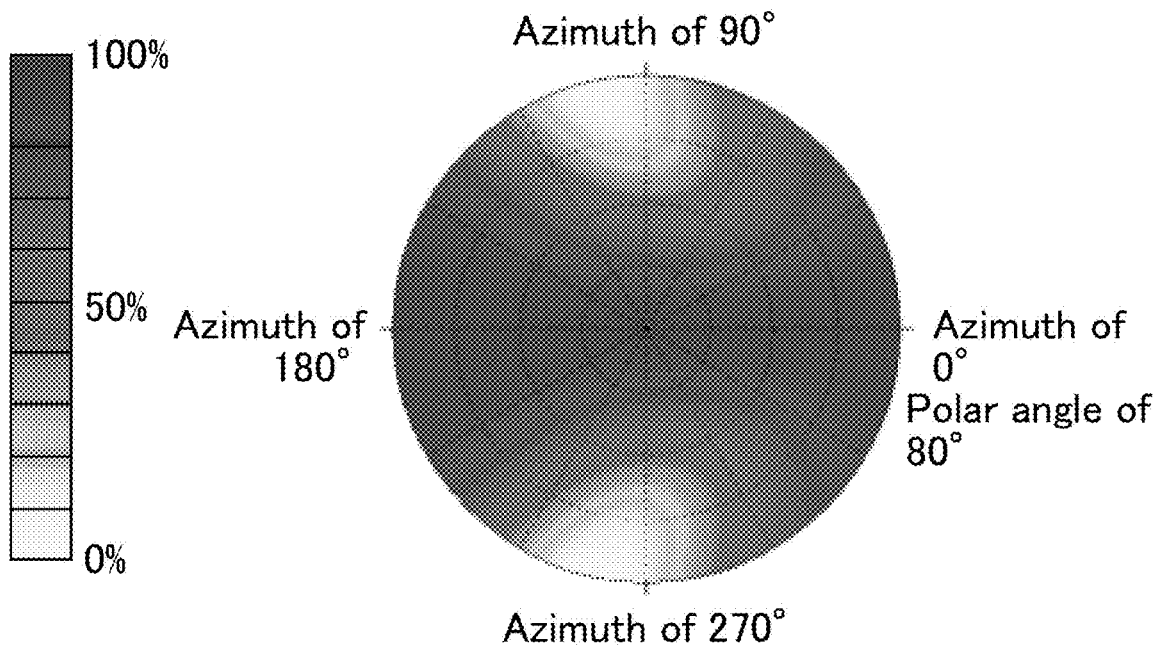
FIG. 14 shows simulation results of the viewing angle in terms of transmittance of the optical element shown in FIG. 13.

According to the simulations of the viewing angle in terms of transmittance of the optical element 30R in FIG. 13, for example, as shown in FIG. 14, regions where the transmittance of oblique light is 20% or lower are very narrow as the vicinity of azimuths of 90° to 120° and the vicinity of azimuths of 240° to 270°. The anti-glare effect and other effects therefore decline at azimuths slightly shifted from the azimuths in top and bottom directions. FIG. 14 shows simulation results of the viewing angle in terms of transmittance of the optical element shown in FIG. 13.

The optical element 30 of the present embodiment includes, sequentially from the viewing surface side toward the back surface side, the first polarizer 31, the phase difference layer 33B, and the second polarizer 34. The phase difference layer 33B is a laminate of n first phase difference layers 33B1 and m second phase difference layers 33B2. The n first phase difference layers 33B1 and the m second phase difference layers 33B2 are arranged sequentially from the viewing surface side. n and m are each an integer of 1 or greater and are equal to each other. The transmission axis of the first polarizer 31 is parallel to the transmission axis of the second polarizer 34. Each of the n first phase difference layers 33B1 contains first anisotropic molecules 33B1L. In each of the n first phase difference layers 33B1, a tilt angle 33B11 of the first anisotropic molecules 33B1L on the viewing surface side differs from a tilt angle 33B12 of the first anisotropic molecules 33B1L on the back surface side. Each of the m second phase difference layers 33B2 contains second anisotropic molecules 33B2L. In each of the m second phase difference layers 33B2, a tilt angle 33B21 of the second anisotropic molecules 33B2L on the viewing surface side differs from a tilt angle 33B22 of the second anisotropic molecules 33B2L on the back surface side. In a structure where the slow axes of the n first phase difference layers 33B1 lie in a tilt direction of the first anisotropic molecules 33B1L and the slow axes of the m second phase difference layers 33B2 lie in the tilt direction of the second anisotropic molecules 33B2L, the slow axes of the n first phase difference layers 33B1 are in the same orientation, the slow axes of the m second phase difference layers 33B2 are in the same orientation, and the slow axes of the n first phase difference layers 33B1 and the slow axes of the m second phase difference layers 33B2 are anti-parallel to each other and are parallel to or perpendicular to the transmission axis of the first polarizer 31. This structure allows the region where the transmittance of oblique light can be reduced to spread in the vicinity of the azimuths in top and bottom directions, whereby oblique light at the azimuths in top and bottom directions can be sufficiently reduced or prevented. As a result, even at azimuths shifted from the azimuths in top and bottom directions, the anti-glare effect and the anti-reflection effect against external light can be sufficiently achieved.

Figure 15:
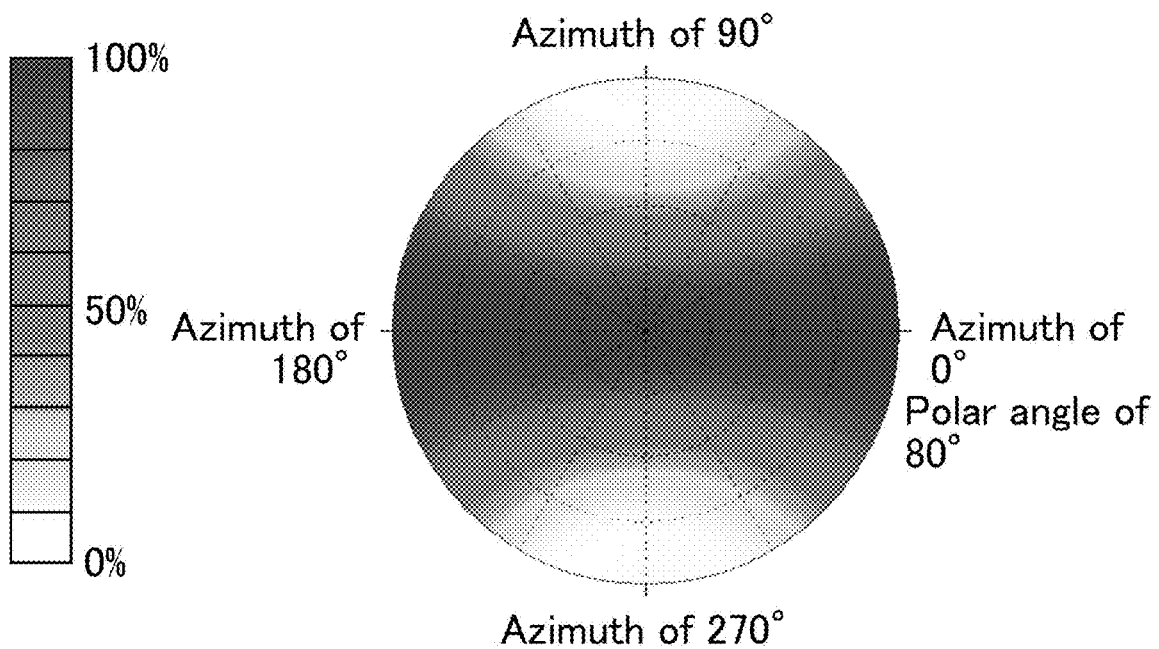
FIG. 15 shows an example of simulation results of the viewing angle in terms of transmittance of the optical element of the embodiment.

For example, as shown in FIG. 15, the region in the optical element 30 of the present embodiment where the transmittance of oblique light is 20% or lower, for example, is as very wide as the vicinity of azimuths of 30° to 150° and the vicinity of azimuths of 210° to 330°. FIG. 15 shows an example of simulation results of the viewing angle in terms of transmittance of the optical element of the embodiment. FIG. 15 specifically shows simulation results in a case where the optical element 30 includes, sequentially from the viewing surface side, the first polarizer 31 (absorptive polarizer) having an absorption axis parallel to an azimuth of 0°, the two first phase difference layers 33B1, the two second phase difference layers 33B2, and the second polarizer 34 (reflective polarizer) having a reflection axis parallel to an azimuth of 0°; the tilt angle 33B11 of the first anisotropic molecules 33B1L on the viewing surface side in each of the first phase difference layers 33B1 and the tilt angle 33B21 of the second anisotropic molecules 33B2L on the viewing surface side in each of the second phase difference layers 33B2 are 70°; the tilt angle 33B12 of the first anisotropic molecules 33B1L on the back surface side in each of the first phase difference layers 33B1 and the tilt angle 33B22 of the second anisotropic molecules 33B2L on the back surface side in each of the second phase difference layers 33B2 are 0°; the slow axes of the first phase difference layers 33B1 are at an azimuth of 180°; and the slow axes of the second phase difference layers 33B2 are at an azimuth of 0°.

Hereinbelow, the tilt angle 33B11 of the first anisotropic molecules 33B1L on the viewing surface side in each of the first phase difference layers 33B1 is also simply referred to as the tilt angle 33B11. The tilt angle 33B12 of the first anisotropic molecules 33B1L on the back surface side in each of the first phase difference layers 33B1 is also simply referred to as the tilt angle 33B12. The tilt angle 33B21 of the second anisotropic molecules 33B2L on the viewing surface side in each of the second phase difference layers 33B2 is also simply referred to as the tilt angle 33B21. The tilt angle 33B22 of the second anisotropic molecules 33B2L on the back surface side in each of the second phase difference layers 33B2 is also simply referred to as the tilt angle 33B22. The tilt angle of anisotropic molecules on the viewing surface side in a phase difference layer is also simply referred to as the tilt angle on the viewing surface side. The tilt angle of anisotropic molecules on the back surface side in a phase difference layer is also simply referred to as the tilt angle on the back surface side.

The optical element 30 functions as an optical louver, and is thus also referred to as a polarizer louver 70. Herein, an optical element including all the components from the first polarizer 31 to the second polarizer 34 is called a polarizer louver.

The first polarizer 31 and the second polarizer 34 each have a transmission axis and an absorption axis or a reflection axis perpendicular to the transmission axis.

The first polarizer 31 and the second polarizer 34 are arranged in parallel Nicols. In other words, the transmission axis (or the absorption axis or the reflection axis) of the first polarizer 31 and the transmission axis (or the absorption axis or the reflection axis) of the second polarizer 34 are parallel to each other.

Herein, the expression that two axes (directions) are "parallel" means an angle (absolute value) formed by the two is within the range of 0°±3°, preferably within the range of 0°±1°, more preferably within the range of 0°±0.5°, particularly preferably 0° (perfectly parallel). The expression that two axes (directions) are "perpendicular" to each other means that the angle (absolute value) formed by the two is within the range of 90°±3°, preferably within the range of 90°±1°, more preferably within the range of 90°±0.5°, particularly preferably 90° (completely perpendicular). Examples of the axes include the transmission axis of a polarizer and the slow axis of a phase difference plate.

The first polarizer 31 and the second polarizer 34 are not limited in terms of their materials or optical performance. Any polarizers such as absorptive polarizers or reflective polarizers can be used as appropriate. Specific examples thereof include an absorptive polarizer obtained by adsorbing a dichroic anisotropic material such as an iodine complex on a polyvinyl alcohol (PVA) film and aligning the material, a reflective polarizer obtained by uniaxially stretching a co-extruded film made of two types of resins (e.g., APCF available from Nitto Denko Corporation, DBEF available from 3M Company), and a reflective polarizer including periodic arrays of metal thin lines (i.e., wire grid polarizer). A laminate of an absorptive polarizer and a reflective polarizer may also be used.

Among these, an absorptive polarizer is suitable for the first polarizer 31, and a reflective polarizer is suitable for the second polarizer 34. In this case, the first polarizer 31 has a transmission axis and an absorption axis perpendicular to the transmission axis. The second polarizer 34 has a transmission axis and a reflection axis perpendicular to the transmission axis.

The optical element 30 may include multiple second polarizers 34. In this case, the transmission axes of the second polarizers 34 are set at substantially the same azimuth.

A protective film (not shown) such as a triacetyl cellulose (TAC) film may be laminated on at least one of the viewing surface side or the back surface side of each of the first polarizer 31 and the second polarizer 34 for sufficient mechanical strength and sufficient moisture and heat resistance. The protective films are attached to the first polarizer 31 and the second polarizer 34 via any suitable bonding layer (not shown).

The "bonding layer" herein means a layer that bonds the surfaces of adjacent components and thereby integrates them with a practically sufficient adhesiveness in a practically sufficient bonding time. Examples of the material of the bonding layer include adhesives and anchor coating agents. The bonding layer may have a multilayer structure in which an anchor coating layer is formed on the surface of a bonding target and a bonding agent layer is formed on the anchor coating layer. The bonding layer may be a thin layer invisible with the naked eye.

As with the "bonding layer", the "adhesive layer" herein is a layer that bonds the surfaces of adjacent components and integrates them with a practically sufficient adhesiveness in a practically sufficient bonding time. One difference from the bonding layer is that the layer itself has adhesiveness and elasticity and thus can bond the objects with a slight pressure applied for a while at room temperature without a chemical reaction caused by a factor such as water, a solvent, or heat. Another difference is that objects attached by a bonding layer cannot be separated, while objects attached by an adhesive layer can be separated. Examples of the material of the adhesive layer include resins including acrylic resin, silicone resin, and urethane resin and rubber materials.

The phase difference layer 33B has a function of utilizing its birefringent material or the like to introduce a phase difference between the perpendicular two polarized light components, thereby changing the state of incident polarized light. The phase difference layer 33B is a laminate of n first phase difference layers 33B1 and m second phase difference layers 33B2 and includes, sequentially from the viewing surface side, the n first phase difference layers 33B1 and the m second phase difference layers 33B2. n and m are each an integer of 1 or greater and are equal to each other.

n and m are each preferably an integer of 1 or greater and 5 or smaller. This structure can more effectively, sufficiently reduce or prevent oblique light at azimuths in top and bottom directions. n and m are each more preferably 1 or greater and 4 or smaller, still more preferably an integer of 1 or greater and 3 or smaller.

Each of the n first phase difference layers 33B1 contains the first anisotropic molecules 33B1L. In each of the first phase difference layers 33B1, the tilt angle 33B11 of the first anisotropic molecules 33B1L on the viewing surface side differs from the tilt angle 33B12 of the first anisotropic molecules 33B1L on the back surface side. Each of the m second phase difference layers 33B2 contains the second anisotropic molecules 33B2L. In each of the second phase difference layers 33B2, the tilt angle 33B21 of the second anisotropic molecules 33B2L on the viewing surface side differs from the tilt angle 33B22 of the second anisotropic molecules 33B2L on the back surface side. Each of the n first phase difference layers 33B1 is also referred to as a splay-aligned phase difference layer. Each of the m second phase difference layers 33B2 is also referred to as a splay-aligned phase difference layer. The expression that two tilt angles differ from each other means that the difference between the two is 10° or more, preferably that the difference between the two is 50° or more and less than 90°, more preferably that the difference between the two is 60° or more and less than 80°.

The first anisotropic molecules 33B1L and the second anisotropic molecules 33B2L are molecules that cause the first phase difference layer 33B1 and the second phase difference layer 33B2 to exhibit birefringence, respectively. Specifically, the first anisotropic molecules 33B1L and the second anisotropic molecules 33B2L, when aligned in specific directions, exhibit anisotropy in light refractive index. Examples of the first anisotropic molecules 33B1L and the second anisotropic molecules 33B2L include polymerizable liquid crystals, cured products of polymerizable liquid crystals, and other liquid crystalline materials.

The tilt angle 33B11 of the first anisotropic molecules 33B1L on the viewing surface side in each of the first phase difference layers 33B1 is preferably 50° or greater and smaller than 90°, more preferably 60° or greater and 80° or smaller. The tilt angle 33B21 of the second anisotropic molecules 33B2L on the viewing surface side in each of the second phase difference layers 33B2 is preferably 50° or greater and smaller than 90°, more preferably 60° or greater and 80° or smaller.

The tilt angle 33B12 of the first anisotropic molecules 33B1L on the back surface side in each of the first phase difference layers 33B1 is preferably 0° or greater and 5° or smaller, more preferably 0° or greater and 2° or smaller. The tilt angle 33B22 of the second anisotropic molecules 33B2L on the back surface side in each of the second phase difference layers 33B2 is preferably 0° or greater and 5° or smaller, more preferably 0° or greater and 2° or smaller.

The slow axes of the first phase difference layers 33B1 lie in the tilt direction of the first anisotropic molecules 33B1L. The slow axes of the second phase difference layers 33B2 lie in the tilt direction of the second anisotropic molecules 33B2L. The slow axis of a phase difference layer is measurable with a phase difference measurement device (e.g., "Axoscan" available from Axometrics Inc.). Axoscan can measure a phase difference, a slow axis, and a tilt angle of anisotropic molecules. Specifically, Axoscan measures a 4×4 matrix (Mueller matrix) containing 16 elements, which represents the polarization state of light, and then analyzes the measured values to determine the phase difference, the slow axis, the tilt angle of the anisotropic molecules, and other properties.

The slow axes of the n first phase difference layers 33B1 are in the same orientation. In other words, the slow axes of the n first phase difference layers 33B1 lie in the tilt direction of the first anisotropic molecules 33B1L. The expression that the slow axes of the n first phase difference layers 33B1 are in the same orientation means that the difference among the axis azimuths of the slow axes of the n first phase difference layers 33B1 is 10° or less, preferably 7° or less, more preferably 5° or less.

The slow axes of the m second phase difference layers 33B2 are in the same orientation. In other words, the slow axes of the m second phase difference layers 33B2 lie in the tilt direction of the second anisotropic molecules 33B2L. The expression that the slow axes of the m second phase difference layers 33B2 are in the same orientation means that the difference among the axis azimuths of the slow axes of the m second phase difference layers 33B2 is 10° or less, preferably 7° or less, more preferably 5° or less.

The slow axes of the n first phase difference layers 33B1 and the slow axes of the m second phase difference layers 33B2 are anti-parallel to each other. The expression that two slow axes are anti-parallel to each other means that the difference between the axis azimuths of the two is 150° or more and 210° or less, preferably 170° or more and 190° or less, more preferably 175° or more and 185° or less.

The slow axes of the n first phase difference layers 33B1 and the slow axes of the m second phase difference layers 33B2 are parallel to or perpendicular to the transmission axis of the first polarizer 31.

With n and m each being 1, the in-plane phase difference of the first phase difference layer 33B1 in a front view is preferably 180 nm or more and 250 nm or less. This structure allows more effective reduction or prevention of oblique light at azimuths in top and bottom directions (e.g., azimuth of 90°). The in-plane phase difference of the first phase difference layer 33B1 in a front view is more preferably 190 nm or more and 240 nm or less, still more preferably 200 nm or more and 230 nm or less.

With n and m each being 1, the in-plane phase difference of the second phase difference layer 33B2 in a front view is preferably 180 nm or more and 250 nm or less. This structure allows more effective reduction or prevention of oblique light at azimuths in top and bottom directions (e.g., azimuth of 90°). The in-plane phase difference of the second phase difference layer 33B2 in a front view is more preferably 190 nm or more and 240 nm or less, still more preferably 200 nm or more and 230 nm or less.

With n and m each being an integer of 2 or greater, the in-plane phase difference of each of the first phase difference layers 33B1 in a front view is preferably 90 nm or more and 125 nm or less. This structure allows more effective reduction or prevention of oblique light at azimuths in top and bottom directions (e.g., azimuth of 90°). The in-plane phase difference of each of the first phase difference layers 33B1 in a front view is more preferably 95 nm or more and 120 nm or less, still more preferably 100 nm or more and 115 nm or less.

With n and m each being an integer of 2 or greater, the in-plane phase difference of each of the second phase difference layers 33B2 in a front view is preferably 90 nm or more and 125 nm or less. This structure allows more effective reduction or prevention of oblique light at azimuths in top and bottom directions (e.g., azimuth of 90°). The in-plane phase difference of each of the second phase difference layers 33B2 in a front view is more preferably 95 nm or more and 120 nm or less, still more preferably 100 nm or more and 115 nm or less.

At least one of the first phase difference layers 33B1 or the second phase difference layers 33B2, for example, preferably contains a cured product of polymerizable liquid crystals. A reactive mesogen layer (coating phase difference layer) containing a cured product of polymerizable liquid crystals (reactive mesogens), for example, is formable by applying polymerizable liquid crystals to an alignment film having undergone an alignment treatment, followed by curing the polymerizable liquid crystals by firing, photoirradiation, or another method. The polymerized liquid crystals after the curing are aligned at the alignment azimuths of the alignment film defined by the alignment treatment to exhibit a phase difference. Adjusting the type of the polymerizable liquid crystals, the firing conditions, the photoirradiation conditions, and other conditions enables control of the tile angle of the first anisotropic molecules 33B1L and the second anisotropic molecules 33B2L. Such a coating phase difference layer is advantageous in that it can be made thinner than a phase difference film including a resin film.

Examples of the alignment film used for a coating phase difference layer include those common in the field of liquid crystal display panels, such as polyimide films. An alignment film is formable by applying a solution to a base material, followed by curing the solution by firing, photoirradiation, or another method. The alignment treatment for the alignment film can be rubbing, photoirradiation, or another treatment.

The polymerizable liquid crystals are not limited, and are suitably of a liquid crystalline polymer having a photoreactive group. Polymerizable liquid crystals of a liquid crystalline polymer having a photoreactive group can be aligned by polarized light irradiation, for example. This allows formation of a coating phase difference layer without an alignment film as a base material. Also, a coating phase difference layer formed using a liquid crystalline polymer having a photoreactive group can be imparted with different optic axis directions between its inside and surface by rubbing or other treatment, and thus can function also as an alignment film. This allows, on the coating phase difference layer formed using the liquid crystalline polymer having a photoreactive group, direct formation of another coating phase difference layer without an alignment film in between. As described above, formation of a coating phase difference layer using a liquid crystalline polymer having a photoreactive group allows omission of an alignment film, thus thinning the optical element and simplifying the production steps.

Examples of the liquid crystalline polymer having a photoreactive group include polymers each having a structure with both a mesogen group and a photoreactive group in its side chain and having an acrylate, methacrylate, maleimide, N-phenylmaleimide, or siloxane, or another structure in its main chain. The mesogen group may be a biphenyl group, a terphenyl group, a naphthalene group, a phenylbenzoate group, an azobenzene group, or a derivative of any of these groups, which are often used as a mesogen component of a liquid crystalline polymer. The photoreactive group may be a cinnamoyl group, a chalcone group, a cinnamylidene group, a β-(2-phenyl)acryloyl group, a cinnamic acid group, or a derivative of any of these groups.

The liquid crystalline polymer may be a homopolymer consisting of a single repeat unit or may be a copolymer consisting of two or more repeat units different in side chain structure. The copolymer encompasses all of alternating copolymers, random copolymers, graft copolymers. In the copolymer above, a side chain of at least one repeat unit has a structure including both the mesogen group and the photoreactive group, and a side chain of any other repeat unit may not have the mesogen group or the photoreactive group.

Preferred specific examples of the liquid crystalline polymer include copolymerizable (meth)acrylic acid polymers having a repeat unit represented by the following general formula (I).

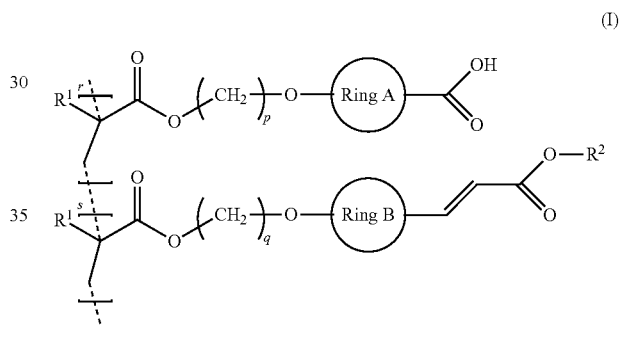

In the formula above, $R^1$ is a hydrogen atom or a methyl group; $R^2$ is an alkyl group, or a phenyl group substituted by a group selected from an alkyl group, an alkoxy group, a cyano group, and a halogen atom; ring A and ring B are each independently a group represented by any one of the following general formulas (M1) to (M5); p and q are each independently an integer of 1 to 12; and r and s are each a mole ratio of a monomer in a copolymer satisfying the relationships $0.65 \le r \le 0.95$, $0.05 \le s \le 0.35$, and $r+s=1$.

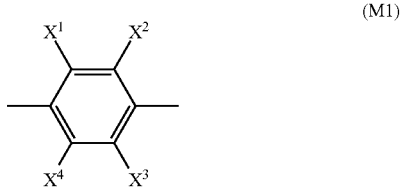

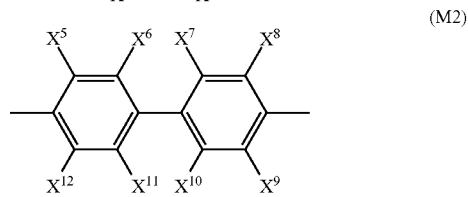

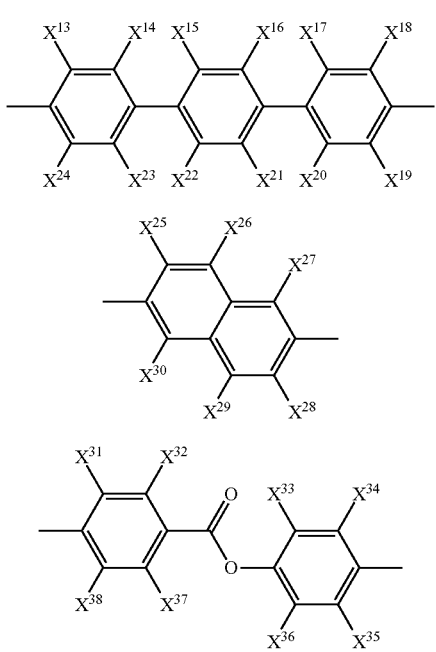

(M3)

(M4)

(M5)

In the formulas above, $X^1$ to $X^{38}$ are each independently a hydrogen atom, an alkyl group, an alkoxy group, a halogen atom, or a cyano group.

Preferably, the liquid crystalline polymer is a copolymerizable (meth)acrylic acid polymer having a repeat unit represented by the following general formula (I-a).

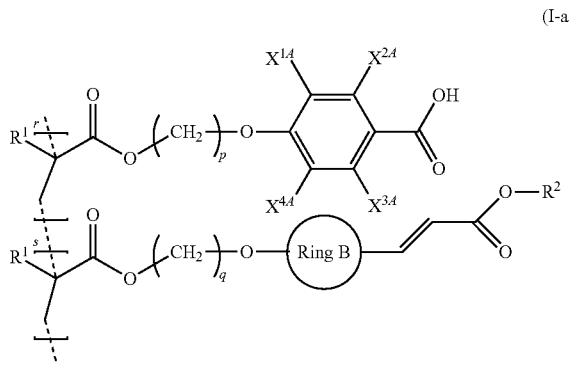

(I-a)

In the formula above, $R^1$ is a hydrogen atom or a methyl group; $R^2$ is an alkyl group, or a phenyl group substituted by a group selected from an alkyl group, an alkoxy group, a cyano group, and a halogen atom; $X^{1A}$ to $X^{4A}$ are each independently a hydrogen atom, an alkyl group, an alkoxy group, a halogen atom, or a cyano group; ring B is a group represented by the following general formula (M1a) or (M5a); p and q are each independently an integer of 1 to 12; and r and s are each a mole ratio of a monomer in a copolymer satisfying the relationships $0.65 \leq r \leq 0.95$, $0.05 \leq s \leq 0.35$, and $r+s=1$.

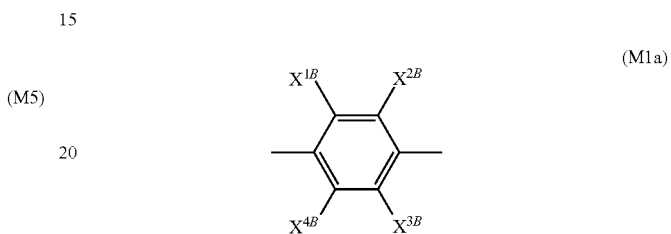

(M1a)

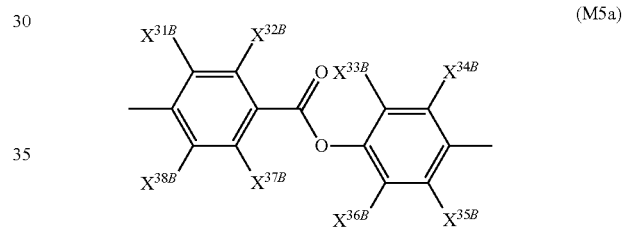

(M5a)

In the formulas above, $X^{1B}$ to $X^{4B}$ and $X^{31B}$ to $X^{38B}$ are each independently a hydrogen atom, an alkyl group, an alkoxy group, a halogen atom, or a cyano group.

In addition, the liquid crystalline polymer is more preferably a copolymerizable (meth)acrylic acid polymer having a repeat unit represented by the following general formula (I-b) or (I-c).

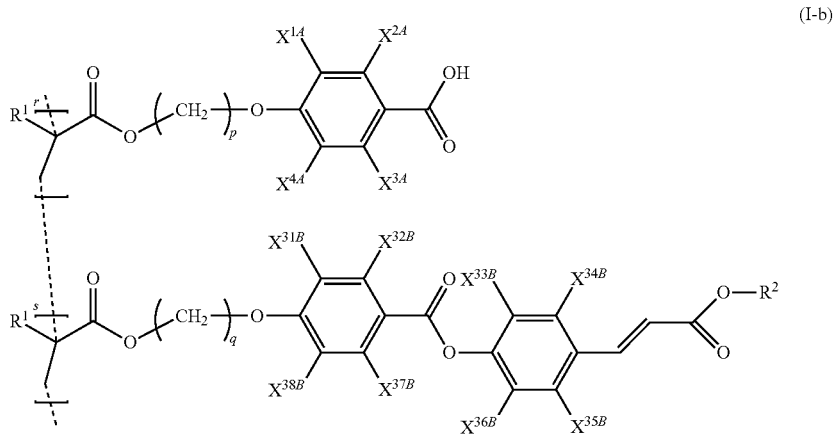

(I-b)

In the formula above, $R^1$ is a hydrogen atom or a methyl group; $R^2$ is an alkyl group, or a phenyl group substituted by a group selected from an alkyl group, an alkoxy group, a cyano group, and a halogen atom; $X^{1A}$ to $X^{4A}$ and $X^{31B}$ to $X^{38B}$ are each independently a hydrogen atom, an alkyl group, an alkoxy group, a halogen atom, or a cyano group; p and q are each independently an integer of 1 to 12; and r and s are each a mole ratio of a monomer in a copolymer satisfying the relationships $0.65 \leq r \leq 0.95$, $0.05 \leq s \leq 0.35$, and $r+s=1$.

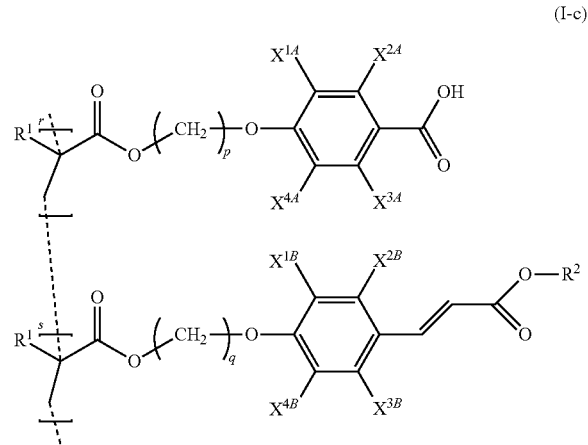

(I-c)

In the formula above, $R^1$ is a hydrogen atom or a methyl group; $R^2$ is an alkyl group, or a phenyl group substituted by a group selected from an alkyl group, an alkoxy group, a cyano group, and a halogen atom; $X^{1A}$ to $X^{4A}$ and $X^{1B}$ to $X^{4B}$ are each independently a hydrogen atom, an alkyl group, an alkoxy group, a halogen atom, or a cyano group; p and q are each independently an integer of 1 to 12; and r and s are each a mole ratio of a monomer in a copolymer satisfying the relationships $0.65 \leq r \leq 0.95$, $0.05 \leq s \leq 0.35$, and $r+s=1$.

In the general formula (I) (including the general formula (I-a), the general formula (I-b), and the general formula (I-c); the same holds for the following formulas), $R^1$ is preferably a methyl group; $R^2$ is preferably an alkyl group, or a phenyl group substituted by a group selected from an alkyl group, an alkoxy group, a cyano group, and a halogen atom, more preferably an alkyl group or a phenyl group substituted by an alkoxy group or a cyano group, particularly preferably an alkyl group or a phenyl group substituted by an alkoxy group.

$X^{31B}$ to $X^{38B}$ are each preferably a hydrogen atom or a halogen atom, and a case is most preferable where all of $X^{31B}$ to $X^{38B}$ are hydrogen atoms.

p and q are each preferably an integer of 3 to 9, preferably an integer of 5 to 7, most preferably 6. r is preferably in the range of $0.75 \leq r \leq 0.85$, most preferably 0.8. Correspondingly, s is preferably in the range naturally derived from the relationship $r+s=1$. In other words, s is preferably in the range of $0.15 \leq s \leq 0.25$, most preferably 0.2.

In the general formula (I-a), (I-b), or (I-c), $X^{1A}$ to $X^{4A}$ are each preferably a hydrogen atom or a halogen atom, and a case is particularly preferred where one of $X^{1A}$ to $X^{4A}$ is a halogen atom and the others are hydrogen atoms or where all of $X^{1A}$ to $X^{4A}$ are hydrogen atoms. In the general formula (I-b), $X^{31B}$ to $X^{38B}$ are each preferably a hydrogen atom or a halogen atom, and a case is most preferred where all of $X^{31B}$ to $X^{38B}$ are hydrogen atoms. In the general formula (I-c), $X^{1B}$ to $X^{4B}$ are each preferably a hydrogen atom or a halogen atom, and a case is most preferred where all of $X^{1B}$ to $X^{4B}$ are hydrogen atoms.

Examples of the alkyl group in $R^2$ or the alkyl group in the substituent of the phenyl group in $R^2$ include C1-C12 alkyl groups. Among these, preferred is a C1-C6 alkyl group, more preferred is a C1-C4 alkyl group, and most preferred is a methyl group. Examples of the alkoxy group in the substituent of the phenyl group in $R^2$ include C1-C12 alkoxy groups. Among these, preferred is a C1-C6 alkoxy group, more preferred is a C1-C4 alkoxy group, and most preferred is a methoxy group. Examples of the halogen group in the substituent of the phenyl group in $R^2$ include fluorine, chlorine, bromine, and iodine atoms, among which a fluorine atom is preferred.

Examples of the alkyl group in $X^1$ to $X^{38}$ include C1-C4 alkyl groups, among which a methyl group is most preferred. Examples of the alkoxy group in $X^1$ to $X^{38}$ include C1-C4 alkoxy groups, among which a methoxy group is most preferred. Examples of the halogen atom in $X^1$ to $X^{38}$ include fluorine, chlorine, bromine, and iodine atoms, among which a fluorine atom is preferred.

Herein, $X^{1A}$ to $X^{38A}$ indicate that $X^1$ to $X^{38}$, which are substituents on ring A or ring B, are those on ring A, and $X^{1B}$ to $X^{38B}$ indicate that $X^1$ to $X^{38}$ are those on ring B. Thus, description relating to $X^1$ to $X^{38}$ is directly applicable to $X^{1A}$ to $X^{38A}$ and $X^{1B}$ to $X^{38B}$.

The liquid crystalline polymer can be dissolved in a solvent to be used as a phase difference layer composition. The phase difference layer composition may appropriately be mixed with a photopolymerization initiator, a surfactant, and a component usually included in a polymerizable composition that is polymerizable by light or heat.

Examples of the solvent used for the phase difference layer composition include toluene, ethylbenzene, ethylene glycol monomethyl ether, ethylene glycol dimethyl ether, propylene glycol methyl ether, dibutyl ether, acetone, methyl ethyl ketone, ethanol, propanol, cyclohexane, cyclopentanone, methylcyclohexane, tetrahydrofuran, dioxane, cyclohexanone, n-hexane, ethyl acetate, butyl acetate, propylene glycol methyl ether acetate, methoxy butyl acetate, N-methyl pyrrolidone, and dimethylacetamide.

The photopolymerization initiator can be any known general photopolymerization initiator used to form a uniform film by application of a small amount of light. Specific examples thereof include azonitrile-based photopolymerization initiators such as 2,2'-azobisisobutyronitrile and 2,2'-azobis(2,4-dimethylvaleronitrile); α-amino ketone-based photopolymerization initiators such as IRGACURE 907 (available from Ciba Specialty Chemicals Inc.) and IRGACURE 369 (available from Ciba Specialty Chemicals Inc.); acetophenone-based photopolymerization initiators such as 4-phenoxydichloro acetophenone and 4-t-butyldichloroacetophenone; benzoin-based photopolymerization initiators such as benzoin and benzoin methyl ether; benzophenone-based photopolymerization initiators such as benzophenone and benzoylbenzoic acid; thioxanthone-based photopolymerization initiators such as 2-chlorothioxanthone and 2-methylthioxanthone; triazine-based photopolymerization initiators such as 2,4,6-trichloro-s-triazine and 2-phenyl-4,6-bis(trichloromethyl)-s-triazine; carbazole-based photopolymerization initiators, and imidazole-based photopolymerization initiators. Any of these photopolymerization initiators may be used alone or two or more of these may be used in combination.

The surfactant can be any surfactant generally used to form a uniform film. Specific examples thereof include anionic surfactants such as sodium lauryl sulfate and ammonium lauryl sulfate; nonionic surfactants such as polyethylene glycol monolaurate and sorbitan stearate; cationic surfactants such as stearyltrimethylammonium chloride and behenyltrimethylammonium chloride; amphoteric surfactants such as alkyl betaines including lauryl betaine and alkyl sulfobetaine, alkyl imidazoline, and sodium lauroyl sarcosinate; and surfactants such as BYK-361, BYK-306, BYK-307 (available from BYK Japan KK), Fluorad FC430 (available from Sumitomo 3M Limited), and Megaface F171 and R08 (available from DIC Corporation). Any of these surfactant may be used alone or two or more of these may be used in combination.

Hereinbelow, a display device including the optical element 30 of the present embodiment is described in detail.

Figure 16:
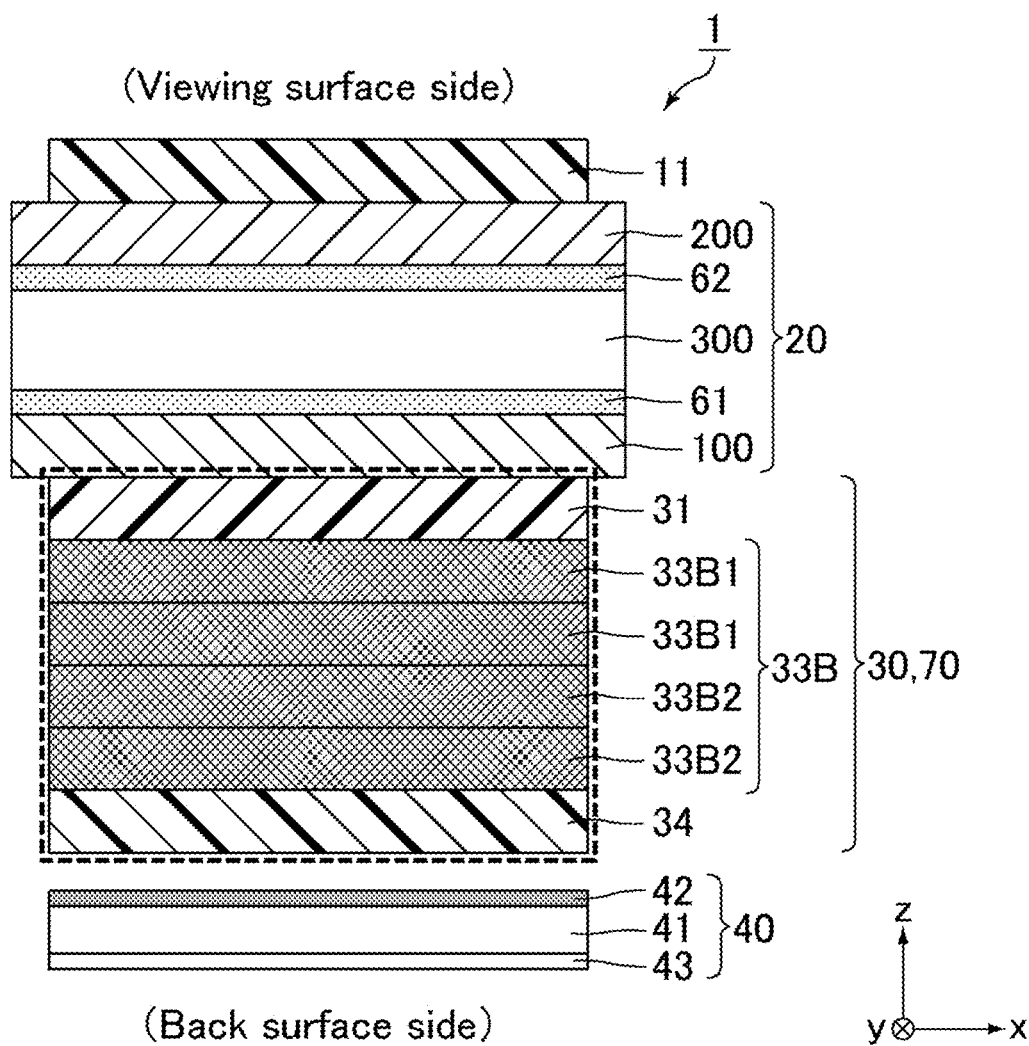
FIG. 16 is a schematic cross-sectional view of a display device of the embodiment.

FIG. 16 is a schematic cross-sectional view of a display device of the embodiment. A display device 1 shown in FIG. 16 includes, sequentially from the viewing surface side toward the back surface side, a viewing surface side polarizer 11, a liquid crystal panel 20 as a display panel, an optical element 30 shown in FIG. 2 to FIG. 4, and a backlight 40.

The viewing surface side polarizer 11 has a transmission axis and an absorption axis or a reflection axis perpendicular to the transmission axis.

The viewing surface side polarizer 11 and a first polarizer 31 are arranged in crossed Nicols or parallel Nicols. For achievement of a high contrast ratio, the viewing surface side polarizer 11 and the first polarizer 31 are preferably arranged in crossed Nicols. The state where the viewing surface side polarizer 11 and the first polarizer 31 are arranged in crossed Nicols means a state where the transmission axis (or the absorption axis or the reflection axis) of the viewing surface side polarizer 11 and the transmission axis (or the absorption axis or the reflection axis) of the first polarizer 31 are perpendicular to each other. The state where the viewing surface side polarizer 11 and the first polarizer 31 are arranged in parallel Nicols means a state where the transmission axis (or the absorption axis or the reflection axis) of the viewing surface side polarizer 11 and the transmission axis (or the absorption axis or the reflection axis) of the first polarizer 31 are parallel to each other.

The viewing surface side polarizer 11 is not limited in terms of its material and optical performance and can appropriately be, for example, an absorptive polarizer or a reflective polarizer.

In particular, an absorptive polarizer is suitable as the viewing surface side polarizer 11. In this case, the viewing surface side polarizer 11 has a transmission axis and an absorption axis perpendicular to the transmission axis.

For sufficient mechanical strength and moist heat resistance, at least one of the viewing surface side or the back surface side of the viewing surface side polarizer 11 may be laminated with a protective film (not shown) such as a triacetyl cellulose (TAC) film. The protective film is attached to the viewing surface side polarizer 11 via any appropriate bonding layer (not shown).

The optical element 30 is usually attached to the liquid crystal panel 20 via an adhesive layer (not shown).

Preferably, the first polarizer 31 is an absorptive polarizer or a laminate of an absorptive polarizer and a reflective polarizer, and the second polarizer 34 is a reflective polarizer or a laminate of an absorptive polarizer and a reflective polarizer. This structure allows side lobe light from the backlight 40 not to be absorbed but to be once reflected toward the backlight 40 for recycling of light between the second polarizer 34 and a reflector 43 of the backlight 40. As a result, the front luminance can be further increased. In this case, the first polarizer 31 has a transmission axis and an absorption axis perpendicular to the transmission axis. The second polarizer 34 has a transmission axis and a reflection axis perpendicular to the transmission axis.

When the first polarizer 31 is a laminate of multiple polarizers, the transmission axes of the polarizers are preferably parallel to one another. Similarly, when the second polarizer 34 is a laminate of multiple polarizers, the transmission axes of the polarizers are preferably parallel to one another.

A diffuser plate is preferably disposed between the second polarizer 34 and the backlight 40. This structure allows an increase in use efficiency of light emitted from the backlight 40.

Figure 17:
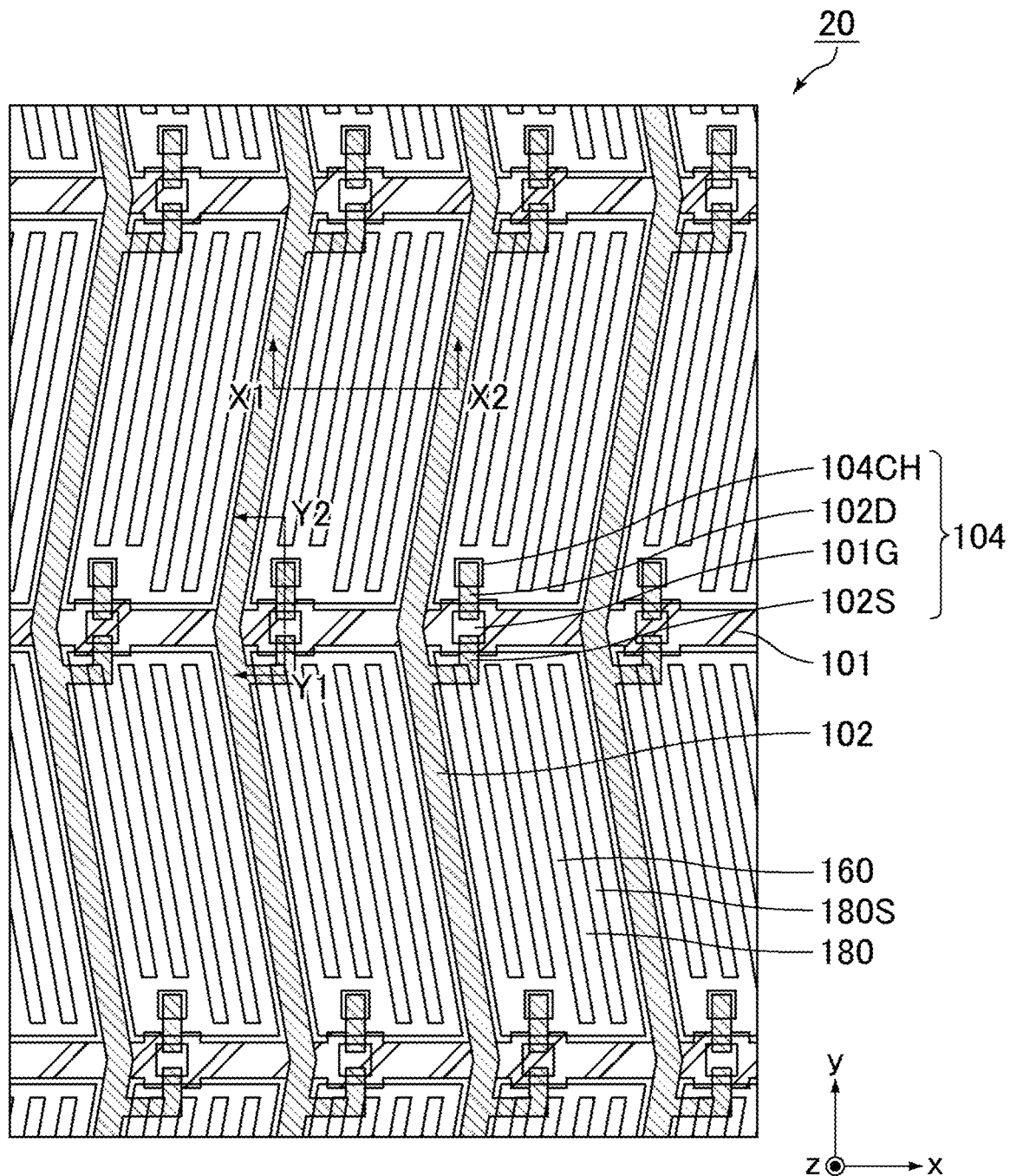
FIG. 17 is a schematic plan view showing the pixel structure of a TFT substrate in the display device of the embodiment.
Figure 18:
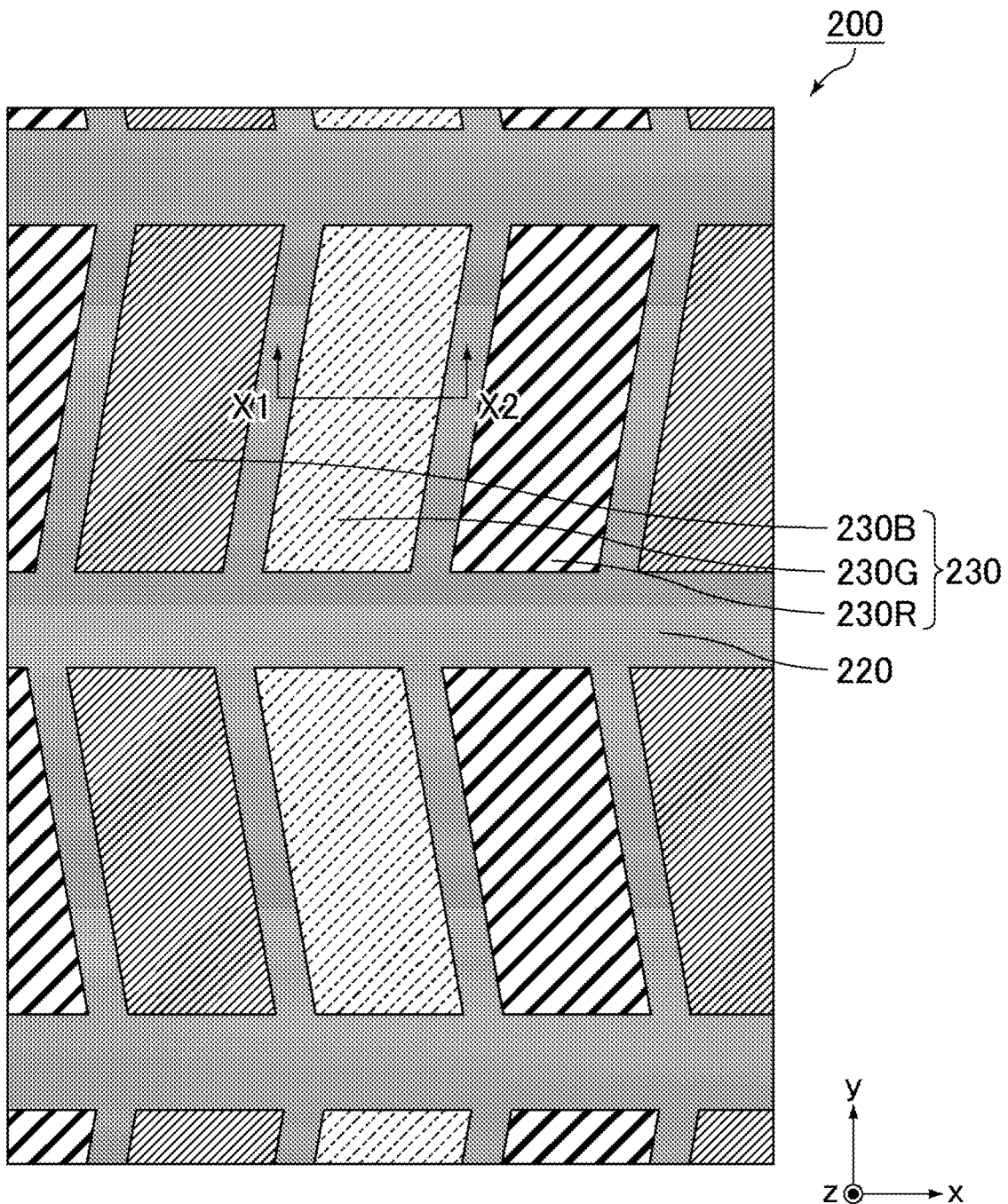
FIG. 18 is a schematic plan view showing the pixel structure of a CF substrate in the display device of the embodiment.
Figure 19:
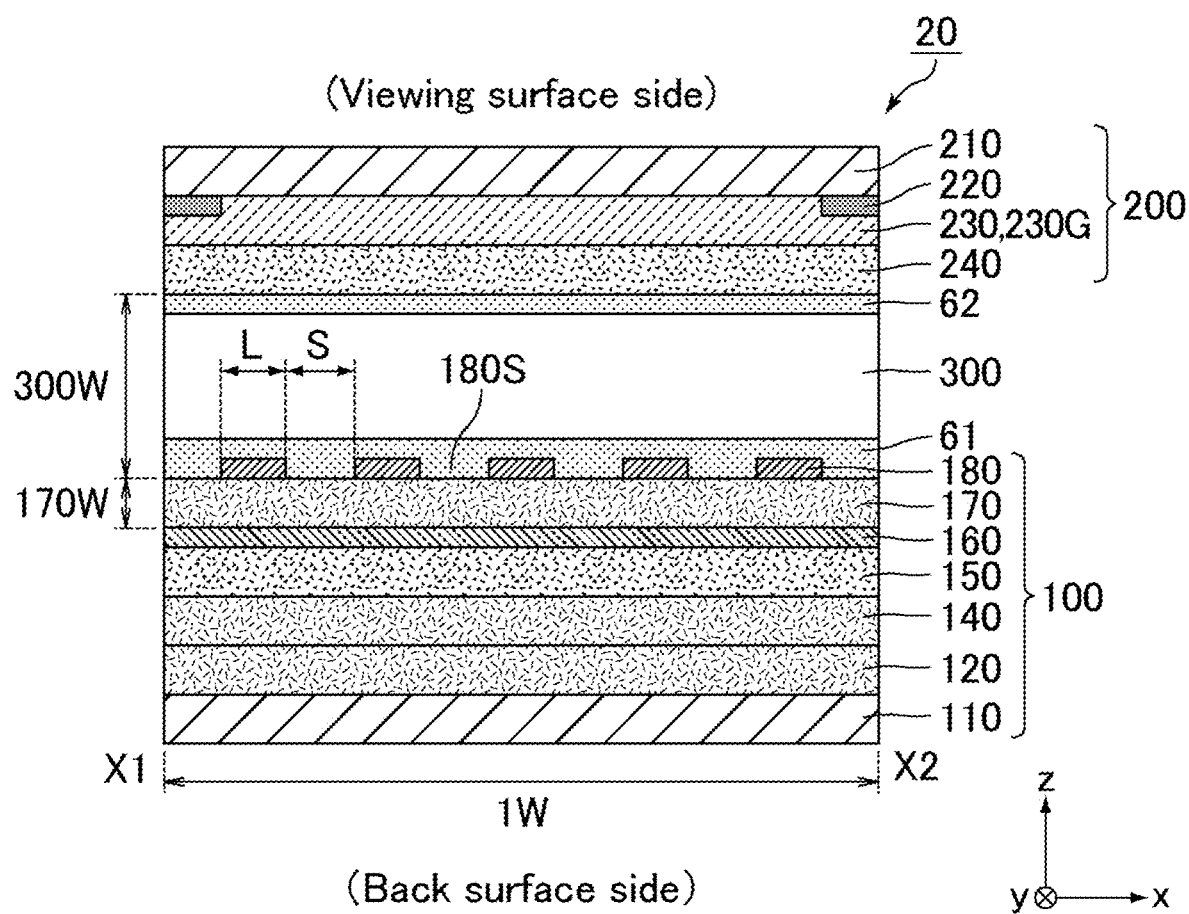
FIG. 19 is a schematic cross-sectional view of a liquid crystal panel in the display device of the embodiment, taken along line X1-X2 in FIG. 17 and FIG. 18.
Figure 20:
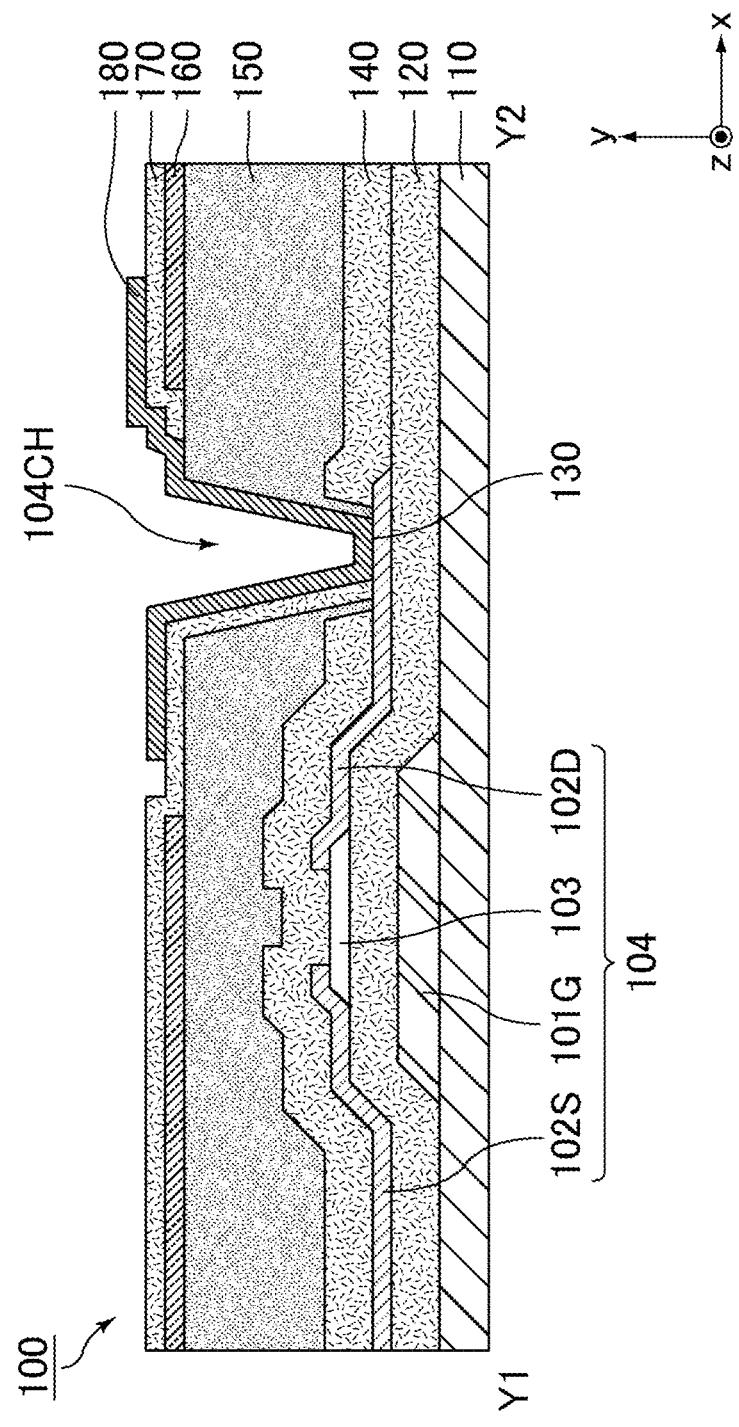
FIG. 20 is a schematic cross-sectional view of the TFT substrate in the display device of the embodiment, taken along line Y1-Y2 in FIG. 17.

FIG. 17 is a schematic plan view showing the pixel structure of a TFT substrate in the display device of the embodiment. FIG. 18 is a schematic plan view showing the pixel structure of a CF substrate in the display device of the embodiment. FIG. 19 is a schematic cross-sectional view of a liquid crystal panel in the display device of the embodiment, taken along line X1-X2 in FIG. 17 and FIG. 18. FIG. 20 is a schematic cross-sectional view of the TFT substrate in the display device of the embodiment, taken along line Y1-Y2 in FIG. 17. FIG. 17 and FIG. 18 are each a schematic plan view from the viewing surface side.

As shown in FIG. 19, the liquid crystal panel 20 of the present embodiment includes, sequentially from the back surface side toward the viewing surface side, a thin-film transistor (TFT) substrate 100, a first alignment film 61, a liquid crystal layer 300, a second alignment film 62, and a color filter (CF) substrate 200.

As shown in FIG. 17 and FIG. 20, the TFT substrate 100 is a substrate provided with thin-film transistors 104 that are switching elements each used to turn on and off a pixel of the display device 1. In the present embodiment, the structure of the TFT substrate 100 for the FFS mode will be described. The TFT substrate 100 is also applicable in other horizontal electric field modes such as the in-plane-switching (IPS) mode.

The TFT substrate 100 has TFTs 104, and includes, sequentially from the back surface side toward the viewing surface side, a supporting substrate 110, gate lines 101, a gate insulating film 120, source lines 102, a source insulating film 140, a planarizing film 150, a common electrode 160, an interlayer insulating film 170, and pixel electrodes (signal electrodes) 180. In such a structure, application of voltage between the common electrode 160 and the pixel electrodes 180 forming paired electrodes generates a horizontal electric field (fringe electric field) in the liquid crystal layer 300. Therefore, adjusting the voltage applied between the common electrode 160 and the pixel electrodes 180 can control the alignment of liquid crystal molecules in the liquid crystal layer 300.

The TFT substrate 100 includes, on the supporting substrate 110, gate lines 101 extending parallel to each other and source lines 102 extending parallel to each other in a direction intersecting the gate lines 101 via the gate insulating film 120. The gate lines 101 and the source lines 102 are arranged in a grid pattern as a whole to define pixels. The TFTs 104 as switching elements are disposed at the respective intersections of the gate lines 101 and the source lines 102.

Each TFT 104 is a three-terminal switch connected to the corresponding gate line 101 and the corresponding source line 102 forming the intersection among the gate lines 101 and the source lines 102. The three-terminal switch includes a gate electrode 101G (part of the gate line 101) protruding from the gate line 101, a source electrode 102S (part of the source line 102) protruding from the source line 102, a drain electrode 102D connected to the corresponding pixel electrode 180 among the pixel electrodes 180, and a thin-film semiconductor layer 103. The source electrode 102S and the drain electrode 102D are provided in the same source line layer 130 as the source line 102. The gate electrode 101G is provided in the same gate line layer as the gate line 101. Each pixel electrode 180 is connected to the corresponding drain electrode 102D through a contact hole 104CH provided in the interlayer insulating film 170, the common electrode 160, the planarizing film 150, and the source insulating film 140.

The thin-film semiconductor layer 103 of each TFT 104 is composed of, for example, a high-resistance semiconductor layer made of amorphous silicon, polysilicon, or the like, and a low-resistance semiconductor layer made of n+ amorphous silicon, which is amorphous silicon doped with an impurity such as phosphorus. Alternatively, an oxide semiconductor layer made of zinc oxide, for example, may be used as the thin-film semiconductor layer 103.

The TFT 104 includes, for example, a channel having a known structure and including a semiconductor layer made of an oxide semiconductor material such as indium gallium zinc oxide (IGZO).

The supporting substrate 110 is preferably a transparent substrate such as a glass substrate or a plastic substrate.

The gate insulating film 120, the source insulating film 140, and the interlayer insulating film 170 are inorganic insulating films, for example. The inorganic insulating films used may be, for example, inorganic films (relative dielectric constant F=5 to 7) such as silicon nitride (SiNx) films or silicon oxide ($SiO_2$) films, or laminated films thereof. The gate insulating film 120 and the source insulating film 140 are silicon oxide inorganic films, for example. The interlayer insulating film 170 is, for example, a silicon nitride inorganic film, and has a film thickness 170W of 0.2 µm, for example.

The gate line layer and the source line layer 130 each include, for example, a single layer or multiple layers of a metal such as copper, titanium, aluminum, molybdenum, or tungsten, or an alloy of any of these. Various lines and electrodes constituting the gate lines 101, the source lines 102, and the TFTs 104 are formed by depositing a metal such as copper, titanium, aluminum, molybdenum, or tungsten, or an alloy of any of these, in a single layer or multiple layers by a method such as sputtering, followed by patterning by a method such as photolithography. Use of the same material for those formed in the same layer, among these various lines and electrodes, increases the production efficiency.

The planarizing film 150 planarizes the liquid crystal layer 300 side surface of the TFT 104 in the TFT substrate 100. The planarizing film 150 used may be, for example, an organic insulating film (relative dielectric constant ε=3 to 4). A specific example thereof is an acrylic resin film. The planarizing film 150 is formed by, for example, applying a photocurable resin, followed by UV irradiation and firing.

The common electrode 160 is an electrode formed on almost the entire surface regardless of the pixel boundaries, excluding specific portions such as the connecting portion (contact hole 104CH) between the pixel electrode 180 and the drain electrode 102D. A common signal maintained at a constant value is supplied to the common electrode 160, and the common electrode 160 is maintained at a constant potential.

The pixel electrode 180 is an electrode disposed in each region surrounded by two gate lines 101 adjacent to each other and two source lines 102 adjacent to each other. The pixel electrode 180 is electrically connected to the corresponding source line 102 via the thin-film semiconductor layer 103 in the TFT 104. The pixel electrode 180 is set to have a potential corresponding to the data signal supplied via the corresponding TFT 104. The width 1W of each pixel provided with a single pixel electrode 180 is, for example, 28 µm.

As shown in FIG. 17 and FIG. 19, the pixel electrode 180 is provided with slits 180S parallel to each other. The slits 180S are provided at an angle inclined with respect to the initial alignment azimuth of the liquid crystal molecules. Providing the slits 180S in the pixel electrode 180 at an angle inclined with respect to the initial alignment azimuth of the liquid crystal molecules allows rotation of the liquid crystal molecules in a certain direction, enabling control of the alignment of the liquid crystal molecules by voltage control. A ratio L/S between the width L of each linear portion between the slits of the pixel electrode 180 and the width S of the slit in the pixel electrode 180 is, for example, L/S=3 µm/4 µm.

Examples of the materials for the common electrode 160 and the pixel electrodes 180 include indium tin oxide (ITO) and indium zinc oxide (IZO).

The first alignment film 61 and the second alignment film 62 have a function of controlling the alignment of liquid crystal molecules in the liquid crystal layer 300. When the voltage applied to the liquid crystal layer 300 is lower than the threshold voltage (including the case of no voltage application), the alignment of liquid crystal molecules in the liquid crystal layer 300 is preferably controlled such that the major axes of the liquid crystal molecules orient in a horizontal direction with respect to the first alignment film 61 and the second alignment film 62 mainly by the action of the first alignment film 61 and the second alignment film 62.

The expression that the major axes of the liquid crystal molecules orient in a horizontal direction with respect to the first alignment film 61 and the second alignment film 62 means that the tilt angles (including the pre-tilt angles) of the liquid crystal molecules are 0° to 5°, preferably 0° to 3°, more preferably 0° to 1° with respect to the first alignment film 61 and the second alignment film 62. The tilt angles of the liquid crystal molecules refer to the angles at which the major axes (optic axes) of the liquid crystal molecules are tilted with respect to the surfaces of the first alignment film 61 and the second alignment film 62.

The first alignment film 61 and the second alignment film 62 are layers having undergone an alignment treatment for controlling the alignment of liquid crystal molecules. Alignment films commonly used in the field of liquid crystal display devices such as polyimide films can be used. Examples of the materials for the first alignment film 61 and the second alignment film 62 include polymers having a main chain such as polyimide, polyamic acid, and polysiloxane. A photoalignment film material having a photoreactive site (functional group) in the main chain or a side chain are suitably used.

The liquid crystal layer 300 controls the transmission amount of light by changing the alignment of the liquid crystal molecules according to the electric field generated in the liquid crystal layer 300 by voltage application between the common electrode 160 and the pixel electrodes 180 forming paired electrodes. The liquid crystal molecules in the liquid crystal layer 300 are preferably aligned horizontally by the regulating force of the first alignment film 61 and the second alignment film 62 when no voltage is applied between the paired electrodes provided in the TFT substrate 100 (state with no voltage applied). In other words, the liquid crystal molecules in the liquid crystal layer 300 are preferably controlled such that their major axes orient in a horizontal direction with respect to the first alignment film 61 and the second alignment film 62. The liquid crystal molecules in the liquid crystal layer 300 rotate in the in-plane direction according to the horizontal electric field generated in the liquid crystal layer 300 when voltage is applied between the paired electrodes (state with voltage applied). A cell gap 300W, which is the thickness of the liquid crystal layer 300, is 3 μm, for example.

The liquid crystal molecules may have a positive or negative anisotropy of dielectric constant (Δε) defined by the following formula (L). The liquid crystal layer 300 of the present embodiment preferably contains liquid crystal molecules having a negative Δε. This structure allows an increase in contrast ratio. Liquid crystal molecules having a positive anisotropy of dielectric constant are also called positive liquid crystals, and liquid crystal molecules having a negative anisotropy of dielectric constant are also called negative liquid crystals. The major axis direction of the liquid crystal molecules is the direction of the slow axis.

$$\Delta\varepsilon=\text{(dielectric constant in major axis direction)}-\text{(dielectric constant in minor axis direction)} \quad (L)$$

As shown in FIG. 18 and FIG. 19, the CF substrate 200 includes, sequentially from the viewing surface side toward the back surface side, a supporting substrate 210, a black matrix layer 220, a CF layer 230, and a planarizing film 240.

The supporting substrate 210 is preferably a transparent substrate such as a glass substrate or a plastic substrate.

The black matrix layer 220 is provided on the supporting substrate 210 in a grid pattern corresponding to the gate lines 101 and the source lines 102, and is arranged outside the pixel regions. The black matrix layer 220 may be formed of any material that has a light blocking property. Suitably used is a resin material containing a black pigment or a light-blocking metal material. The black matrix layer 220 is formed, for example, by photolithography in which a photosensitive resin containing a black pigment is applied to form a film, followed by processing of the film such as exposure and development.

The CF layer 230 has a structure including a red color filter 230R, a green color filter 230G, and a blue color filter 230B arranged in the same plane, defined by the black matrix layer 220. The red color filter 230R, the green color filter 230G, and the blue color filter 230B are made of, for example, a pigment-containing transparent resin. Normally, a combination of the red color filter 230R, the green color filter 230G, and the blue color filter 230B is provided in every pixel. A desired color is obtained in each pixel by mixing colored lights passing through the red color filter 230R, the green color filter 230G, and the blue color filter 230B in controlled amounts.

The planarizing film 240 covers the liquid crystal layer 300 side surface of the CF layer 230. The planarizing film 240 has a function of planarizing the ground for the second alignment film 62 when the surface on the liquid crystal layer 300 side of the CF layer 230 is not flat. The planarizing film 240 can prevent dissolution of impurities in the CF layer 230 into the liquid crystal layer 300. For example, an organic insulating film (relative dielectric constant ε=3 to 4), specifically an acrylic resin film, can be used as the planarizing film 240. The planarizing film 240 is formed by, for example, applying a photocurable resin, followed by ultraviolet irradiation and firing.

The liquid crystal panel 20 may be of any liquid crystal mode, such as a mode providing black display by aligning liquid crystal molecules in a liquid crystal layer in a direction perpendicular to the substrate surfaces or a mode providing black display by aligning liquid crystal molecules in a liquid crystal layer in a direction parallel to the substrate surfaces or in a direction that is not parallel or perpendicular to the substrate surfaces. Examples of the driving mode of the liquid crystal panel include TFT mode (active matrix mode), simple matrix mode (passive matrix mode), and plasma address mode.

Examples of the structure of the liquid crystal panel 20 include a structure in which a liquid crystal layer is sandwiched between a pair of substrates one of which includes pixel electrodes and a common electrode, and an image is displayed by applying voltage between the pixel electrodes and the common electrode to form a horizontal electric field (including a fringe electric field) in the liquid crystal layer; a structure in which a liquid crystal layer is sandwiched between a pair of substrates one of which includes pixel electrodes and the other of which includes a common electrode, and an image is displayed by applying voltage between the pixel electrodes and the common electrode to form a vertical electric field in the liquid crystal layer. More specific examples of the horizontal electric field mode include an FFS mode and an IPS mode, in both of which liquid crystal molecules in a liquid crystal layer are aligned in a direction parallel to the substrate surfaces in a state with no voltage applied. More specific examples of the vertical electric field mode include a vertical alignment (VA) mode in which liquid crystal molecules in a liquid crystal layer are aligned in a direction perpendicular to the substrate surfaces in a state with no voltage applied.

The backlight 40 shown in FIG. 16 includes a luminous part 41 and a prism sheet 42 disposed on the viewing surface side of the luminous part 41. The display device 1 of the present embodiment, which includes the prism sheet 42 on the viewing surface side of the luminous part 41, can increase the front contrast ratio (CR).

The backlight 40 may be any backlight that can irradiate the liquid crystal panel 20 with light, such as a direct-lit type or an edge-lit type. The backlight 40 may further include a light guide plate and a reflector, for example.

The luminous part 41 may be any luminous part that emits light including visible light, and may be one that emits light consisting only of visible light or one that emits light including both visible light and ultraviolet light. The luminous part 41 includes at least a light source. The luminous part 41 may include a light guide plate. A light source that emits white light is suitably used to allow the display device 1 to perform color display. As for the type of the light source, suitably used is a cold cathode fluorescent lamp (CCFL) or a light emitting diode (LED), for example. The "visible light" herein means light (electromagnetic waves) with a wavelength of 380 nm or longer and shorter than 800 nm.

Figure 21:
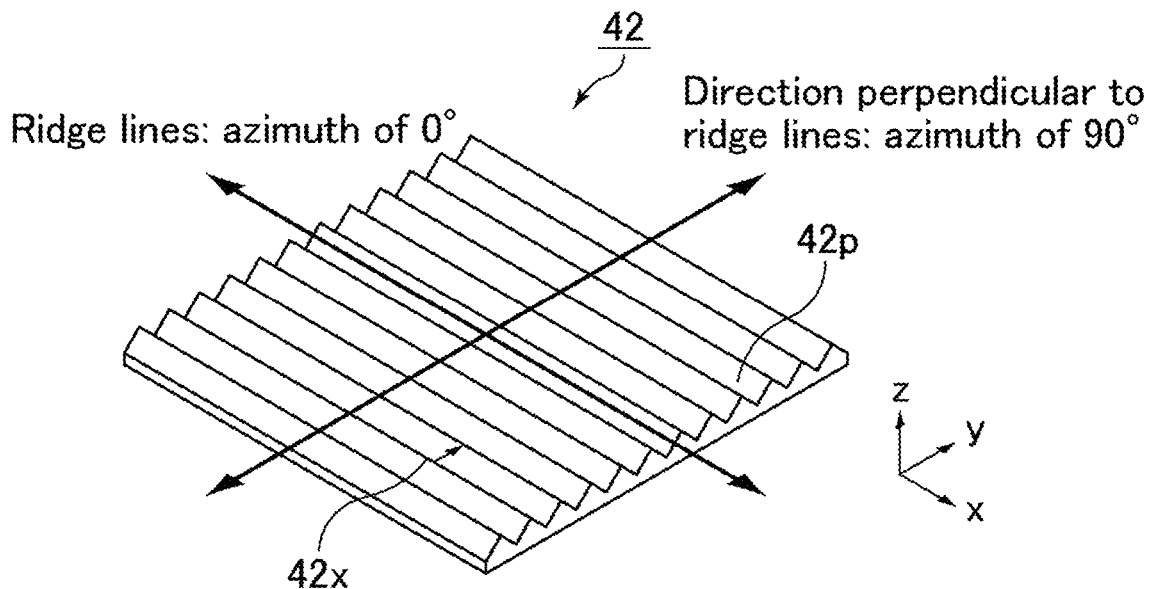
FIG. 21 is a schematic perspective view of a prism sheet in the display device of the embodiment.

FIG. 21 is a schematic perspective view of a prism sheet in the display device of the embodiment. As shown in FIG. 21, the prism sheet 42 includes prisms 42p arranged in multiple columns on the viewing surface side surface. In other words, the prism sheet 42 has prisms 42p in multiple columns extending parallel to each other on the viewing surface side surface. Ridge lines 42x of the prism sheet 42 are all straight lines formed by linearly continuing top apexes of the prisms 42p.

The ridge lines 42x of the prism sheet 42 are preferably arranged parallel to an azimuth of 0°. Specifically, the ridge lines 42x preferably have an azimuthal angle of 0° 3°. Since the prism sheet has a function of collecting oblique light beams in the front direction, the light distribution at an azimuth perpendicular to the ridge lines is narrowed. Therefore, the ridge lines 42x of the prism sheet 42 being arranged parallel to an azimuth of 0° enable the prism sheet 42 to collect less light at the azimuths in left and right directions (azimuths of 0° and 180°) than that at the azimuths in top and bottom directions (azimuths of 90° and 270°) to increase oblique luminance at the azimuths in left and right directions, thereby achieving a wide viewing angle. Such a structure is particularly suitable for OEM standards that require a wide luminance viewing angle at the azimuths in left and right directions.

The transmission axis of the first polarizer 31 and the transmission axis of the second polarizer 34 are preferably parallel to or perpendicular to the ridge lines 42x of the prism sheet 42. This structure allows more effective reduction or prevention of oblique light at azimuths in top and bottom directions.

For example, the ridge lines 42x of the prism sheet 42, the transmission axis of the first polarizer 31, and the transmission axis of the second polarizer 34 are preferably arranged parallel to an azimuth of 0°. Specifically, when the first polarizer 31 is an absorptive polarizer and the second polarizer 34 is a reflective polarizer, the ridge lines 42x of the prism sheet 42, the transmission axis of the first polarizer 31, and the transmission axis of the second polarizer 34 are preferably arranged parallel to an azimuth of 0°. In other words, preferably, the ridge lines 42x of the prism sheet 42 are arranged parallel to an azimuth of 0°, and the absorption axis of the first polarizer 31 and the reflection axis of the second polarizer 34 are arranged in a direction parallel to an azimuth of 90°.

Also, preferably, the ridge lines 42x of the prism sheet 42 are arranged parallel to an azimuth of 0° and the transmission axis of the first polarizer 31 and the transmission axis of the second polarizer 34 are arranged parallel to an azimuth of 90°. Specifically, when the first polarizer 31 is an absorptive polarizer and the second polarizer 34 is a reflective polarizer, preferably, the ridge lines 42x of the prism sheet 42 are arranged parallel to an azimuth of 0° and the transmission axis of the first polarizer 31 and the transmission axis of the second polarizer 34 are arranged parallel to an azimuth of 90°. In other words, the ridge lines 42x of the prism sheet 42, the absorption axis of the first polarizer 31, and the reflection axis of the second polarizer 34 are preferably arranged parallel to an azimuth of 0°.

The backlight 40 preferably includes the two prism sheets 42 shown in FIG. 8. In other words, the backlight 40 preferably includes two prism sheets 42 (a first prism sheet 421 and a second prism sheet 422) in which the ridge lines 42x are parallel to an azimuth of 0°.

The first prism sheet 421 includes first prisms 421p that are arranged in a first direction in the plane and that extend in a second direction perpendicular to the first direction in the plane. The second prism sheet 422 is disposed closer to the light-emitting side than the first prism sheet 421 is, and includes second prisms 422p that are arranged in the first direction in the plane and that extend in the second direction perpendicular to the first direction in the plane. The first prisms 421p and the second prisms 422p each have a base parallel to the first direction and a pair of sides rising from the respective ends of the base.

When the backlight 40 is, for example, an edge-lit backlight and a light source in the luminous part 41 is disposed at one end in the first direction of the backlight 40, the angle formed between the side of each second prism 422p on the light source side and the base of the second prism 422p is preferably smaller than the angle formed between the side of each first prism 421p on the light source side and the base of the first prism 421p. This structure allows an increase in use efficiency of light.

The pair of sides of each second prism 422p preferably forms the same angle with the base of the second prism 422p. This structure achieves a favorable efficiency of recycling light hitting one of the pair of sides of a second prism 422p and then reflecting on the other side toward the first prism sheet 421, thus contributing to increase in luminance. This structure also provides equivalent rising effects to lights hitting on the pair of sides of the second prism 422p before being emitted, so that even better viewing angle characteristics can be achieved.

The angle formed between the pair of sides of each second prism 422p is preferably 80° or greater and 100° or smaller. This structure can increase the luminance and achieve wide viewing angle characteristics.

The angle formed between the side of each first prism 421p opposite to the light source and the base of the first prism 421p is preferably 35° or greater and 50° or smaller. This structure allows an increase in front luminance and achievement of favorable viewing angle characteristics. The angle formed between the side of the first prism 421p opposite to the light source and the base of the first prism 421p is more preferably 45°.

The angle formed between the side of the first prism 421p on the light source side and the base of the first prism 421p is also preferably 50° or greater and 60° or smaller. This structure allows an increase in front luminance and achievement of favorable viewing angle characteristics. The angle formed between the side of the first prism 421p on the light source side and the base of the first prism 421p is more preferably 55°.

The refractive index of the first prisms 421p is preferably 1.49 or more and 1.52 or less. This structure achieves an appropriate ratio between light having a short wavelength and light having a long wavelength in emission light from the first prism sheet 421, thus leading to less coloring in a specific color. This can reduce or prevent generation of color unevenness.

As shown in FIG. 16, the backlight 40 preferably includes the reflector 43 on the back surface side of the luminous part 41. The reflector 43 may be any reflector that can reflect, recycled light emitted from the luminous part 41 and reflected by a component such as an optical element 30, toward the viewing surface side again. The reflector 43 can be one usually used in the field of display devices.

The display device 1 of the present embodiment includes, in addition to the above components, multiple components including: external circuits such as a tape carrier package (TCP) and a printed circuit board (PCB); optical films such as a viewing angle widening film and a luminance enhancing film; and other components such as a bezel (frame). A component may be incorporated into another component in some cases. Components other than the components described above may be any component commonly used in the field of display devices, and therefore, descriptions thereof are omitted.

EXAMPLES

The present invention will be described in more detail with reference to examples and comparative examples below, but the present invention is not limited only to these examples.

Comparative Example 1

Figure 22:
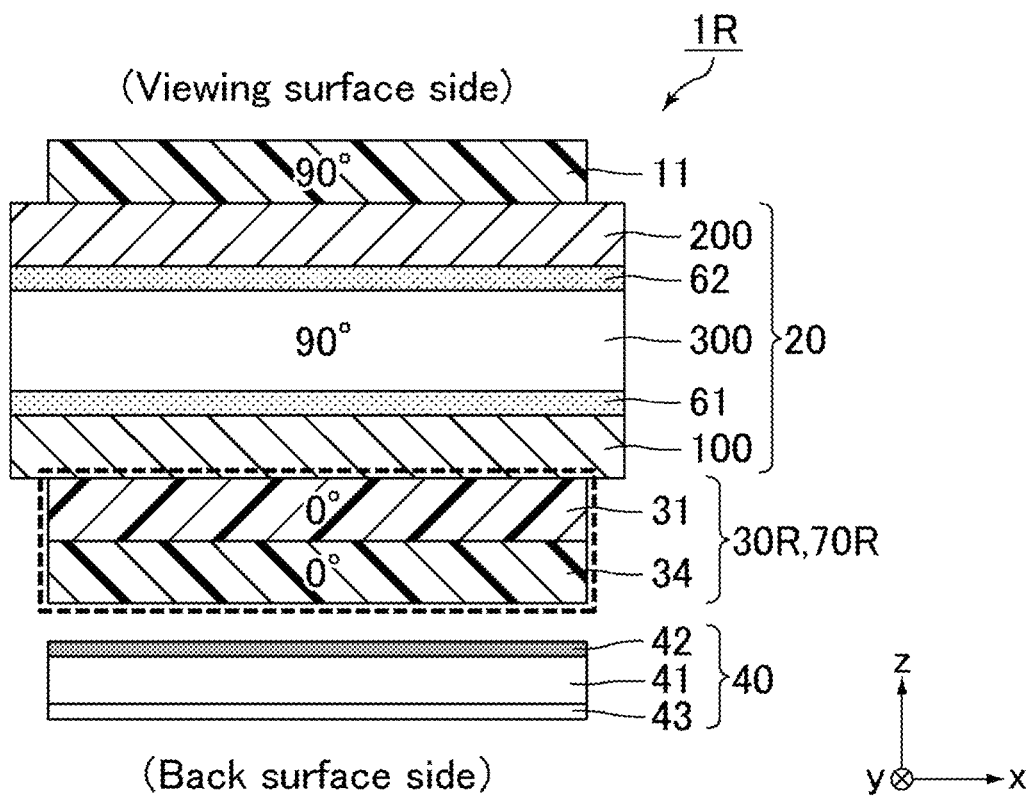
FIG. 22 is a schematic cross-sectional view of a display device of Comparative Example 1.
Figure 23:
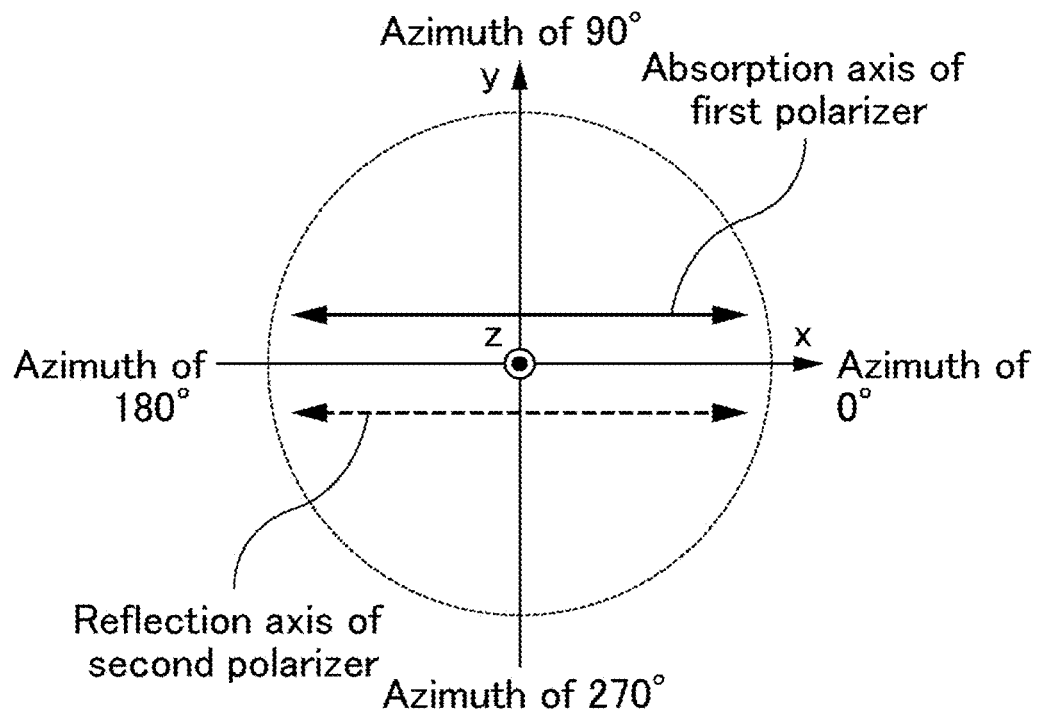
FIG. 23 shows axis azimuths of components of the display device of Comparative Example 1.

FIG. 22 is a schematic cross-sectional view of a display device of Comparative Example 1. The angles in FIG. 22 represent axis azimuths. FIG. 23 shows axis azimuths of components of the display device of Comparative Example 1.

A display device 1R of Comparative Example 1 shown in FIG. 22 and FIG. 23 included, sequentially from the viewing surface side toward the back surface side, a viewing surface side polarizer 11, a liquid crystal panel 20, a first polarizer 31, a second polarizer 34, and a backlight 40. The display device 1R of Comparative Example 1 was a typical liquid crystal display device.

A liquid crystal panel 20 in the display device 1R of Comparative Example 1 had the same structure as in FIG. 17 to FIG. 20. The liquid crystal driving mode was the FFS mode. Each TFT 104 included a thin film semiconductor layer 103 made of IGZO. A gate insulator 120 and a source insulating film 140 were $SiO_2$ inorganic insulating films. Planarizing films 150 and 240 were acrylic resin films. An interlayer insulating film 170 was a SiNx inorganic insulating film having a film thickness 170W of 0.2 µm. A common electrode 160 and pixel electrodes 180 were IGZO films. A liquid crystal layer 300 contained positive liquid crystals with a Δε of +2.5 and had a Δn of 0.11. A cell gap 300W of the liquid crystal layer 300 was 3 µm. A ratio L/S between the width L of each linear portion between the slits of the pixel electrode 180 and the width S of the slit in the pixel electrode 180 was 3 µm/4 µm. A width 1W of each pixel in which a single pixel electrode 180 was disposed was 28 m. The liquid crystal panel 20 was a high-resolution liquid crystal panel (2.5-inch 1200 ppi) for head-mounted applications.

A viewing surface side polarizer 11 of Comparative Example 1 was an absorptive polarizer, with its transmission axis set parallel to an azimuth of 0°, i.e., with its absorption axis parallel to an azimuth of 90°. The slow axis of the liquid crystal layer 300 was set parallel to an azimuth of 90°.

The first polarizer 31 was an absorptive polarizer, with its transmission axis set parallel to an azimuth of 90°, i.e., with its absorption axis set parallel to an azimuth of 0°. The second polarizer 34 was a reflective polarizer, with its transmission axis set parallel to an azimuth of 90°, i.e., with its reflection axis set parallel to an azimuth of 0°.

In Comparative Example 1, a backlight 40 was used which included a luminous part 41 and two prism sheets 42 arranged on the viewing surface side of the luminous part 41. The two prism sheets 42 were the two prism sheets 42 shown in FIG. 8, i.e., the first prism sheet 421 and the second prism sheet 422 in each of which the ridge lines 42x were parallel to an azimuth of 0°.

[Measurement of Viewing Angle in Terms of Transmittance]

The viewing angle in terms of transmittance of a polarizer louver in the display device 1R of Comparative Example 1 was calculated. Specifically, the viewing angle in terms of transmittance of the region surrounded by the dashed line in FIG. 22, i.e., an optical element 30R (polarizer louver 70R) including all the components from the first polarizer 31 to the second polarizer 34 (the first polarizer 31 and the second polarizer 34) was calculated using an LCD Master.

Figure 24:
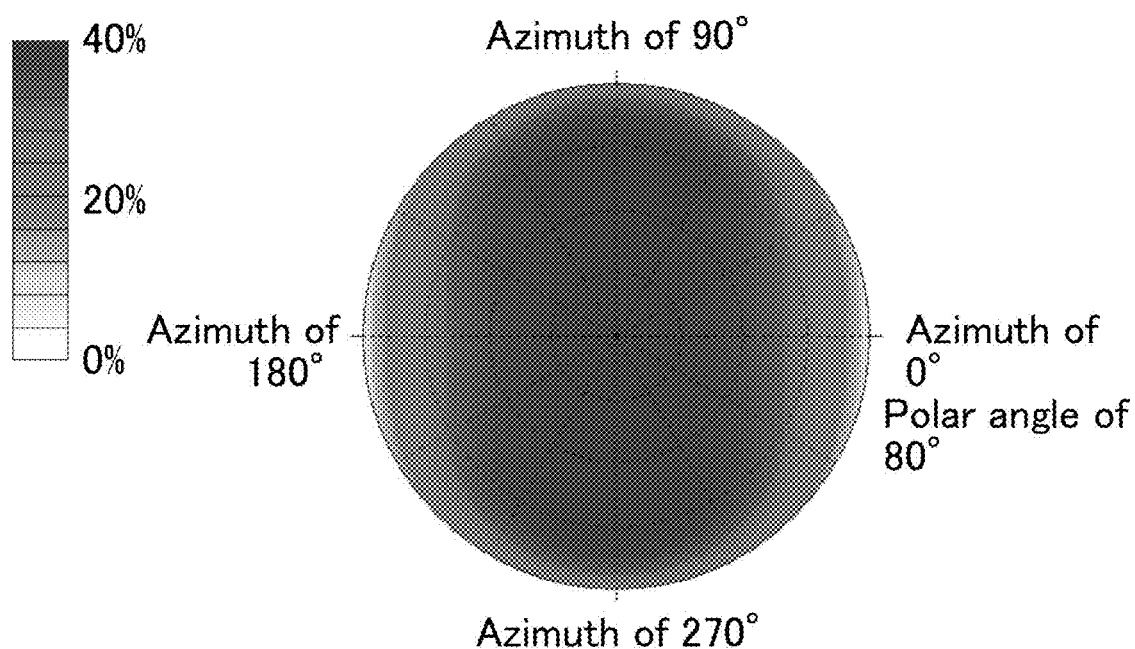
FIG. 24 shows simulation results of the viewing angle in terms of transmittance of a polarizer louver in Comparative Example 1.

FIG. 24 shows simulation results of the viewing angle in terms of transmittance of the polarizer louver in Comparative Example 1. FIG. 24 shows that the polarizer louver 70R in Comparative Example 1 was equivalent in transmittance to common polarizing plates in parallel Nicols.

[Measurement of Front White Luminance and Front CR]

A front luminance during white display and a front luminance during black display in the display device 1R of Comparative Example 1 were measured using a luminance meter SR-UL1 available from Topcon Corporation. The front CR was calculated by dividing the front luminance during white display (front white luminance) by the front luminance during black display (front black luminance) (front CR=front white luminance/front black luminance).

TABLE 1

| | |
|---|---|
| Front white luminance of display device [cd/m$^2$] | 500 |
| Front CR of display device | 790 |

As shown in Table 1, the front white luminance of the display device 1R of Comparative Example 1 was 500 cd/m$^2$, and the front CR thereof was 790 (front white luminance:front black luminance=790:1).

Comparative Example 2

Figure 25:
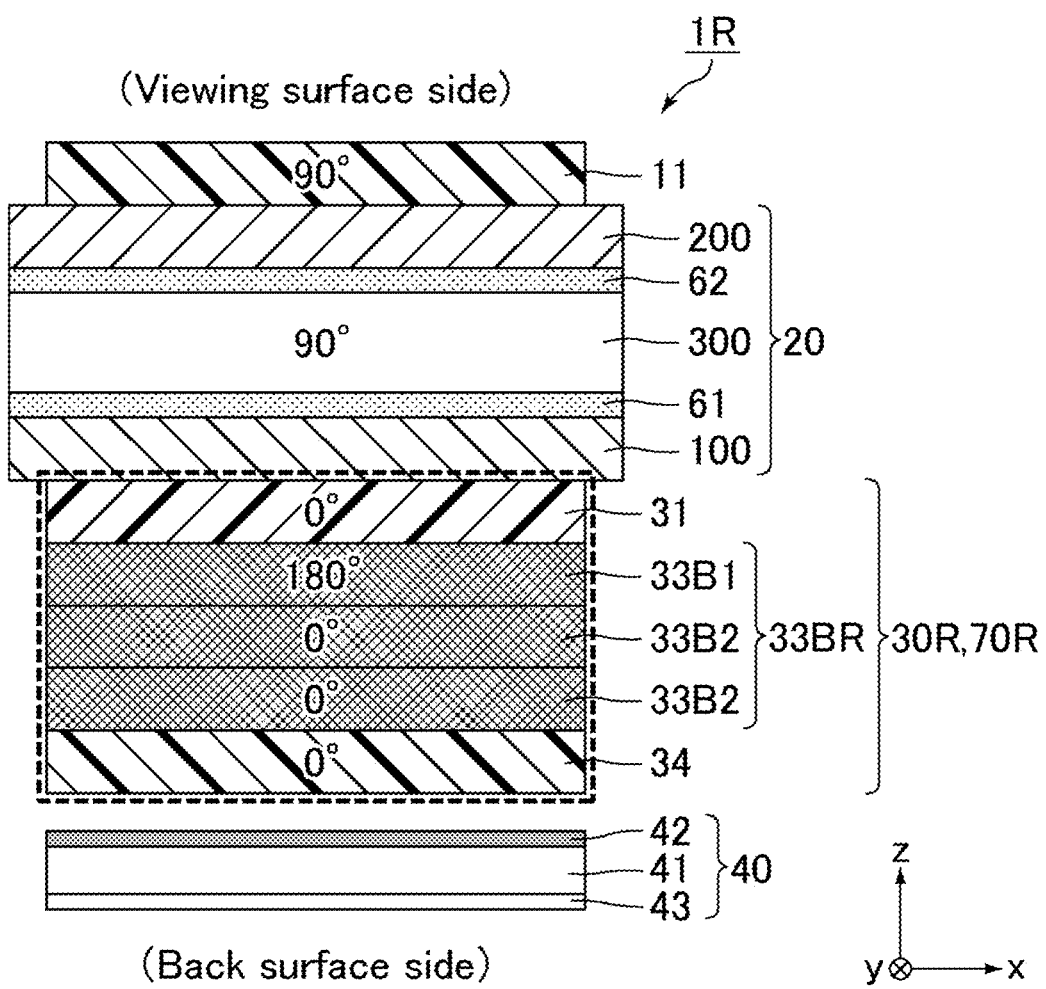
FIG. 25 is a schematic cross-sectional view of a display device of Comparative Example 2.
Figure 26:
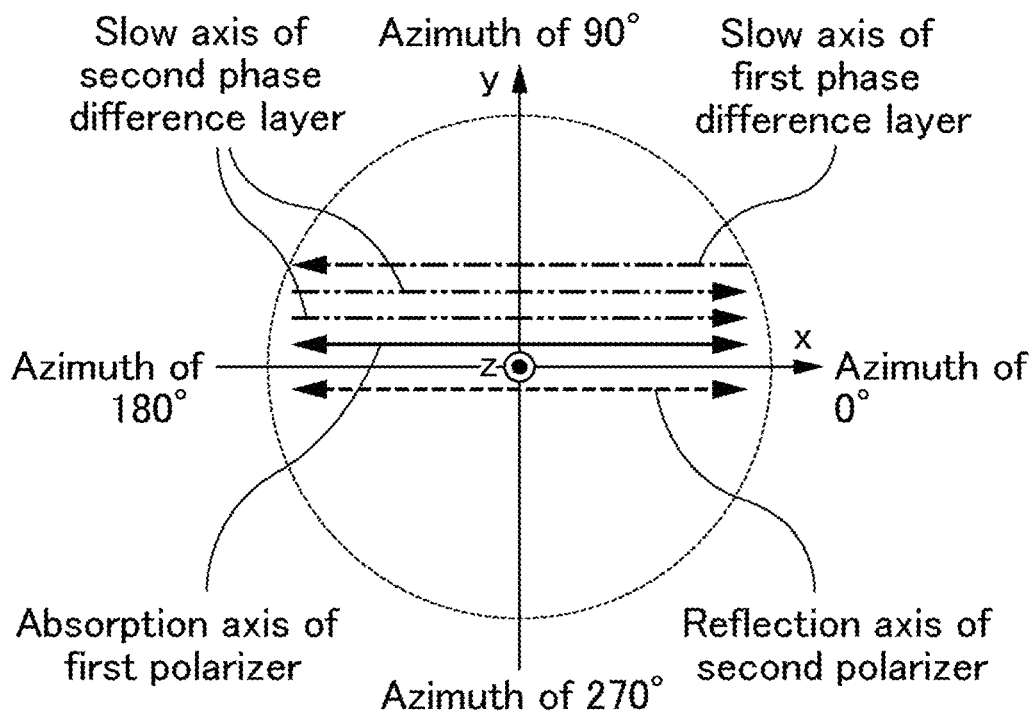
FIG. 26 shows axis azimuths of components of the display device of Comparative Example 2.
Figure 27:
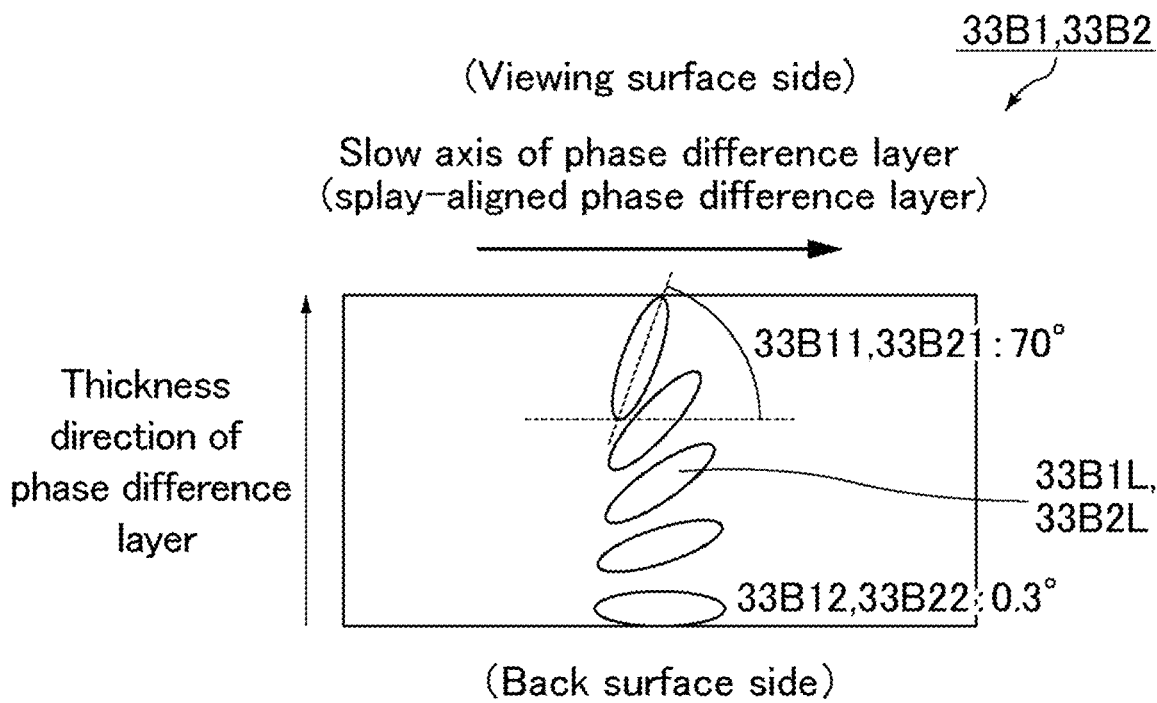
FIG. 27 is a schematic cross-sectional view of a phase difference layer in the display device of Comparative Example 2.

FIG. 25 is a schematic cross-sectional view of a display device of Comparative Example 2. The angles shown in FIG. 25 represent axis azimuths. FIG. 26 shows axis azimuths of components in the display device of Comparative Example 2. FIG. 27 is a schematic cross-sectional view of the phase difference layer in the display device of Comparative Example 2.

A display device 1R of Comparative Example 2 shown in FIG. 25 and FIG. 26 was the same as the display device 1R of Comparative Example 1, except that between the first polarizer 31 and the second polarizer 34, a phase difference layer 33BR was disposed in which three layers of a first phase difference layer 33B1, a second phase difference layer 33B2, and a second phase difference layer 33B2 were laminated sequentially from the viewing surface side toward the back surface side.

As shown in FIG. 27, the first phase difference layer 33B1 was a splay-aligned phase difference layer in which the tilt angle 33B11 was 70° and the tilt angle 33B12 was 0.3°. In other words, first anisotropic molecules 33B1L in the first phase difference layer 33B1 were horizontally aligned (0°) on the back surface side, were aligned at a constant angle (70°) on the viewing surface side, and were aligned therebetween such that the tilt angle 33B12 on the back surface side and the tilt angle 33B11 on the viewing surface side were continuous. The in-plane phase difference of the first phase difference layer 33B1 in a front view was 115 nm. The slow axis of the first phase difference layer 33B1 was set at an azimuth of 180°.

As shown in FIG. 27, the second phase difference layer 33B2s were each a splay-aligned phase difference layer in which the tilt angle 33B21 was 70° and the tilt angle 33B22 was 0.3°. In other words, second anisotropic molecules 33B2L in each second phase difference layer 33B2 were horizontally aligned (0°) on the back surface side, were aligned at a constant angle (70°) on the viewing surface side, and were aligned therebetween such that the tilt angle 33B22 on the back surface side and the tilt angle 33B21 on the viewing surface side were continuous. The in-plane phase difference of each second phase difference layer 33B2 in a front view was 115 nm. The slow axis of each second phase difference layer 33B2 was set at an azimuth of 0°.

As in Comparative Example 1, the viewing angle in terms of transmittance of a polarizer louver 70R in the display device 1R of Comparative Example 2 was calculated. Specifically, the viewing angle in terms of transmittance of the region surrounded by the dashed line in FIG. 25, i.e., an optical element 30R (polarizer louver 70R) including all the components from the first polarizer 31 to the second polarizer 34 (the first polarizer 31, the phase difference layer 33BR, and the second polarizer 34) was calculated using an LCD Master.

Figure 28:
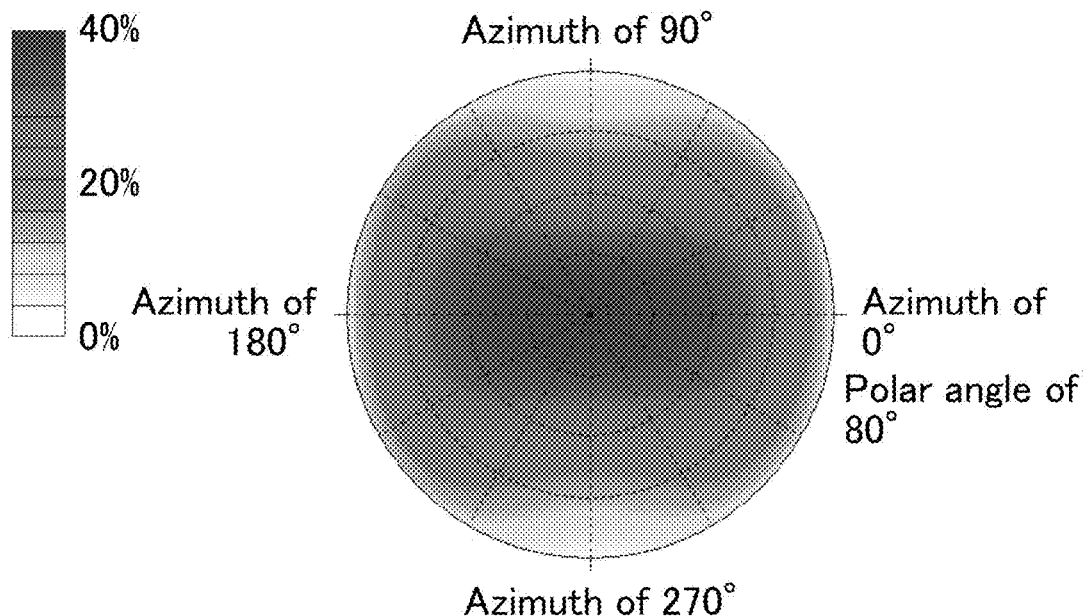
FIG. 28 shows simulation results of the viewing angle in terms of transmittance of a polarizer louver in Comparative Example 2.

FIG. 28 shows simulation results of the viewing angle in terms of transmittance of the polarizer louver in Comparative Example 2. FIG. 28 shows that the polarizer louver 70R in Comparative Example 2 was lower in transmittance at azimuths in top and bottom directions (azimuth 90°-270°) than the polarizer louver 70R in Comparative Example 1, although the light-blocking range was limited to the vicinities of azimuth 90°-270°.

The front white luminance and the front CR of the display device 1R of Comparative Example 2 were measured as in Comparative Example 1. Table 2 shows the results.

TABLE 2

| Front white luminance of display device [cd/m$^2$] | 500 |
|---|---|
| Front CR of display device | 822 |

As shown in Table 2, the front white luminance of the display device 1R of Comparative Example 2 was 500 cd/m$^2$, which was the same as in Comparative Example 1. The front CR of the display device 1R of Comparative Example 2 was 822 (front white luminance:front black luminance=822:1), which was slightly higher than in Comparative Example 1, but the improvement percentage was as little as less than 5%.

Example 1

Figure 29:
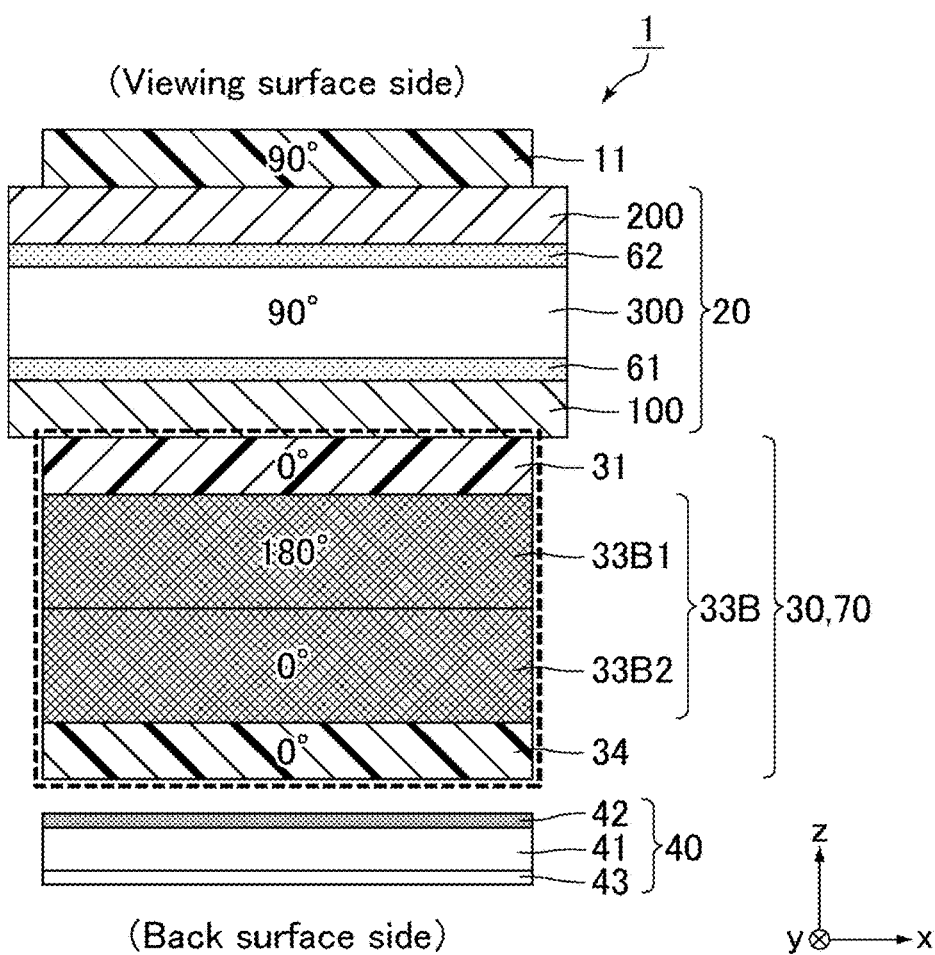
FIG. 29 is a schematic cross-sectional view of a display device of Example 1.
Figure 30:
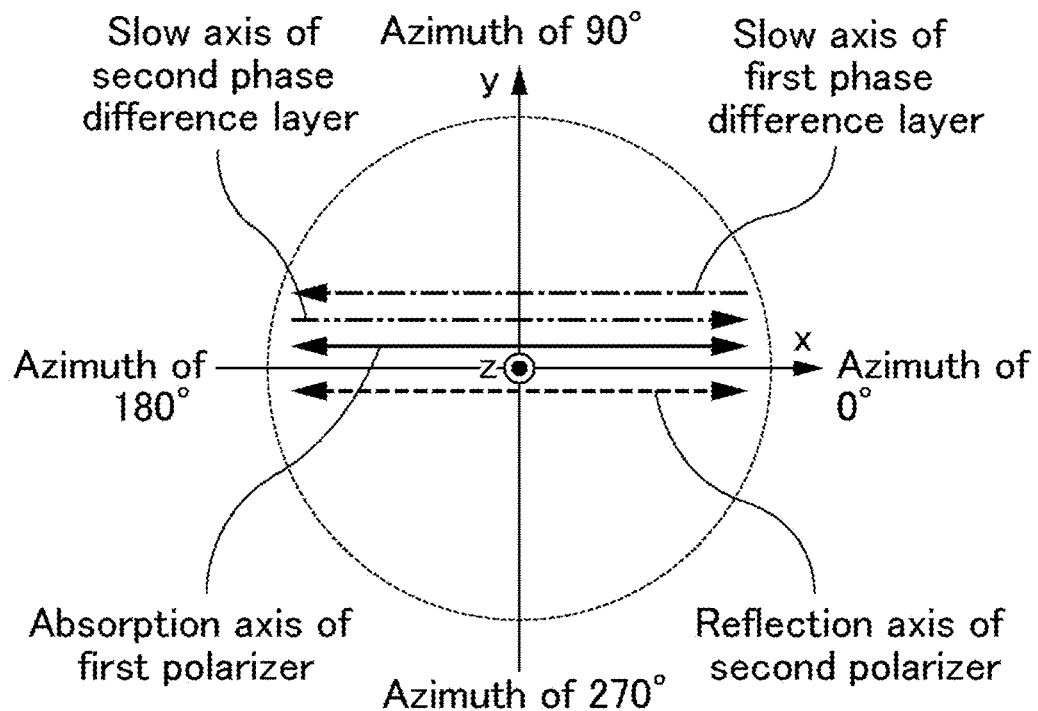
FIG. 30 shows axis azimuths of components of the display device of Example 1.

FIG. 29 is a schematic cross-sectional view of a display device of Example 1. The angles shown in FIG. 29 represent axis azimuths. FIG. 30 shows axis azimuths of components in a display device of Example 1.

A display device 1 of Example 1 shown in FIG. 29 and FIG. 30 was the same as the display device 1R of Comparative Example 2, except that between a first polarizer 31 and a second polarizer 34, a phase difference layer 33B was disposed in which two layers of a first phase difference layer 33B1 and a second phase difference layer 33B2 were laminated sequentially from the viewing surface side toward the back surface side, the in-plane phase difference of the first phase difference layer 33B1 in a front view was 229 nm, and the in-plane phase difference of the second phase difference layer 33B2 in a front view was 229 nm.

As in Comparative Example 1, the viewing angle in terms of transmittance of the polarizer louver 70 in the display device 1 of Example 1 was calculated. Specifically, the viewing angle in terms of transmittance of the region surrounded by the dashed line in FIG. 29, i.e., an optical element 30 (polarizer louver 70) including all the components from the first polarizer 31 to the second polarizer 34 (the first polarizer 31, the phase difference layer 33B, and the second polarizer 34) was calculated using an LCD Master.

Figure 31:
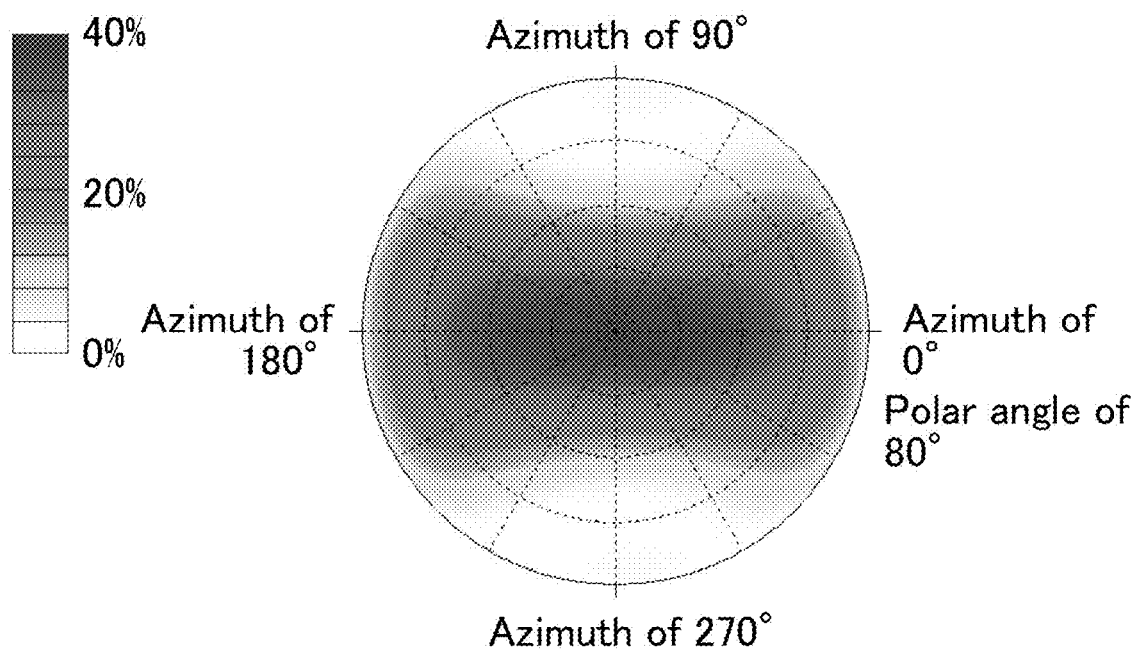
FIG. 31 shows simulation results of the viewing angle in terms of transmittance of a polarizer louver in Example 1.

FIG. 31 shows simulation results of the viewing angle in terms of transmittance of a polarizer louver in Example 1. FIG. 31 shows that the polarizer louver 70 in Example 1 was lower in transmittance at azimuths in top and bottom directions (azimuth 90°-270°) than the polarizer louver 70R in Comparative Example 1, and the light-blocking range expanded roughly from an azimuth of 45° to an azimuth of 135° centering around azimuth 90°-270°.

The front white luminance and the front CR of the display device 1 of Example 1 were measured as in Comparative Example 1. Table 3 shows the results.

TABLE 3

| Front white luminance of display device [cd/m$^2$] | 500 |
|---|---|
| Front CR of display device | 909 |

As shown in Table 3, the front white luminance of the display device 1 of Example 1 was 500 cd/m$^2$, which was the same as in Comparative Example 1. The front CR of the display device 1 of Example 1 was 909 (front white luminance:front black luminance=909:1), which was significantly higher than in Comparative Example 1 by as much as 15%.

Figure 32:
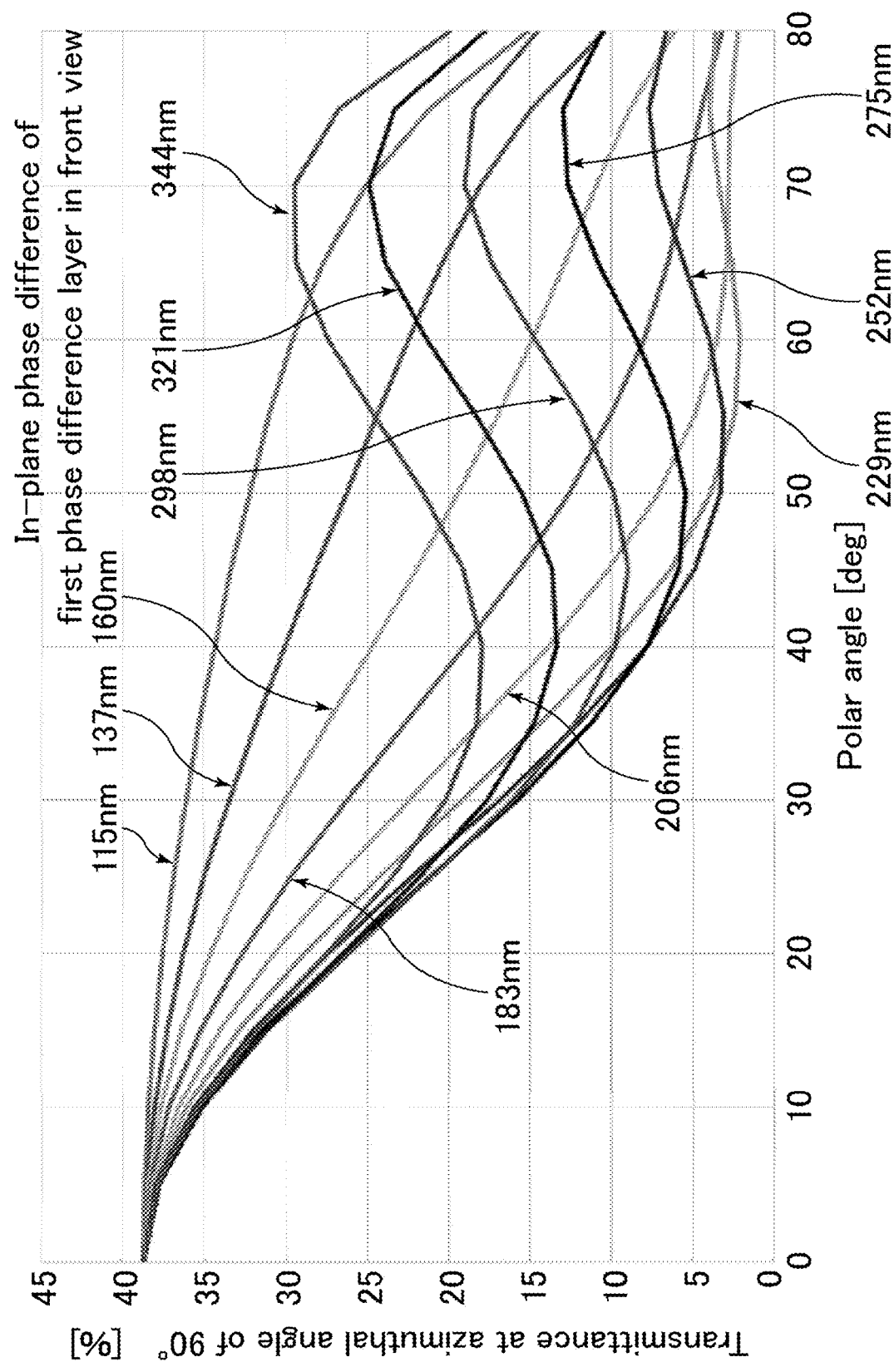
FIG. 32 shows simulation results of transmittance of the display device of Example 1 at an azimuthal angle of 90° relative to polar angles.

In the display device of Example 1, the in-plane phase difference of the first phase difference layer 33B1 in a front view was changed as appropriate to further simulate the transmittance at an azimuthal angle of 90° relative to polar angles. FIG. 32 shows simulation results of transmittance of the display device of Example 1 at an azimuthal angle of 90° relative to polar angles. As shown in FIG. 32, when the in-plane phase difference of the first phase difference layer 33B1 in a front view was 180 nm or more and 250 nm or less, the transmittance at an azimuthal angle of 90° was reduced. Also, when the in-plane phase difference of the first phase difference layer 33B1 in a front view was 206 nm or more and 229 nm or less, the transmittance at an azimuthal angle of 90° was more effectively reduced.

The in-plane phase difference of the second phase difference layer 33B2 in a front view was changed as appropriate to further simulate the transmittance at an azimuthal angle of 90° relative to polar angles, and the results thereof were the same as the results shown in FIG. 32. Thus, when the in-plane phase difference of the second phase difference layer 33B2 in a front view was 180 nm or more and 250 nm or less, the transmittance at an azimuthal angle of 90° was reduced. Also, when the in-plane phase difference of the second phase difference layer 33B2 in a front view was 206 nm or more and 229 nm or less, the transmittance at an azimuthal angle of 90° was more effectively reduced.

Example 2

Figure 33:
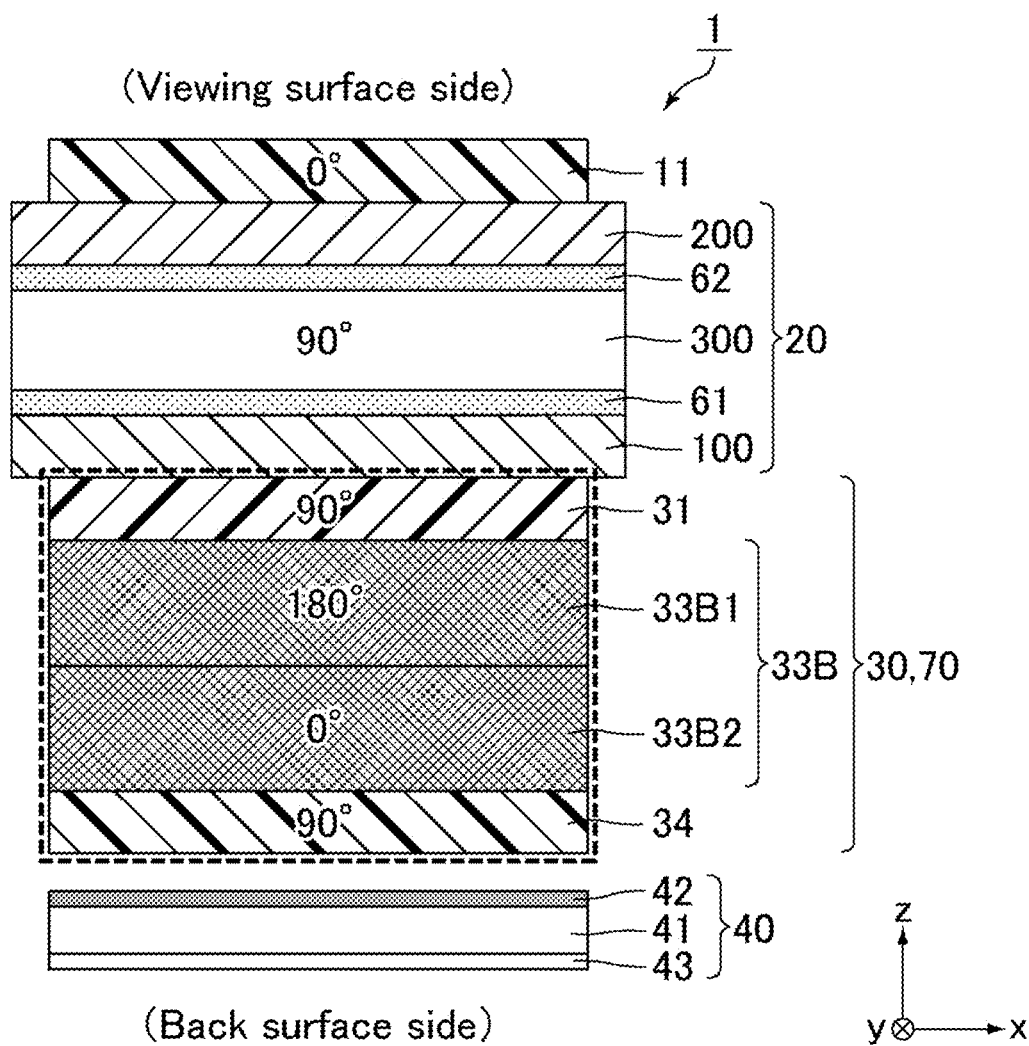
FIG. 33 is a schematic cross-sectional view of a display device of Example 2.
Figure 34:
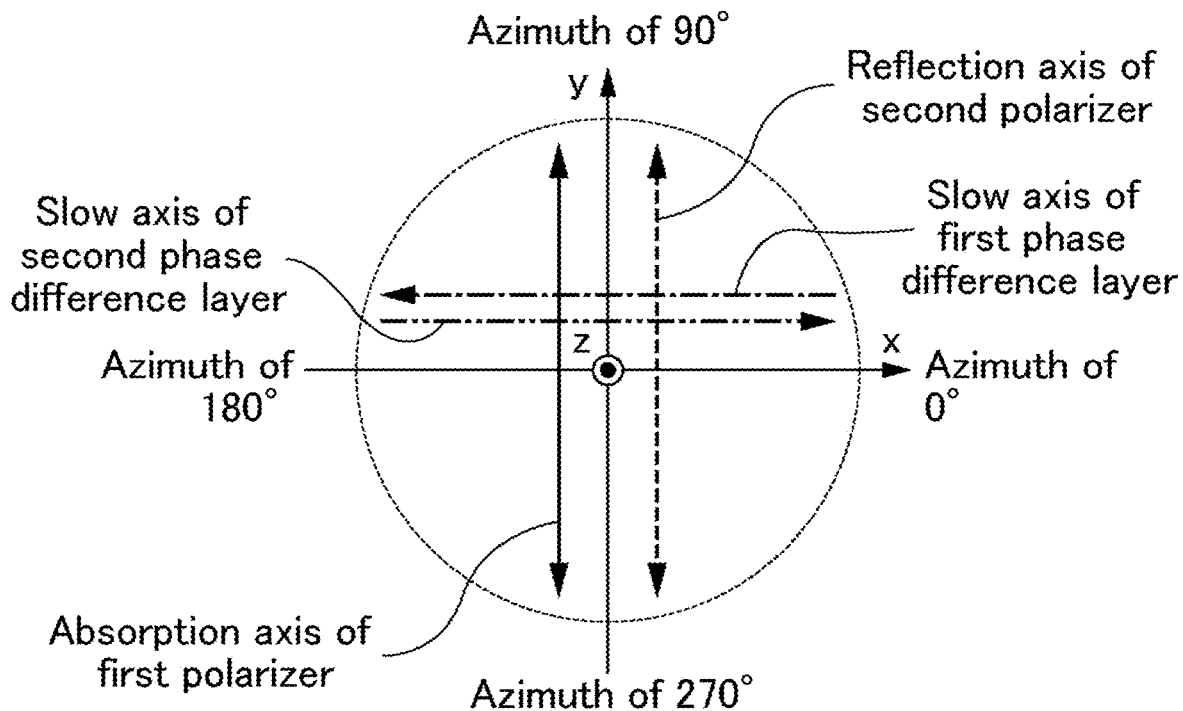
FIG. 34 shows axis azimuths of components of the display device of Example 2.

FIG. 33 is a schematic cross-sectional view of a display device of Example 2. The angles shown in FIG. 33 represent axis azimuths. FIG. 34 shows axis azimuths of components of the display device of Example 2.

A display device 1 of Example 2 shown in FIG. 33 and FIG. 34 was the same as the display device 1 of Example 1, except that the transmission axis of a viewing surface side polarizer 11 was set parallel to an azimuth of 90° (i.e., the absorption axis was set parallel to an azimuth of 0°), the absorption axis of a first polarizer 31 was set parallel to an azimuth of 90°, and the reflection axis of a second polarizer 34 was set parallel to an azimuth of 90°.

As in Comparative Example 1, the viewing angle in terms of transmittance of a polarizer louver 70 in the display device 1 of Example 2 was calculated. Specifically, the viewing angle in terms of transmittance of the region surrounded by the dashed line in FIG. 33, i.e., an optical element 30 (polarizer louver 70) including all the components from the first polarizer 31 to the second polarizer 34 (the first polarizer 31, a phase difference layer 33B, and the second polarizer 34) was calculated using an LCD Master.

Figure 35:
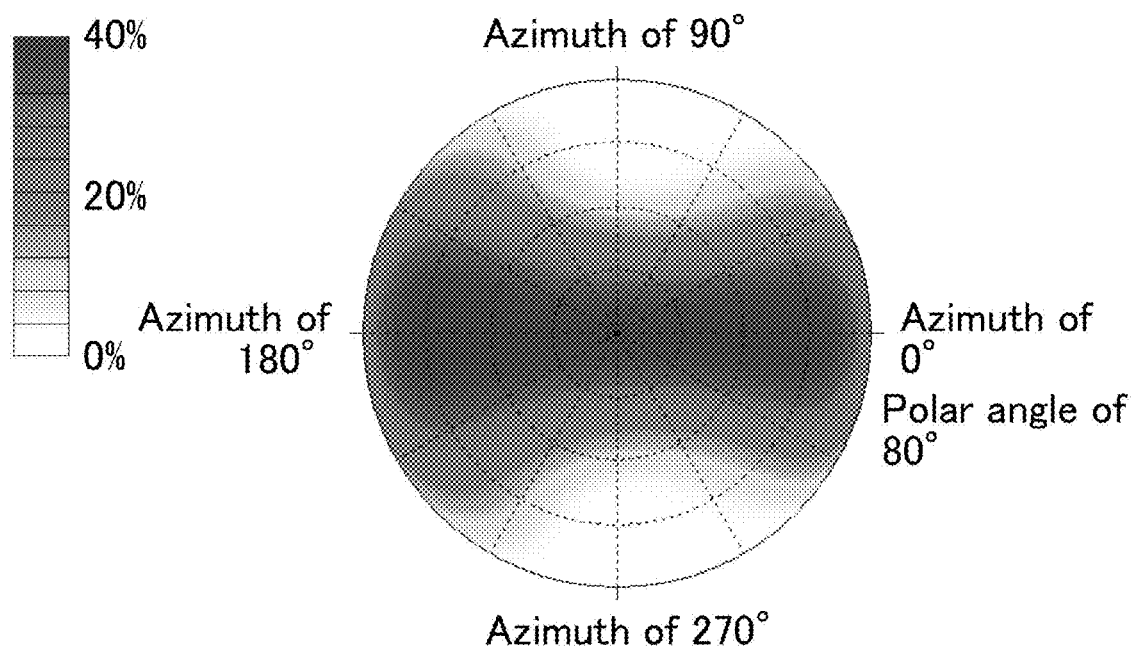
FIG. 35 shows simulation results of the viewing angle in terms of transmittance of a polarizer louver in Example 2.

FIG. 35 shows simulation results of the viewing angle in terms of transmittance of a polarizer louver in Example 2. FIG. 35 shows that the polarizer louver 70 in Example 2 was lower in transmittance at azimuths in top and bottom directions (azimuth 90°-270°) than the polarizer louver 70R in Comparative Example 1, and the light-blocking range expanded roughly from an azimuth of 45° to an azimuth of 135° centering around azimuth 90°-270°.

The front white luminance and the front CR of the display device 1 of Example 2 were measured as in Comparative Example 1. Table 4 shows the results.

TABLE 4

| | |
|---|---|
| Front white luminance of display device [cd/m$^2$] | 500 |
| Front CR of display device | 893 |

As shown in Table 4, the front white luminance of the display device 1 of Example 2 was 500 cd/m$^2$, which was the same as in Comparative Example 1. The front CR of the display device 1 of Example 2 was 893 (front white luminance:front black luminance=893:1), which was significantly higher than in Comparative Example 1 by as much as 13%.

Comparative Example 3

Figure 36:
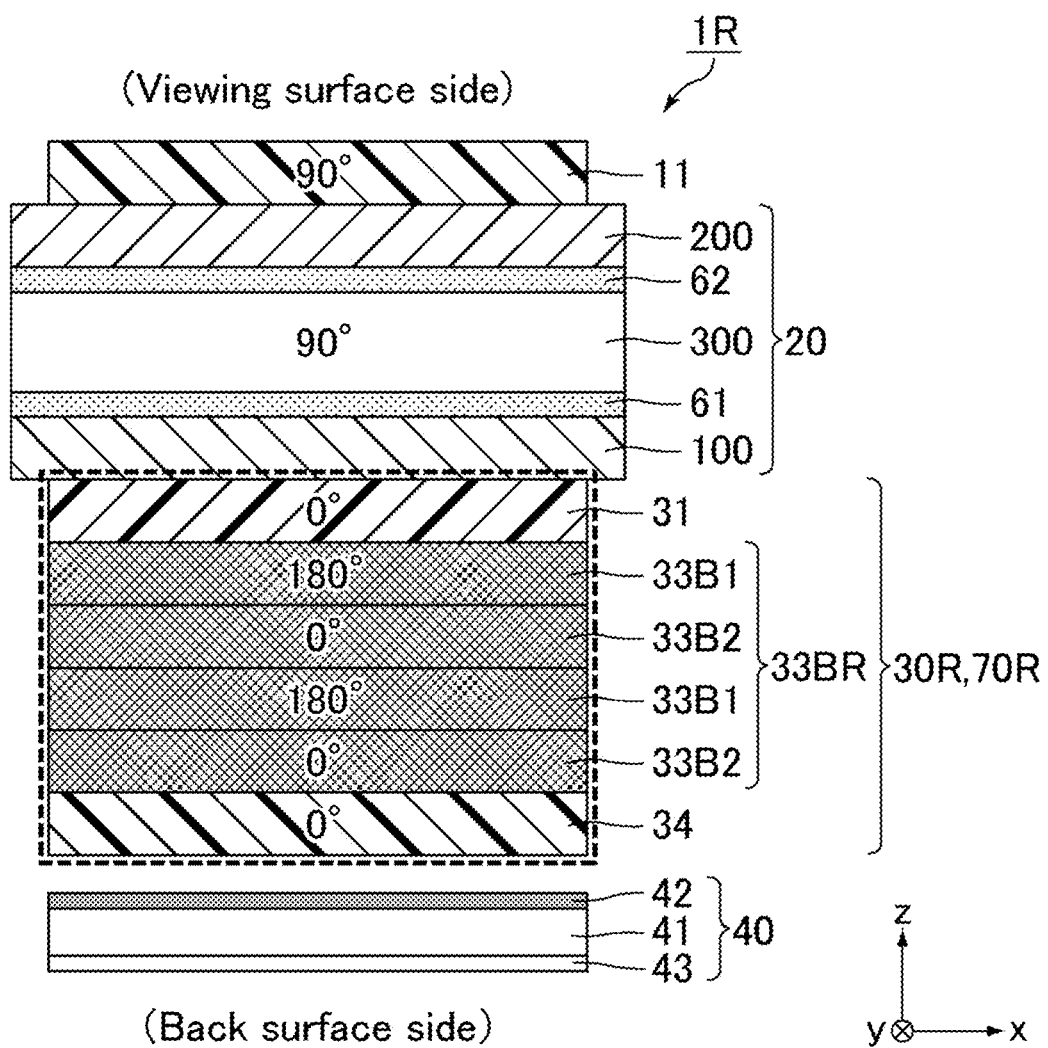
FIG. 36 is a schematic cross-sectional view of a display device of Comparative Example 3.
Figure 37:
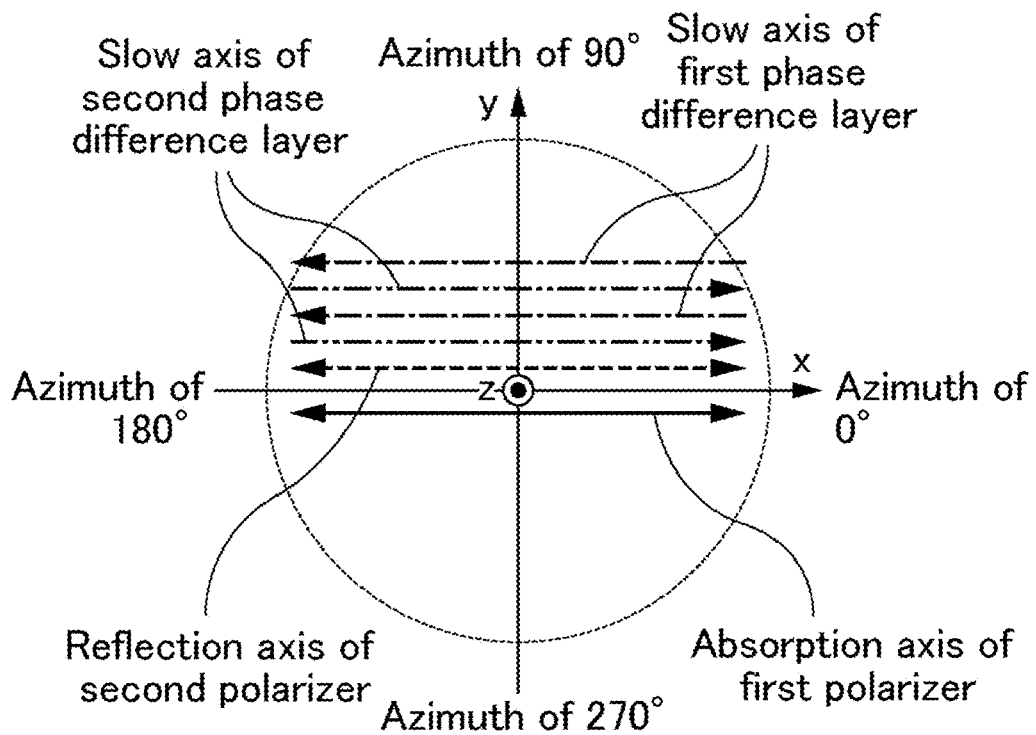
FIG. 37 shows axis azimuths of components of the display device of Comparative Example 3.

FIG. 36 is a schematic cross-sectional view of a display device of Comparative Example 3. The angles shown in FIG. 36 represent axis azimuths. FIG. 37 shows axis azimuths of components of the display device of Comparative Example 3.

A display device 1R of Comparative Example 3 shown in FIG. 36 and FIG. 37 was the same as the display device 1R of Comparative Example 2, except that between a first polarizer 31 and a second polarizer 34, a phase difference layer 33BR was disposed in which four layers of a first phase difference layer 33B1, a second phase difference layer 33B2, a first phase difference layer 33B1, and a second phase difference layer 33B2 were laminated sequentially from the viewing surface side toward the back surface side. As in Comparative Example 2, the in-plane phase difference of each first phase difference layer 33B1 in a front view was 115 nm, and the in-plane phase difference of each second phase difference layer 33B2 in a front view was 115 nm.

As in Comparative Example 1, the viewing angle in terms of transmittance of a polarizer louver 70R in the display device 1R of Comparative Example 3 was calculated. Specifically, the viewing angle in terms of transmittance of the region surrounded by the dashed line in FIG. 36, i.e., an optical element 30R (polarizer louver 70R) including all the components from the first polarizer 31 to the second polarizer 34 (the first polarizer 31, the phase difference layer 33BR, and the second polarizer 34) was calculated using an LCD Master.

Figure 38:
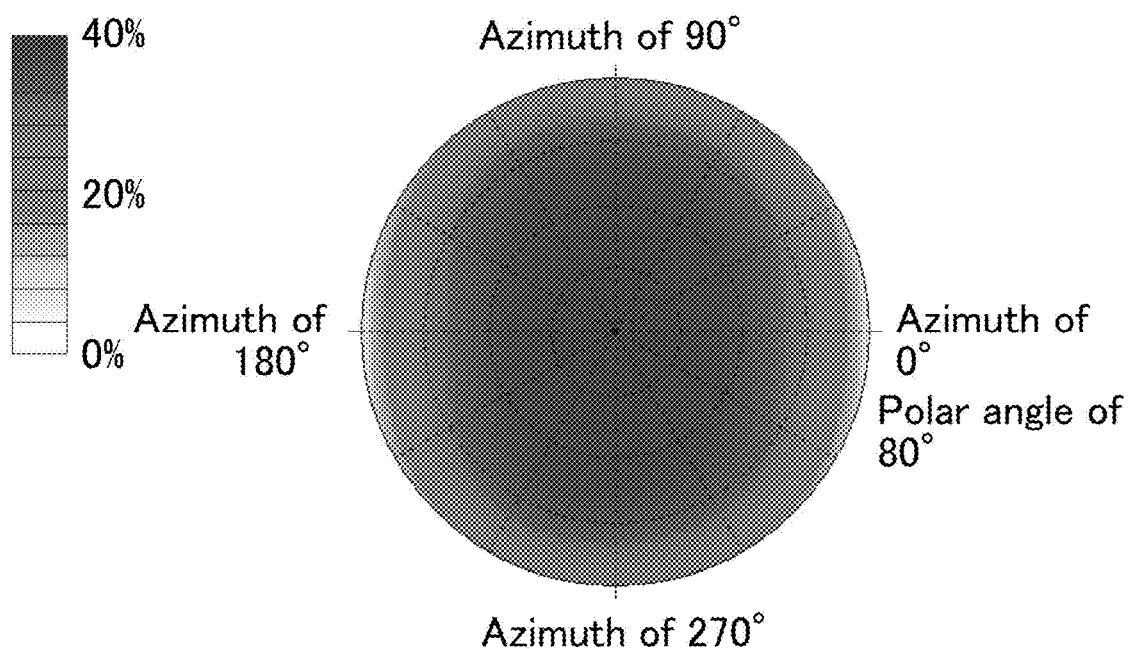
FIG. 38 shows simulation results of the viewing angle in terms of transmittance of a polarizer louver in Comparative Example 3.

FIG. 38 shows simulation results of the viewing angle in terms of transmittance of a polarizer louver in Comparative Example 3. FIG. 38 shows that the polarizer louver 70R in Comparative Example 3 achieved almost the same results as that in Comparative Example 1, meaning that light was not blocked at any azimuth.

The front white luminance and the front CR of the display device 1R of Comparative Example 3 were measured as in Comparative Example 1. Table 5 shows the results.

TABLE 5

| | |
|---|---|
| Front white luminance of display device [cd/m$^2$] | 500 |
| Front CR of display device | 790 |

As shown in Table 5, the front white luminance of the display device 1R of Comparative Example 3 was 500 cd/m$^2$, which was the same as in Comparative Example 1. The front CR of the display device 1R of Comparative Example 3 was 790 (front white luminance:front black luminance=790:1), which was the same as in Comparative Example 1. The display device 1R of Comparative Example 3 was the same as that of Comparative Example 1 in terms of both front white luminance and front CR, showing no improvement in front white luminance and front CR.

Comparative Example 4

Figure 39:
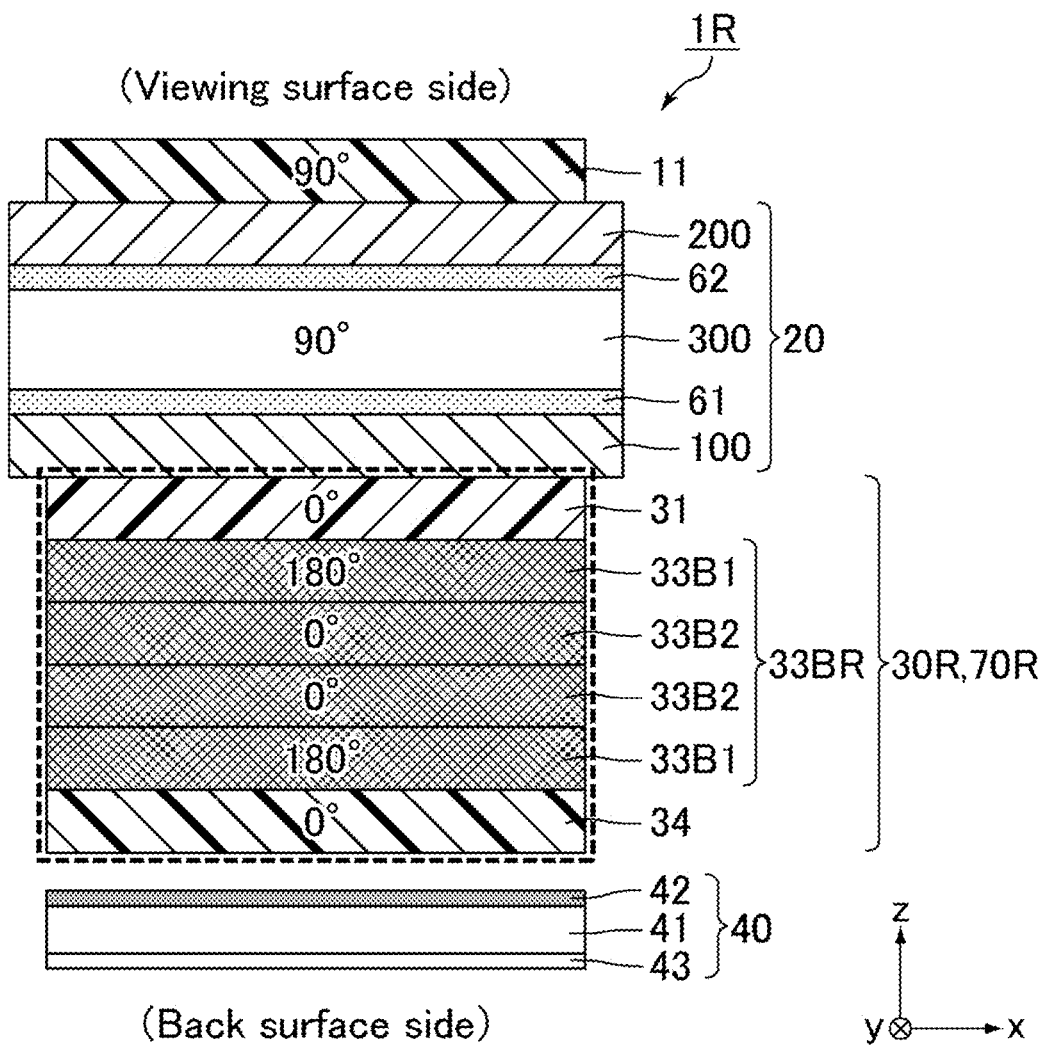
FIG. 39 is a schematic cross-sectional view of a display device of Comparative Example 4.
Figure 40:
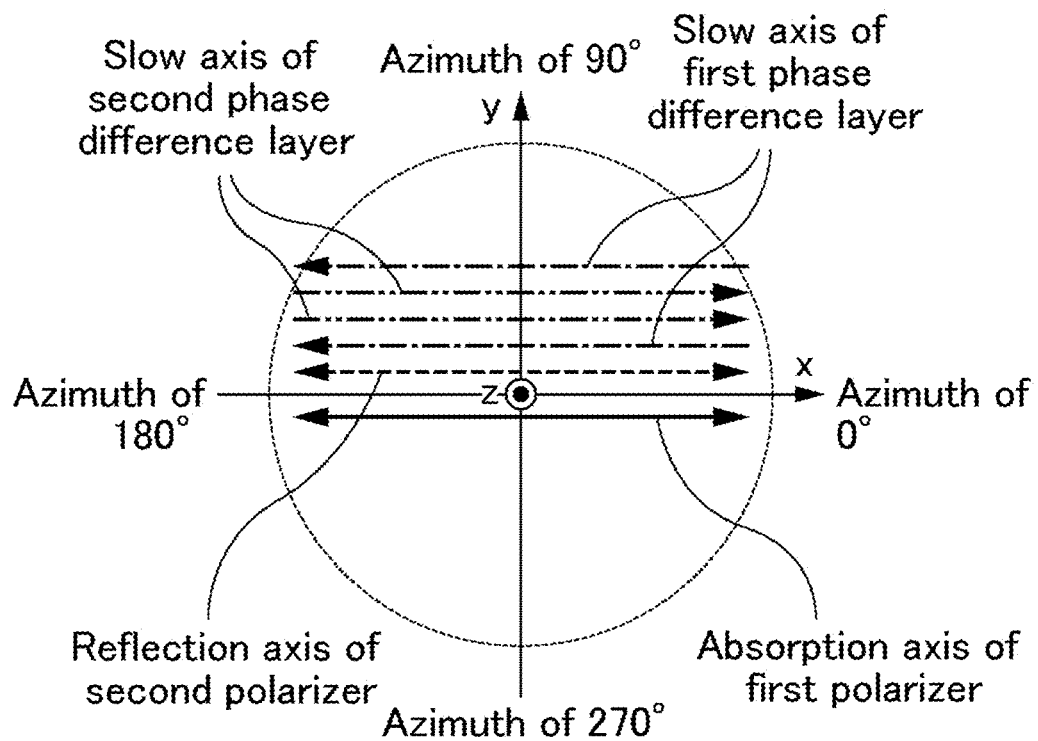
FIG. 40 shows axis azimuths of components of the display device of Comparative Example 4.

FIG. 39 is a schematic cross-sectional view of a display device of Comparative Example 4. The angles shown in FIG. 39 represent axis azimuths. FIG. 40 shows axis azimuths of components of the display device of Comparative Example 4.

A display device 1R of Comparative Example 4 shown in FIG. 39 and FIG. 40 was the same as the display device 1R of Comparative Example 3, except that between a first polarizer 31 and a second polarizer 34, a phase difference layer 33BR was disposed in which four layers of a first phase difference layer 33B1, a second phase difference layer 33B2, a second phase difference layer 33B2, and a first phase difference layer 33B1 were laminated sequentially from the viewing surface side toward the back surface side.

As in Comparative Example 1, the viewing angle in terms of transmittance of a polarizer louver 70R in the display device 1R of Comparative Example 4 was calculated. Specifically, the viewing angle in terms of transmittance of the region surrounded by the dashed line in FIG. 39, i.e., an optical element 30R (polarizer louver 70R) including all the components from the first polarizer 31 to the second polarizer 34 (the first polarizer 31, the phase difference layer 33BR, and the second polarizer 34) was calculated using an LCD Master.

Figure 41:
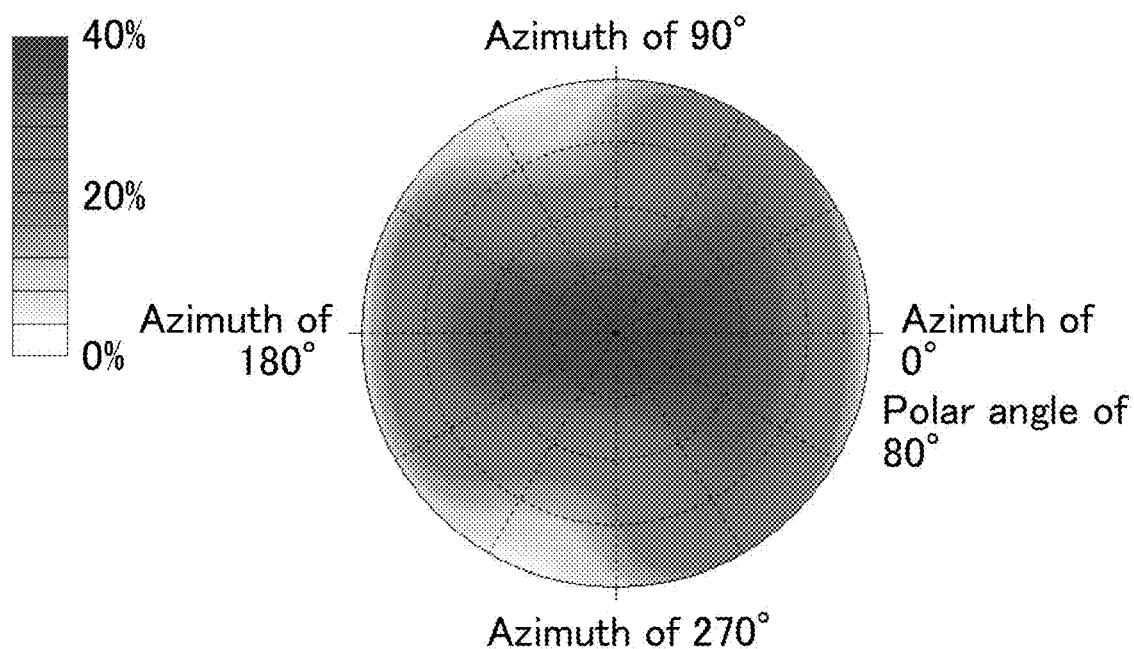
FIG. 41 shows simulation results of the viewing angle in terms of transmittance of a polarizer louver in Comparative Example 4.

FIG. 41 shows simulation results of the viewing angle in terms of transmittance of the polarizer louver in Comparative Example 4. FIG. 41 shows that the polarizer louver 70R in Comparative Example 3 blocked light more at an azimuth of 135° and an azimuth of 225° than in Comparative Example 1, but failed to block light at azimuths in top and bottom directions. In addition, the light-blocking range was small.

The front white luminance and the front CR of the display device 1R of Comparative Example 4 were measured as in Comparative Example 1. Table 6 shows the results.

TABLE 6

| | |
|---|---|
| Front white luminance of display device [cd/m$^2$] | 500 |
| Front CR of display device | 806 |

As shown in Table 6, the front white luminance of the display device 1R of Comparative Example 4 was 500 cd/m$^2$, which was the same as in Comparative Example 1. The front CR of the display device 1R of Comparative Example 4 was 806 (front white luminance:front black luminance=806:1), which was slightly higher than in Comparative Example 1, but the improvement percentage was as little as less than 5%.

Example 3

Figure 42:
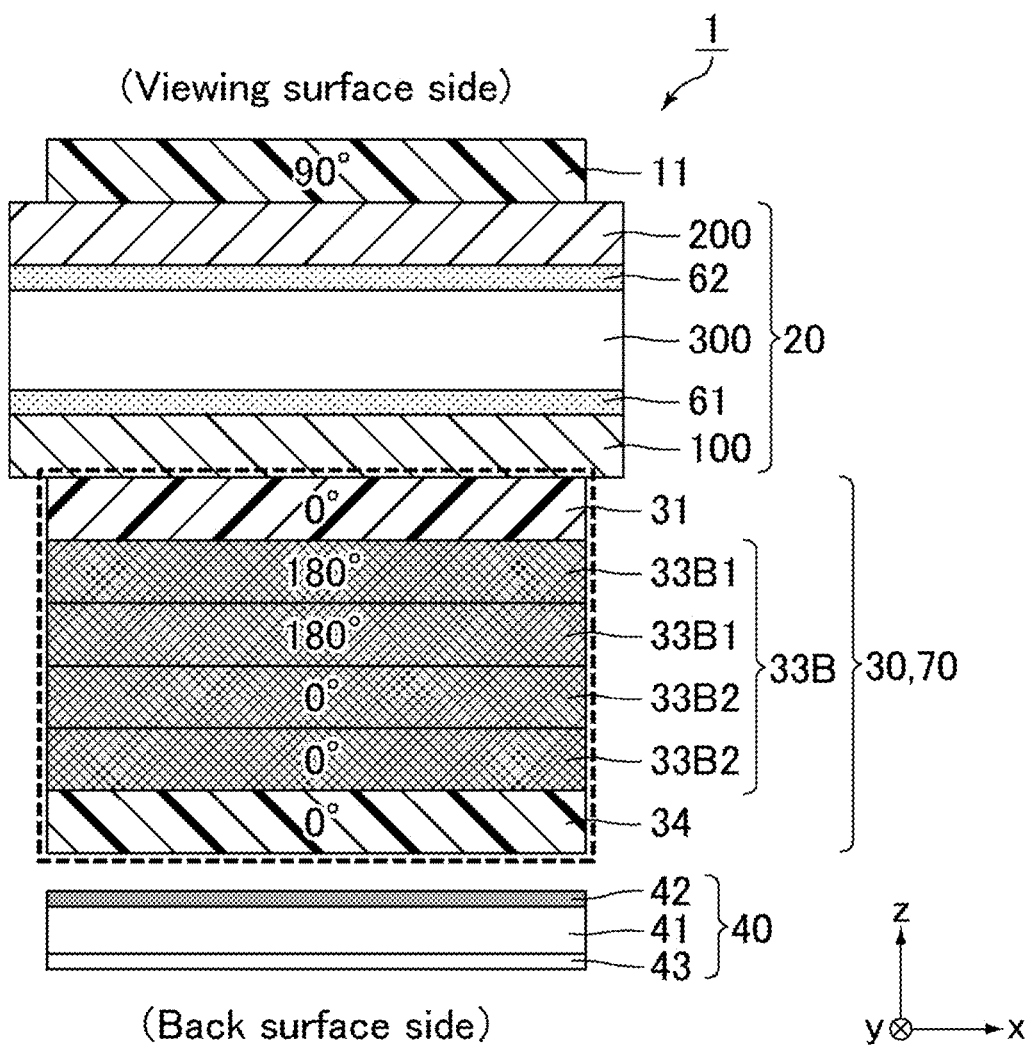
FIG. 42 is a schematic cross-sectional view of a display device of Example 3.
Figure 43:
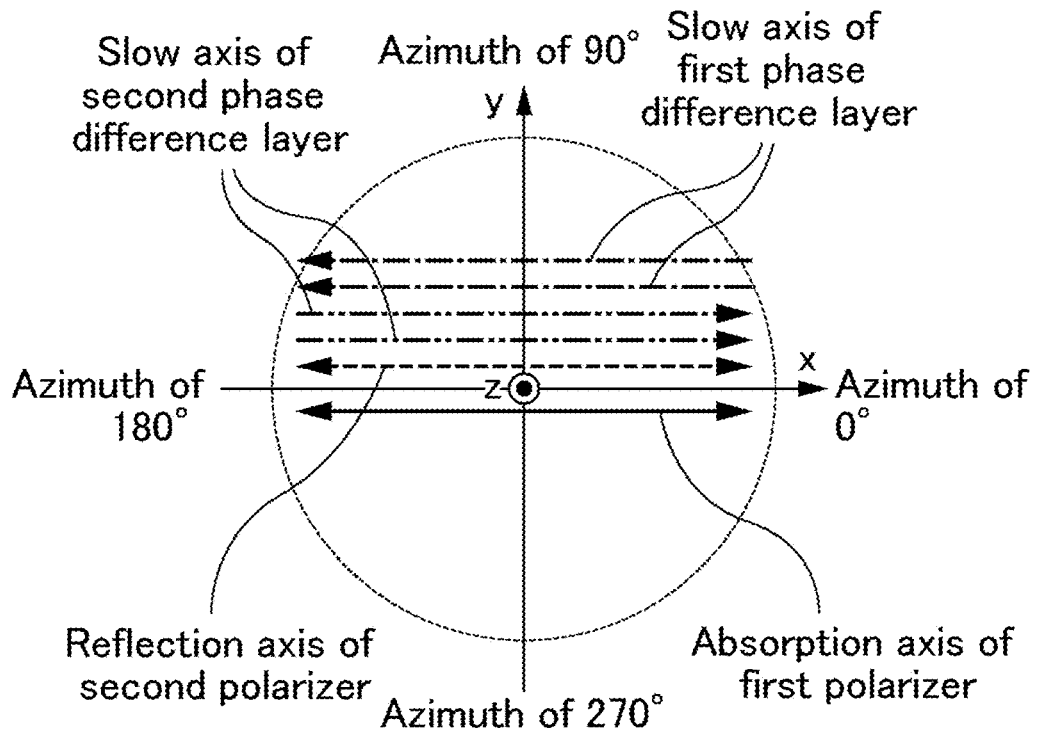
FIG. 43 shows axis azimuths of components of the display device of Example 3.

FIG. 42 is a schematic cross-sectional view of a display device of Example 3. The angles shown in FIG. 42 represent axis azimuths. FIG. 43 shows axis azimuths of components of the display device of Example 3.

A display device 1 of Example 3 shown in FIG. 42 and FIG. 43 was the same as the display device 1R of Comparative Example 2, except that between a first polarizer 31 and a second polarizer 34, a phase difference layer 33B was disposed in which four layers of a first phase difference layer 33B1, a first phase difference layer 33B1, a second phase difference layer 33B2, and a second phase difference layer 33B2 were laminated sequentially from a viewing surface side toward a back surface side. As in Comparative Example 2, the in-plane phase difference of each first phase difference layer 33B1 in a front view was 115 nm, and the in-plane phase difference of each second phase difference layer 33B2 in a front view was 115 nm.

As in Comparative Example 1, the viewing angle in terms of transmittance of the polarizer louver 70 in the display device 1 of Example 3 was calculated. Specifically, the viewing angle in terms of transmittance of the region surrounded by the dashed line in FIG. 42, i.e., an optical element 30 (polarizer louver 70) including all the components from the first polarizer 31 to the second polarizer 34 (the first polarizer 31, the phase difference layer 33B, and the second polarizer 34) was calculated using an LCD Master.

Figure 44:
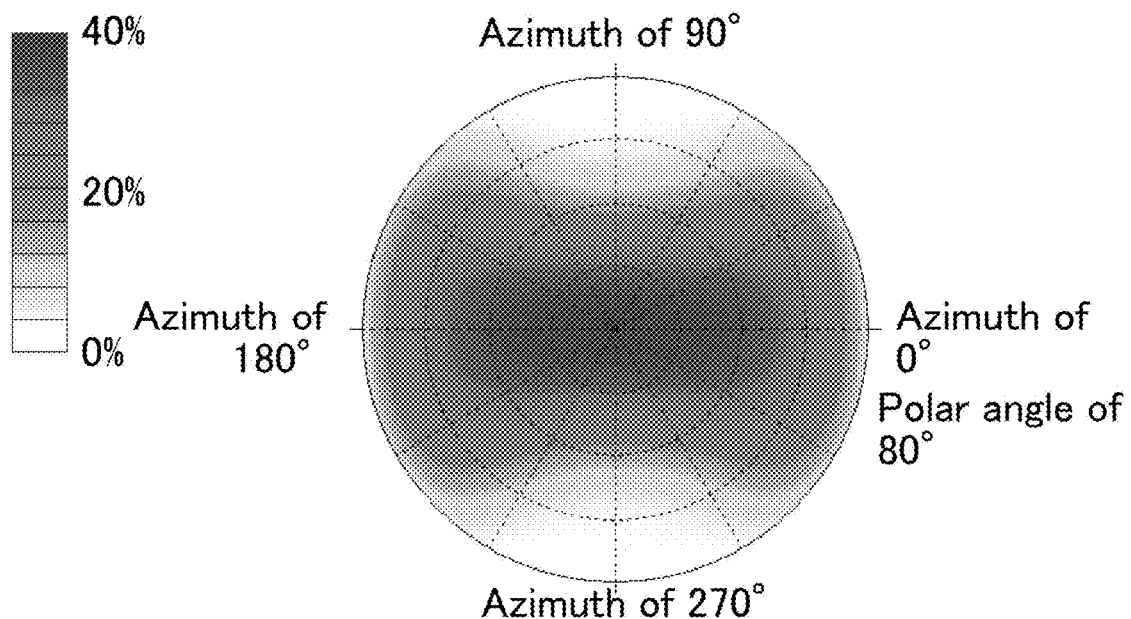
FIG. 44 shows simulation results of the viewing angle in terms of transmittance of a polarizer louver in Example 3.

FIG. 44 shows simulation results of the viewing angle in terms of transmittance of a polarizer louver in Example 3. FIG. 44 shows that the polarizer louver 70 in Example 3 was lower in transmittance at azimuths in top and bottom directions (azimuth 90°-270°) than the polarizer louver 70R in Comparative Example 1, and the light-blocking range expanded roughly from an azimuth of 45° to an azimuth of 135° centering around azimuth 90°-270°.

The front white luminance and the front CR of the display device 1 of Example 3 were measured as in Comparative Example 1. Table 7 shows the results.

TABLE 7

| | |
|---|---|
| Front white luminance of display device [cd/m²] | 500 |
| Front CR of display device | 897 |

As shown in Table 7, the front white luminance of the display device 1 of Example 3 was 500 cd/m², which was the same as in Comparative Example 1. The front CR of the display device 1 of Example 3 was 897 (front white luminance:front black luminance=897:1), which was significantly higher than in Comparative Example 1 by as much as 13%.

Figure 45:
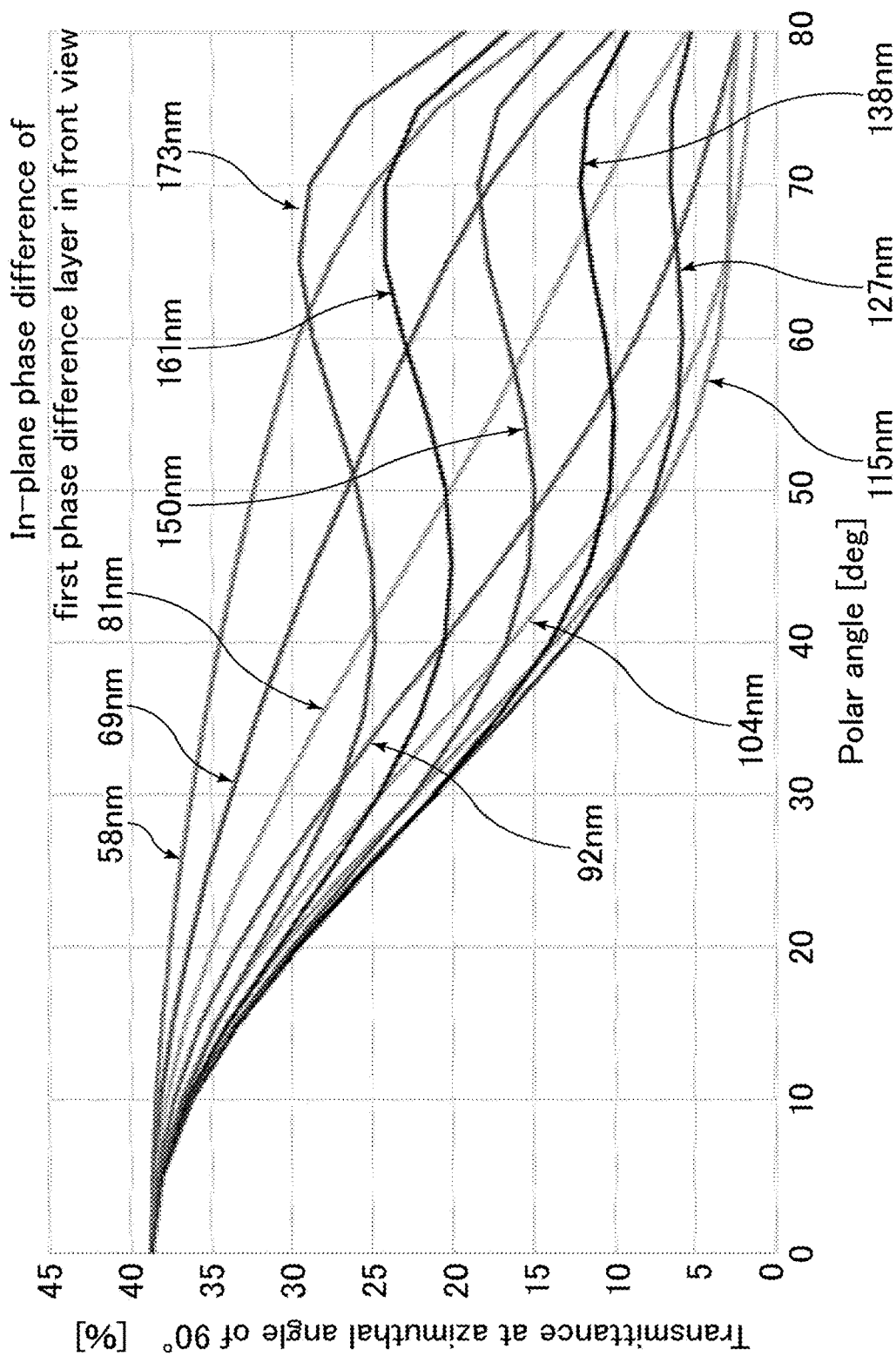
FIG. 45 shows simulation results of transmittance of the display device of Example 3 at an azimuthal angle of 90° relative to polar angles.

In the display device of Example 3, the in-plane phase difference of each first phase difference layer 33B1 in a front view was changed as appropriate to further simulate the transmittance at an azimuthal angle of 90° relative to polar angles. FIG. 45 shows simulation results of transmittance of the display device of Example 3 at an azimuthal angle of 90° relative to polar angles. As shown in FIG. 45, when the in-plane phase difference of each first phase difference layer 33B1 in a front view was 90 nm or more and 125 nm or less, the transmittance at an azimuthal angle of 90° was reduced. Also, when the in-plane phase difference of the first phase difference layer 33B1 in a front view was 104 nm or more and 115 nm or less, the transmittance at an azimuthal angle of 90° was more effectively reduced.

The in-plane phase difference of each second phase difference layer 33B2 in a front view was changed as appropriate to further simulate the transmittance at an azimuthal angle of 90° relative to polar angles, and the results thereof were the same as the results shown in FIG. 45. Thus, when the in-plane phase difference of each second phase difference layer 33B2 in a front view was 90 nm or more and 125 nm or less, the transmittance at an azimuthal angle of 90° was reduced. Also, when the in-plane phase difference of each second phase difference layer 33B2 in a front view was 104 nm or more and 115 nm or less, the transmittance at an azimuthal angle of 90° was more effectively reduced.

Example 4

Figure 46:
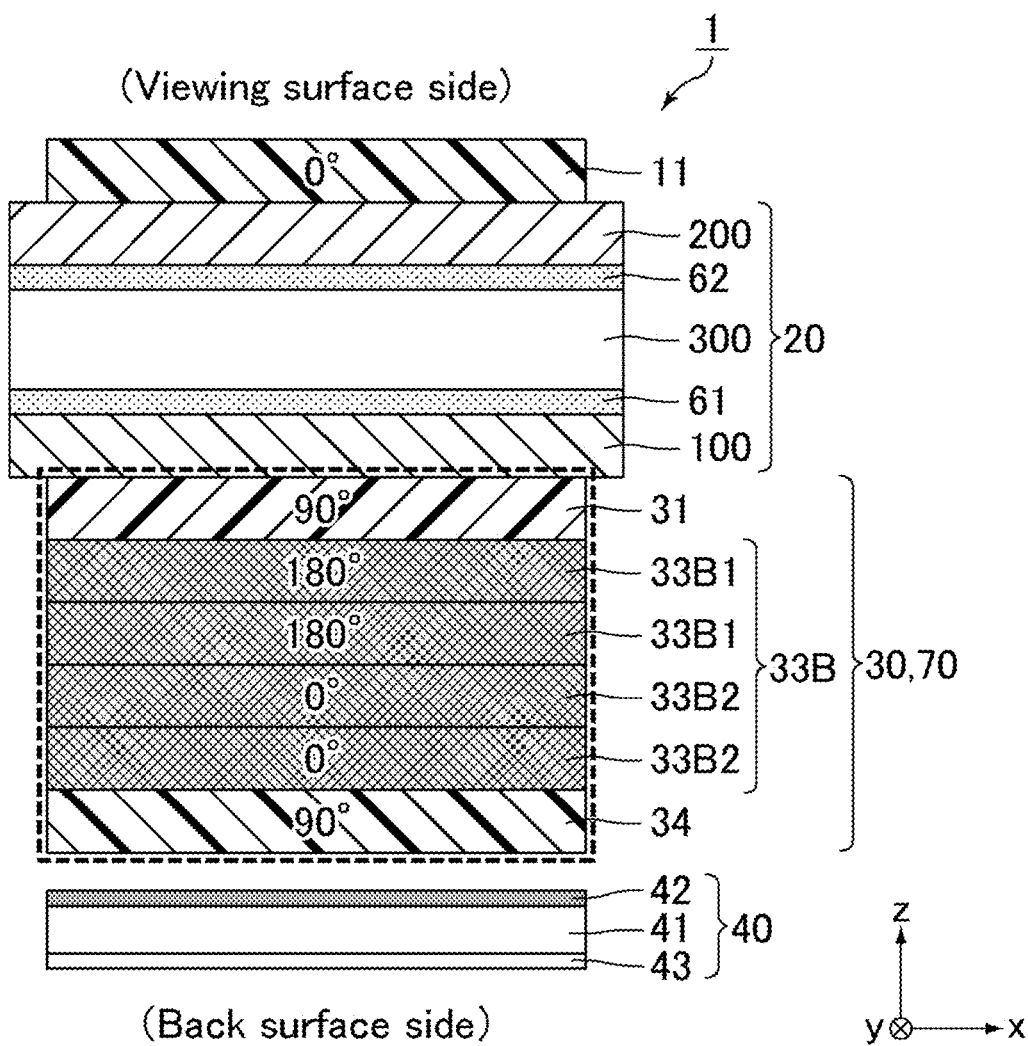
FIG. 46 is a schematic cross-sectional view of a display device of Example 4.
Figure 47:
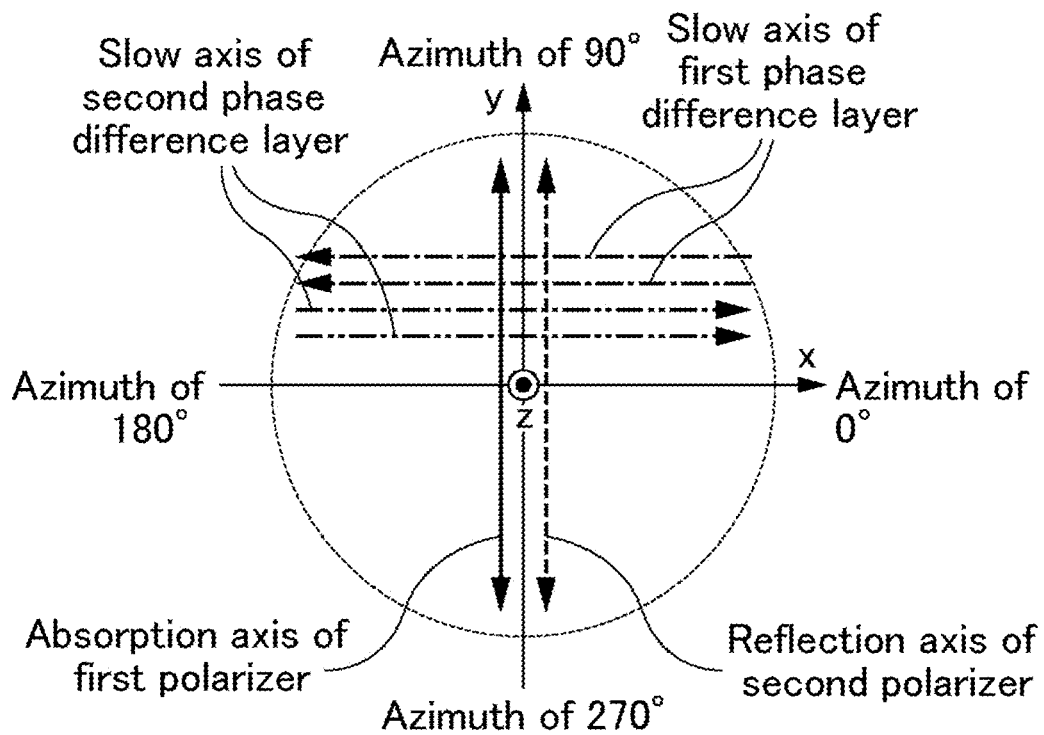
FIG. 47 shows axis azimuths of components of the display device of Example 4.

FIG. 46 is a schematic cross-sectional view of a display device of Example 4. The angles shown in FIG. 46 represent axis azimuths. FIG. 47 shows axis azimuths of components in the display device of Example 4.

A display device 1 of Example 4 shown in FIG. 46 and FIG. 47 was the same as the display device 1 of Example 3, except that the transmission axis of a viewing surface side polarizer 11 was set parallel to an azimuth of 90° (i.e., the absorption axis was set parallel to an azimuth of 0°), the absorption axis of a first polarizer 31 was set parallel to an azimuth of 90°, and the reflection axis of a second polarizer 34 was set parallel to an azimuth of 90°.

As in Comparative Example 1, the viewing angle in terms of transmittance of a polarizer louver 70 in the display device 1 of Example 4 was calculated. Specifically, the viewing angle in terms of transmittance of the region surrounded by the dashed line in FIG. 46, i.e., an optical element 30 (polarizer louver 70) including all the components from the first polarizer 31 to the second polarizer 34 (the first polarizer 31, a phase difference layer 33B, and the second polarizer 34) was calculated using an LCD Master.

Figure 48:
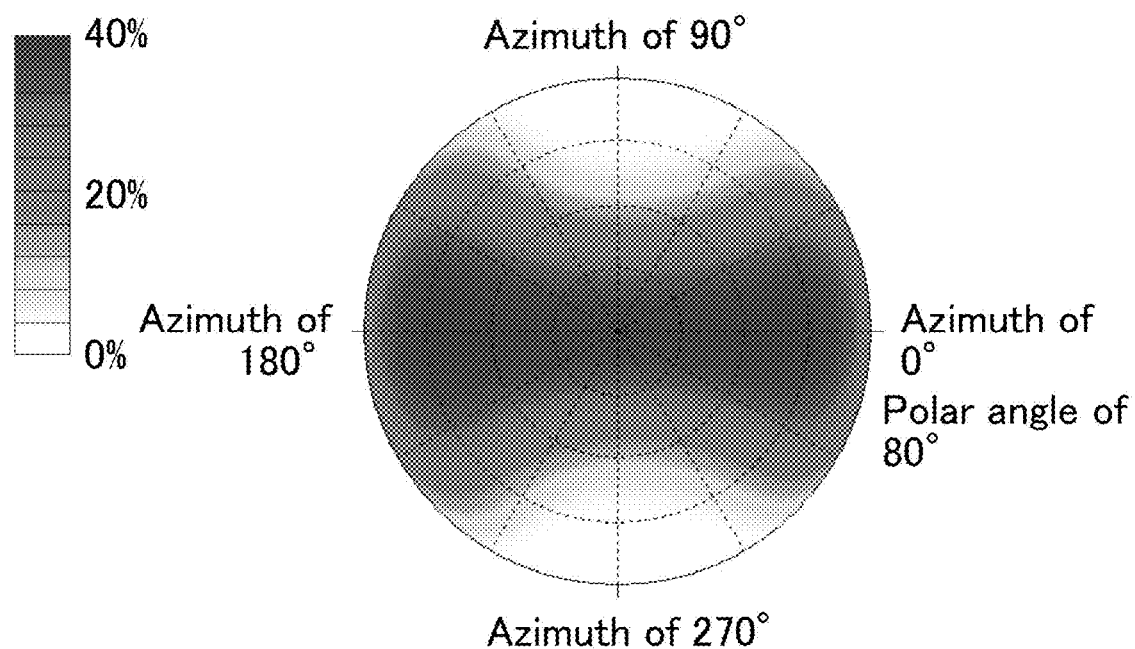
FIG. 48 shows simulation results of the viewing angle in terms of transmittance of a polarizer louver in Example 4.

FIG. 48 shows simulation results of the viewing angle in terms of transmittance of the polarizer louver in Example 4. FIG. 48 shows that the polarizer louver 70 in Example 4 was lower in transmittance at azimuths in top and bottom directions (azimuth 90°-270°) than the polarizer louver 70R in Comparative Example 1, and the light-blocking range expanded roughly from an azimuth of 45° to an azimuth of 135° centering around azimuth 90°-270°.

The front white luminance and the front CR of the display device 1 of Example 4 were measured as in Comparative Example 1. Table 8 shows the results.

TABLE 8

| | |
|---|---|
| Front white luminance of display device [cd/m²] | 500 |
| Front CR of display device | 910 |

As shown in Table 8, the front white luminance of the display device 1 of Example 4 was 500 cd/m², which was the same as in Comparative Example 1. The front CR of the display device 1 of Example 4 was 910 (front white luminance:front black luminance=910:1), which was significantly higher than in Comparative Example 1 by as much as 15%.

Example 5

Figure 49:
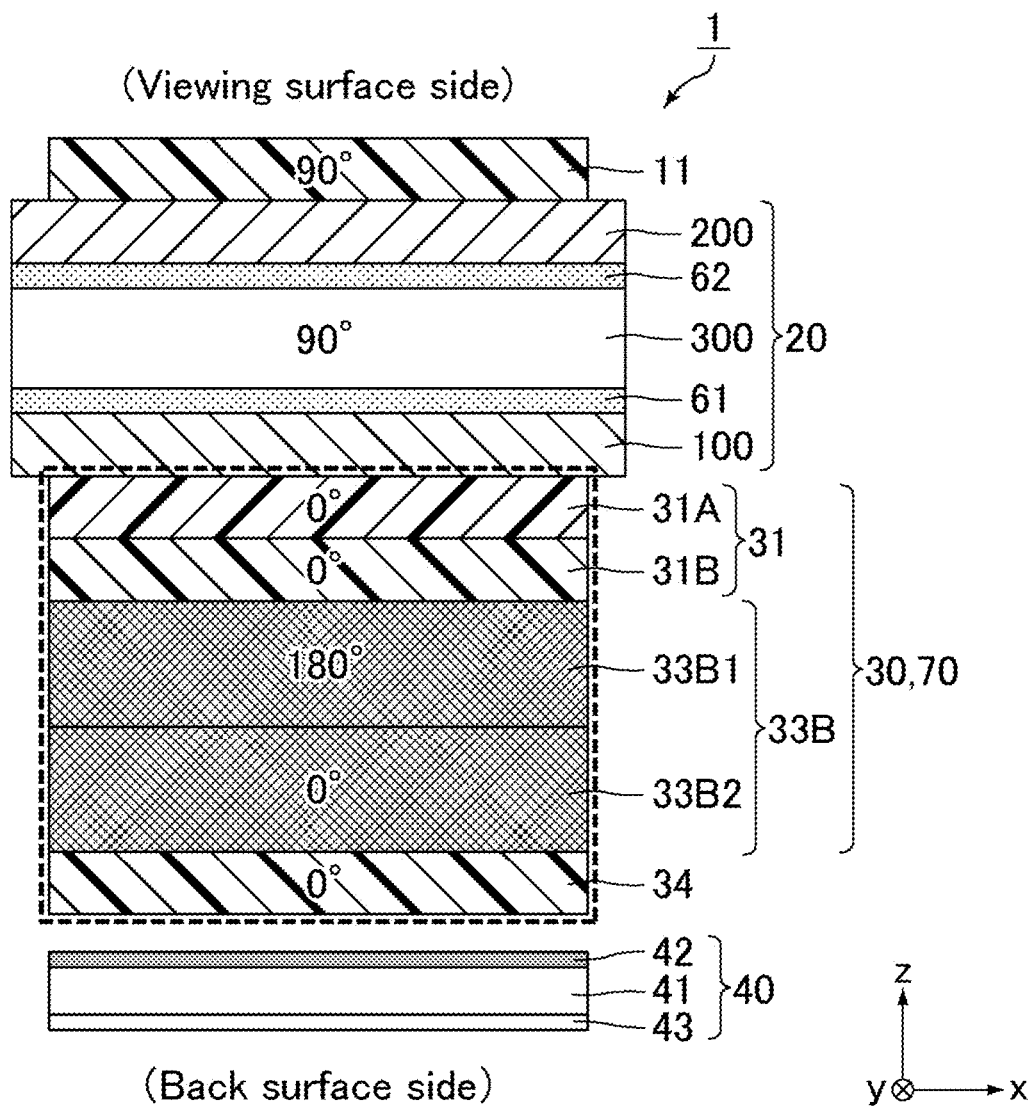
FIG. 49 is a schematic cross-sectional view of a display device of Example 5.
Figure 50:
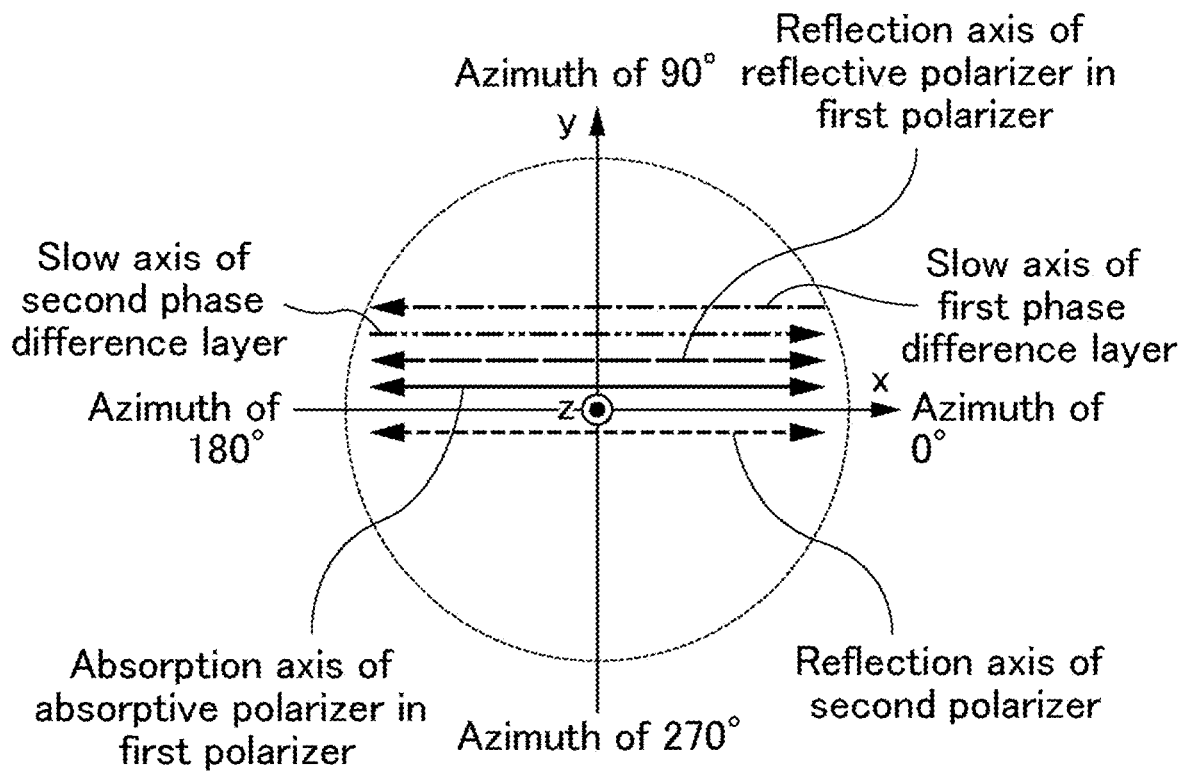
FIG. 50 shows axis azimuths of components of the display device of Example 5.

FIG. 49 is a schematic cross-sectional view of a display device of Example 5. The angles shown in FIG. 49 represent axis azimuths. FIG. 50 shows axis azimuths of components in the display device of Example 5.

A display device 1 of Example 5 shown in FIG. 49 and FIG. 50 was the same as the display device 1 of Example 1, except that a first polarizer 31 was a laminate of an absorptive polarizer 31A and a reflective polarizer 31B. The absorption axis of an absorptive polarizer 31A and the reflection axis of a reflective polarizer 31B were parallel to an azimuth of 0°.

As in Comparative Example 1, the viewing angle in terms of transmittance of a polarizer louver 70 in the display device 1 of Example 5 was calculated. Specifically, the viewing angle in terms of transmittance of the region surrounded by the dashed line in FIG. 49, i.e., an optical element 30 (polarizer louver 70) including all the components from the first polarizer 31 to a second polarizer 34 (the first polarizer 31, a phase difference layer 33B, and the second polarizer 34) was calculated using an LCD Master.

Figure 51:
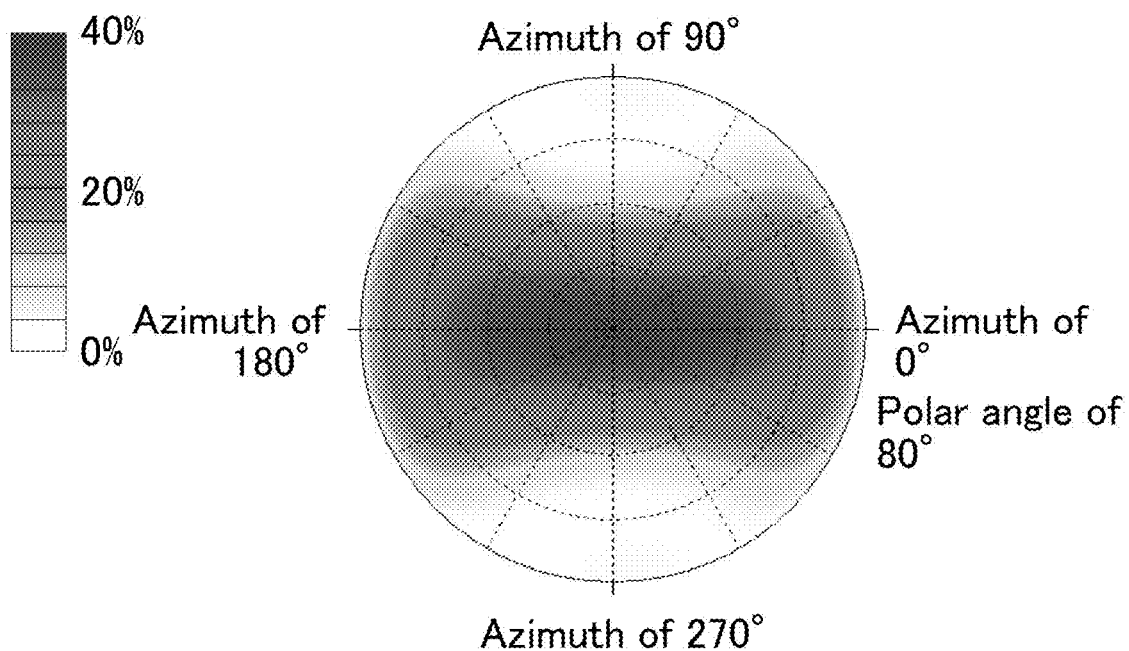
FIG. 51 shows simulation results of the viewing angle in terms of transmittance of a polarizer louver in Example 5.

FIG. 51 shows simulation results of the viewing angle in terms of transmittance of a polarizer louver in Example 5. As shown in FIG. 51, the polarizer louver 70 in Example 5 had a structure in which the phase difference layer 33B was sandwiched between two polarizers arranged in parallel Nicols as in Example 1, so that the simulation results of Example 5 were the same as those of Example 1.

The front white luminance and the front CR of the display device 1 of Example 5 were measured as in Comparative Example 1. Table 9 shows the results.

TABLE 9

| Front white luminance of display device [cd/m$^2$] | 570 |
|---|---|
| Front CR of display device | 853 |

As shown in Table 9, the front white luminance of the display device 1 of Example 5 was 570 cd/m$^2$, which has improved as compared to that in Comparative Example 1 by 14%. The front CR of the display device 1 of Example 5 was 853 (front white luminance:front black luminance=853:1), which was significantly higher than in Comparative Example 1 by as much as 8%. The reflective polarizer 31B in the first polarizer 31 did not absorb side lobe light from the backlight 40 but reflected the side lobe light toward the backlight 40 to recycle light between the reflective polarizer 31B and the reflector in the backlight 40. This presumably led to the effect of increasing the front white luminance.

REFERENCE SIGNS LIST

1, 1R: display device
10R, 30, 30R: optical element
11: viewing surface side polarizer
11R, 13R: polarizer
12R: biaxial phase difference layer
20: liquid crystal panel
31: first polarizer
31A: absorptive polarizer
31B: reflective polarizer
33B1: first phase difference layer
33B1L: first anisotropic molecules
33B2: second phase difference layer
33B2L: second anisotropic molecules
33BR: phase difference layer
33B11, 33B12, 33B21, 33B22: tilt angle
34: second polarizer
40: backlight
41: luminous part
42: prism sheet
42p, 421p, 422p: prism
42x: ridge line
43: reflector
61: first alignment film
62: second alignment film
70, 70R: polarizer louver
100: thin film transistor (TFT) substrate
101: gate line
101G: gate electrode
102: source line
102D: drain electrode
102S: source electrode
103: thin film semiconductor layer
104: thin film transistor (TFT)
104CH: contact hole
110, 210: supporting substrate
120: gate insulator
130: source line layer
140: source insulating film
150, 240: planarizing film
160: common electrode
170: interlayer insulating film
170W: film thickness
180: pixel electrode (signal electrode)
200: color filter (CF) substrate
220: black matrix layer
230: color filter (CF) layer
230B: blue color filter
230G: green color filter
230R: red color filter
300: liquid crystal layer
300W: cell gap
F: measurement direction

What is claimed is:

1. An optical element comprising, sequentially from a viewing surface side toward a back surface side:
   a first polarizer;
   a phase difference layer; and
   a second polarizer,
   wherein
   the phase difference layer is a laminate of n first phase difference layers and m second phase difference layers, the n first phase difference layers and the m second phase difference layers being arranged sequentially from the viewing surface side,
   n and m are each an integer of 1 or greater and are equal to each other,
   a transmission axis of the first polarizer is parallel to a transmission axis of the second polarizer,
   each of the n first phase difference layers contains first anisotropic molecules,
   in each of the n first phase difference layers, a tilt angle of the first anisotropic molecules on a viewing surface side differs from a tilt angle of the first anisotropic molecules on a back surface side,
   each of the m second phase difference layers contains second anisotropic molecules,
   in each of the m second phase difference layers, a tilt angle of the second anisotropic molecules on a viewing surface side differs from a tilt angle of the second anisotropic molecules on a back surface side, and
   in a structure where slow axes of the n first phase difference layers lie in a tilt direction of the first anisotropic molecules and slow axes of the m second phase difference layers lie in a tilt direction of the second anisotropic molecules,
   each of the slow axes of the n first phase difference layers and the slow axes of the m second phase difference layers is defined to point from the back surface side long-axis end of each of the first anisotropic molecules and the second anisotropic molecules as a start point to the viewing surface side long-axis end of each of the first anisotropic molecules and the second anisotropic molecules as an end point, in a plan view of a main surface of the optical element, the slow axes of the n first phase difference layers are in a same orientation, the slow axes of the m second phase difference layers are in a same orientation, and the slow axes of the n first phase difference layers and the slow axes of the m second phase difference layers are anti-parallel to each other and are parallel to or perpendicular to the transmission axis of the first polarizer.

2. The optical element according to claim 1,
wherein with n and m each being 1,
an in-plane phase difference of the first phase difference layer in a front view is 180 nm or more and 250 nm or less.

3. The optical element according to claim 1,
wherein with n and m each being 1,
an in-plane phase difference of the second phase difference layer in a front view is 180 nm or more and 250 nm or less.

4. The optical element according to claim 1,
wherein with n and m each being an integer of 2 or greater,
an in-plane phase difference of each of the n first phase difference layers in a front view is 90 nm or more and 125 nm or less.

5. The optical element according to claim 1,
wherein with n and m each being an integer of 2 or greater,
an in-plane phase difference of each of the m second phase difference layers in a front view is 90 nm or more and 125 nm or less.

6. The optical element according to claim 1,
wherein the first polarizer is an absorptive polarizer or a laminate of an absorptive polarizer and a reflective polarizer, and the second polarizer is a reflective polarizer or a laminate of an absorptive polarizer and a reflective polarizer.

7. A display device comprising, sequentially from a viewing surface side toward a back surface side:
a viewing surface side polarizer;
a display panel;
the optical element according to claim 1; and
a backlight.

8. The display device according to claim 7,
wherein the backlight includes a luminous part and a prism sheet disposed on a viewing surface side of the luminous part.

9. The display device according to claim 8,
wherein a transmission axis of the first polarizer and a transmission axis of the second polarizer are parallel to or perpendicular to ridge lines of the prism sheet.

10. The display device according to claim 8,
wherein the backlight includes a reflector on a back surface side of the luminous part.

* * * * *